(12) United States Patent
Kwag et al.

(10) Patent No.: US 12,318,036 B2
(45) Date of Patent: Jun. 3, 2025

(54) COOKING APPLIANCE

(71) Applicant: LG ELECTRONICS INC., Seoul (KR)

(72) Inventors: Dongseong Kwag, Seoul (KR); Hag Soo Kim, Seoul (KR); Sung Mun Yoon, Seoul (KR); Donghyok Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 943 days.

(21) Appl. No.: 17/421,590

(22) PCT Filed: Jan. 10, 2020

(86) PCT No.: PCT/KR2020/000544
§ 371 (c)(1),
(2) Date: Jul. 8, 2021

(87) PCT Pub. No.: WO2020/145766
PCT Pub. Date: Jul. 16, 2020

(65) Prior Publication Data
US 2022/0160172 A1 May 26, 2022

(30) Foreign Application Priority Data

Jan. 11, 2019 (KR) .................. 10-2019-0004169
Apr. 1, 2019 (KR) .................. 10-2019-0038037
Apr. 9, 2019 (KR) .................. 10-2019-0041621

(51) Int. Cl.
*A47J 37/06* (2006.01)
*F24C 7/06* (2006.01)
(Continued)

(52) U.S. Cl.
CPC .......... *A47J 37/0629* (2013.01); *F24C 7/067* (2013.01); *F24C 7/082* (2013.01); *F24C 15/006* (2013.01);
(Continued)

(58) Field of Classification Search
CPC ........ F24C 7/082; F24C 7/085; F24C 15/006; F24C 7/067; H05B 6/129; H05B 6/105
See application file for complete search history.

(56) References Cited

U.S. PATENT DOCUMENTS 1,690,570 A    11/1928   Dalbey, Sr.
2,480,045 A *   8/1949   Reeves .................. F24C 15/16
                                                       126/41 R
(Continued)

FOREIGN PATENT DOCUMENTS

CN    203328543 U    12/2013
CN    203615387 U     5/2014
(Continued)

*Primary Examiner* — Thien S Tran
(74) *Attorney, Agent, or Firm* — Bryan Cave Leighton Paisner LLP

(57) ABSTRACT

Disclosed herein is a cooking appliance including a door formed including a door upper surface part which covers an upper surface of a housing and a door front surface part which is connected to a front side of the door upper surface part and covers a front surface of the housing, wherein an input part is disposed in the door front surface part.

12 Claims, 34 Drawing Sheets

(51) Int. Cl.
  *F24C 7/08*    (2006.01)
  *F24C 15/00*   (2006.01)
  *F24C 15/02*   (2006.01)
  *F24C 15/04*   (2006.01)
  *H05B 6/10*    (2006.01)
  *H05B 6/12*    (2006.01)

(52) U.S. Cl.
  CPC ............ *F24C 15/023* (2013.01); *F24C 15/04* (2013.01); *H05B 6/105* (2013.01); *H05B 6/129* (2013.01)

(56) References Cited

U.S. PATENT DOCUMENTS

| | | | |
|---|---|---|---|
| 2,744,994 A * | 5/1956 | Bruckner | A47J 37/0635 219/405 |
| 3,535,999 A * | 10/1970 | Chambon | A47J 37/041 99/340 |
| 4,403,540 A * | 9/1983 | Erkelenz | A47J 37/0611 99/425 |
| 6,029,649 A | 2/2000 | Su | |
| 6,111,226 A | 8/2000 | Lee | |
| 6,271,502 B1 | 8/2001 | Lee | |
| 7,825,358 B2 | 11/2010 | Kim | |
| 7,910,866 B2 | 3/2011 | Hwang et al. | |
| 8,035,065 B2 | 10/2011 | Kim et al. | |
| 8,058,594 B2 | 11/2011 | Hwang | |
| 8,941,041 B2 | 1/2015 | Lee | |
| 2008/0127833 A1 | 6/2008 | Lee | |
| 2008/0148961 A1 | 6/2008 | Hwang et al. | |
| 2008/0148963 A1 | 6/2008 | Kim et al. | |
| 2008/0149630 A1 | 6/2008 | Hwang | |
| 2008/0149631 A1 | 6/2008 | Lee | |
| 2008/0149632 A1 | 6/2008 | Kim et al. | |
| 2008/0149633 A1 | 6/2008 | Kim | |
| 2008/0248157 A1 | 10/2008 | Choi | |
| 2009/0217920 A1 | 9/2009 | Flesch et al. | |
| 2010/0145483 A1 * | 6/2010 | McGonagle | F24C 15/02 700/83 |
| 2010/0178407 A1 | 7/2010 | Rizzuto et al. | |
| 2010/0320198 A1 | 12/2010 | Kim | |
| 2010/0320199 A1 | 12/2010 | Kim | |
| 2013/0119838 A1 | 5/2013 | Becker et al. | |
| 2015/0241069 A1 * | 8/2015 | Brant | F24C 15/006 126/21 A |
| 2018/0266697 A1 | 9/2018 | Dash et al. | |

FOREIGN PATENT DOCUMENTS

| | | |
|---|---|---|
| CN | 108968710 A | 12/2018 |
| DE | 2145094 A1 | 3/1973 |
| EP | 0830063 B1 | 8/2002 |
| EP | 3165990 A1 | 10/2017 |
| JP | S53026263 | 3/1978 |
| JP | 6039810 U | 3/1985 |
| JP | 05-27509 U | 4/1993 |
| JP | H07263132 A | 10/1995 |
| JP | 3822899 B2 | 9/2006 |
| JP | 2017083166 A | 5/2017 |
| JP | 6289602 B2 | 3/2018 |
| KR | 20-1994-0025187 U | 11/1994 |
| KR | 10-1995-0019486 A | 7/1995 |
| KR | 10-1997-0011605 A | 3/1997 |
| KR | 19990048545 A | 7/1999 |
| KR | 100227978 B1 | 8/1999 |
| KR | 20060044217 A | 5/2006 |
| KR | 10-2006-0062202 A | 6/2006 |
| KR | 10-2008-0024025 A | 3/2008 |
| KR | 20080035396 A | 4/2008 |
| KR | 10-0836352 B1 | 6/2008 |
| KR | 20-2009-0003021 U | 3/2009 |
| KR | 10-2009-0063422 A | 6/2009 |
| KR | 20-0450168 Y1 | 9/2010 |
| KR | 10-2011-0008423 A | 1/2011 |
| KR | 20-2011-0001565 U | 2/2011 |
| KR | 20120140490 A | 12/2012 |
| KR | 10-2017-0085727 A | 7/2017 |
| KR | 20180080057 A | 7/2018 |
| KR | 101881339 B1 | 8/2018 |

* cited by examiner

COOKING APPLIANCE

This application is the National Stage filing under 35 U.S.C. 371 of International Application No. PCT/KR2020/000544, filed on Jan. 10, 2020, which claims the benefit of and priority to Korean Patent Application No. 10-2019-0004169, filed on Jan. 11, 2019, Korean Patent Application No. 10-2019-0038037, filed on Apr. 1, 2019 and Korean Patent Application No. 10-2019-0041621, filed on Apr. 9, 2019, the contents of which are all hereby incorporated by reference herein in their entirety.

BACKGROUND

Field of the Invention

The present invention relates to a cooking appliance, and more particularly, to a cooking appliance including a door for opening and closing a cooking compartment of an oven or the like.

Discussion of Related Art

Cooking appliances, which are one kind of home appliances that are used for cooking food, are appliances installed in a kitchen space for cooking food according to a user's intention. Cooking appliances may be classified in various ways according to heat sources or forms used therein or types of fuels used therein.

When classified according to the form of cooking food, cooking appliances may be classified into open cooking appliances and sealed cooking appliances according to the form of a space in which food is placed. Sealed cooking appliances include an oven, a microwave oven, and the like, and open cooking appliances include a cooktop, a hob, and the like.

The sealed cooking appliances are cooking appliances that cook food by sealing a space in which food is located and heating the sealed space. The sealed cooking appliances are provided with a cooking compartment which is a space in which food is placed and which is sealed when attempting to cook the food. The cooking compartment is substantially the space in which food is cooked.

The sealed cooking appliances are broadly classified into gas ovens and electric ovens according to the type of heat source. The gas ovens use gas as a fuel and cook food by flames generated as gas is supplied to a plurality of burners, the burners are ignited, and the supplied gas burns. Unlike the gas ovens, the electric ovens use electricity as a heat source and cook food by heat emitted from a plurality of heaters as the heaters are operated.

Of the gas ovens and the electric ovens, the use of the electric ovens has been increased due to a faster cooking speed, higher thermal efficiency, and better stability thereof as compared with the gas ovens. Also, reducing the size of the electric ovens is easier than reducing the size of the gas ovens. Accordingly, the electric ovens in the form of mini ovens having a small size (hereinafter referred to as "mini ovens") have also been released.

The mini ovens have a small size and are thus not suitable for cooking food of a large size but are suitable for baking or warming a small amount of food which does not require the use of large-capacity ovens.

Particularly, the mini ovens have advantages of being conveniently usable in toasting bread and, in addition to being usable in toasting bread, being usable in cooking a small amount of food having a small size. Accordingly, the use of the mini ovens as cooking appliances for replacing conventional toasters has been increased.

In general, the mini oven includes an outer case for accommodating all components, a plurality of shelves for placing food during cooking, and a cooking compartment having an open front surface so that food may be put in the cooking compartment and cooked.

Also, the mini oven includes an oven heater for heating food to an appropriate temperature and a door for opening and closing the cooking compartment.

The door is provided so that, while food is put in the cooking compartment and cooked, the inside of the cooking compartment is blocked from the outside and sealed. The door may include a handle for easily opening and closing the door and a glass window for viewing the inside of the cooking compartment without opening the door.

In the mini oven, the door is mostly provided as a downward opening type. That is, the door applied to the mini oven may have a lower end portion rotatably coupled to the outer case through a door hinge and may operate in a manner in which the door opens the cooking compartment by rotating downward about the lower end portion rotatably coupled to the outer case and closes the cooking compartment by rotating upward while the cooking compartment is open.

The door may open the cooking compartment by rotating at an angle of about 90° while the cooking compartment is closed, and insertion and withdrawal of the shelves may occur while the cooking compartment is opened by the door.

That is, the door is opened in a state of being substantially parallel to the shelves inserted into the mini oven, and the insertion and withdrawal of the shelves are directly performed by a user.

However, the mini oven having the above configuration has the following disadvantages.

First, there is a problem in that, since, when the door is opened, the door inevitably protrudes to the front of the mini oven as much as a height of the door, the opening of the door and the insertion and withdrawal of the shelves are difficult to properly perform when the mini oven is installed in a narrow space.

Second, there is a problem in that, since, when the door is opened, the door protrudes to the front of the mini oven as much as the height of the door, the center of mass of the mini oven is biased toward the front.

Due to characteristics of the mini oven being lightweight as well as having a small size, the center of mass of the mini oven is inevitably biased toward the front when the door is unfolded forward. In this case, there is an increased risk that the mini oven will fall forward.

Particularly, when the shelves are withdrawn, the shelves are often placed on the door for checking a cooking state or temporarily placing the shelves. In such a structure in which the center of mass of the mini oven is biased toward the front, the risk of the mini oven falling forward is inevitably increased.

Furthermore, the risk is greater when the weight of the shelves or foods placed on the shelves is heavy. This not only adds risks to the cooking of heavyweight foods but also causes an increase in the weight of the shelves. That is, even when it is necessary to adopt shelves formed of a thick, heavy material to improve the cooking performance, adopting such shelves becomes difficult due to the risk of the mini oven falling forward.

Third, various limitations occur because a passage for the insertion and withdrawal of the shelves and a passage for checking the cooking state are limited to a front surface of the mini oven.

That is, since directions of the insertion and withdrawal of the shelves are limited to a front-rear direction, inconvenience occurs in the insertion and withdrawal of the shelves when the mini oven is installed at a low place. Since the passage for checking the cooking state is limited to the glass window provided in the door, there is considerable inconvenience in checking the cooking state when the mini oven is installed at a low place.

Generally, for properly checking the cooking state of the entire food, opening the door is not enough, and withdrawal of the tray should necessarily be performed.

That is, when the user wants to properly check the cooking state of the entire food, the user should directly open the door and then directly withdraw and insert the shelf. However, when the mini oven is installed at a low place, it is very inconvenient to perform such tasks, and the possibility that the user will be exposed to the risk of injuries such as burns in the process in which the user directly withdraws and inserts the shelf is also increased.

Fourth, since the insertion and withdrawal of the shelves is performed by a user directly pulling the shelves from the inside of the cooking compartment or pushing the shelves into the cooking compartment, the inconvenience of the user and the risk of safety accidents are increased.

In some cases, the user may want to withdraw the shelves and directly check the overall cooking state during cooking. Even in this case, the user has to directly hold the shelves and withdraw the shelves after opening the door. Even in a case in which the user wants to resume cooking, the user has to directly hold the shelves and push the shelves into the cooking compartment.

That is, even when the user simply wants to check the cooking state, the user is exposed to the inconvenience of having to directly withdraw and insert the shelves, and, in this process, there is a problem in that the user is exposed to the risk of injury such as burns.

Particularly, in this process, the center of mass of the mini oven may be biased toward the front, and the mini oven may fall forward. In this case, the safety of the user may be seriously threatened.

Related Art Document 1 (Japanese Patent Registration No. 6289602) discloses a heating cooking appliance including a cooking plate which enters or exits a cooking compartment by interlocking with opening or closing of a door.

According to the configuration of Related Art Document 1, a pair of sliding rails (hereinafter referred to as "first sliding rails") are provided in the cooking compartment, and a pair of sliding rails (hereinafter referred to as "second sliding rails") are also provided at the door and detachably coupled to the sliding rails provided in the cooking compartment.

The second sliding rails may be coupled to the first sliding rails to be slidably movable, and, as a result, the door may slide in a front-rear direction and open or close the cooking compartment.

A support member is installed at the pair of second sliding rails, and the cooking plate is supported by being caught from the top at an upper end portion of the support member. That is, the cooking plate is supported at the second sliding rails by the support member, and the second sliding rails are supported at the first sliding rails.

By the structure, the cooking plate may move in the front-rear direction according to the door moving in the front-rear direction. That is, the cooking plate may enter or exit the cooking compartment by moving in the front-rear direction by interlocking with the operation of the door moving in the front-rear direction and opening or closing the cooking compartment.

The heating cooking appliance of Related Art Document 1 disclosing the above configuration has an advantage in that, since entering and exiting of the cooking plate are performed by interlocking with the opening and closing operations of the door, insertion and withdrawal of the cooking plate can be more easily performed.

However, the first and second disadvantages of the mini oven described above identically apply to the heating cooking appliance of Related Art Document 1.

That is, the disadvantage in that the door protrudes to the front of the mini oven as much as the height of the door when the door is opened and the disadvantage in that the center of mass of the mini oven is biased toward the front due to the door protruding to the front of the mini oven as much as the height of the door when the door is opened also identically apply to the heating cooking appliance of Related Art Document 1.

Also, the heating cooking appliance of Related Art Document 1 simply has a configuration that allows entering and exiting of the cooking plate to be performed by interlocking with the opening and closing operations of the door and is still provided as a structure that requires the door to be opened for checking a cooking state. Therefore, an inconvenience of the user having to directly open the door even when the user just wants to check the cooking state is also still not solved.

Related Art Document 2 (Korean Patent Publication No. 20-2011-0001565) discloses a door opening and closing device of a toaster having a structure in which, not only the front of an inner space of the toaster is opened, but also a portion of the top of the inner space of the toaster is opened together.

According to the configuration of Related Art Document 2, a door is installed at the front of the toaster, and the door rotates toward the front of the toaster and opens the inner space of the toaster. In this case, since the door is provided to cover not only the front of the toaster but also the portion of the top of the toaster, when the door is opened, not only the front of the inner space of the toaster is opened, but also the portion of the top of the inner space of the toaster may be opened together.

Also, according to the configuration of Related Art Document 2, a toaster holder may be installed inside the door, and when the door is opened, the toaster holder may rotate forward together with the door and be withdrawn to the outside of the cooking appliance.

The door opening and closing device of a toaster of Related Art Document 2 disclosing the above configuration has an advantage in that, since entering and exiting of the toaster holder occurs by interlocking with the opening and closing operations of the door, the insertion and withdrawal of the toaster are more easily performed.

Also, the door opening and closing device of the toaster of Related Art Document 2 disclosing the above configuration has an advantage in that, since the portion of the top of the inner space of the toaster is also opened together when the door is opened, the occurrence of interference between the toaster accommodated in the toaster holder and a frame of the cooking appliance is avoided when the door is opened and closed.

However, the first and second disadvantages of the mini oven described above identically apply to the device of Related Art Document 2 disclosing the above configuration.

That is, the disadvantage in that the door protrudes to the front of the mini oven as much as the height of the door when the door is opened, the disadvantage in that the center of mass of the mini oven is biased toward the front due to the door protruding to the front of the mini oven as much as the height of the door when the door is opened, and the disadvantage in that various limitations occur because the passage for the insertion and withdrawal of the shelves and the passage for checking the cooking state are limited to the front surface of the mini oven also identically apply to the device of Related Art Document 2.

Also, the device disclosed in Related Art Document 2 simply has a configuration that allows entering and exiting of the toaster holder to be performed by interlocking with the opening and closing operations of the door and is still provided as a structure that requires the door to be opened for checking the cooking state. Therefore, the inconvenience of the user having to directly open the door even when the user just wants to check the cooking state is also still not solved.

Also, according to the device disclosed in Related Art Document 2, since the toaster holder is installed inside the door, there is a problem in that the center of mass of the toaster is further biased toward the front when the door is opened.

That is, according to the configuration disclosed in Related Art Document 2, since, when the door is opened, not only the door is unfolded to the front of the toaster, but also the weight of the toaster holder and the weight of the toaster accommodated in the toaster holder are added to the weight of the door unfolded toward the front, the center of mass of the toaster is more biased toward the front when the door is opened, and thus there is a problem in that the risk of the toaster falling forward is increased.

Related Art Document 3 (U.S. Pat. No. 6,271,502) discloses an oven including a front door and a top cover.

According to the configuration of Related Art Document 3, the front door is installed at the front of the oven, and the top cover is installed at the top of the oven. The front door and the top cover are disposed at different positions and operate independently of each other. The front of an inner space of the oven may be opened or closed by the front door, and the top of an inner space of the oven may be opened or closed by the top cover.

However, the first and second disadvantages of the mini oven described above identically apply to the device of Related Art Document 3 disclosing the above configuration.

That is, the disadvantage in that the door protrudes to the front of the mini oven as much as the height of the door when the door is opened and the disadvantage in that the center of mass of the mini oven is biased toward the front due to the door protruding to the front of the mini oven as much as the height of the door when the door is opened also identically apply to the device of Related Art Document 3.

Also, according to the configuration disclosed in Related Art Document 3, the inner space opened or closed by the front door and the inner space opened or closed by the top cover are spaces separated from each other and are not connected to each other.

That is, the fact that the front door and the top cover are opened together does not indicate that the degree of opening of the inner space opened by the front door is expanded, and opening the top cover only opens the inner space which can be opened only by opening the top cover.

Related Art Document 4 (U.S. Pat. No. 6,029,649) discloses an oven door structure installed in an oven provided in a cylindrical shape for opening and closing the oven.

According to Related Art Document 4, a door may be installed at a cylindrical body, and the door may rotate in a circumferential direction of the cylindrical body to open or close the body. The door may open or close the body by rotating around the circumference of the body without protruding to any of the front or rear of the body.

However, the device of Related Art Document 4 disclosing the above configuration has the following disadvantages.

First, the door disclosed in Related Art Document 4 has a disadvantage of having low compatibility because the door is only applicable to a structure in which a main body of a cooking appliance is formed in a cylindrical shape and is not applicable to a main body of a cooking appliance having a hexahedral shape which is generally widely used.

Second, it is difficult to install a structure for placing food such as a shelf inside the body disclosed in Related Art Document 4. Also, even when the structure such as a shelf is installed inside the body, due to the structure of the body, there are many difficulties in withdrawing and inserting the shelf.

Also, since opening and closing of the door is performed by the door rotating in the circumferential direction of the body, it is very difficult to apply a configuration in which withdrawal and insertion of the shelf is performed by interlocking with the opening and closing operations of the door.

Further, according to the structure of the door disclosed in Related Art Document 4, it is difficult for a manipulation switch to be disposed at a front surface or an upper surface of the cooking appliance. This is because most of the front surface and the upper surface of the body is covered by the door or within the range of rotation of the door. Accordingly, a configuration in which a manipulation switch such as a timer is disposed at a side surface of the body is disclosed in Related Art Document 4.

However, when the manipulation switch is disposed at the side surface of the cooking appliance instead of being disposed at the front surface or the upper surface of the cooking appliance, it is inconvenient for the user to check the state of the manipulation switch or operate the manipulation switch. Therefore, the form in which the manipulation switch is disposed in Related Art Document 4 is not considered desirable in terms of user convenience.

Also, none of Related Art Documents 1 to 4 discloses the form in which the manipulation switch is disposed in the door. In Related Art Documents 1 to 4, the manipulation switch is disposed in the main body.

Particularly, Related Art Documents 1 and 3 disclose a configuration in which the manipulation switch is disposed in the main body of the cooking appliance in such a way that the manipulation switch is disposed at an outer side of the door in the left-right direction. However, in such a configuration, a left-right width of the main body should be long as much as a space required for placing the manipulation switch, and there is a problem in that, while the overall size of the cooking appliance is increased accordingly, a width at which the cooking appliance is opened by the door is relatively narrowed.

Also, Related Art Document 2 discloses the configuration in which the manipulation switch is disposed at a lower portion of the main body of the cooking appliance. However, in such a configuration, since the position of the manipulation switch is low, it is inconvenient for the user to operate the manipulation switch. Also, according to the configuration disclosed in Related Art Document 2, an up-down length of the main body should be long as much as a space required for placing the manipulation switch, and there is a problem in that, while the overall size of the cooking appliance is increased accordingly, the width at which the cooking appliance is opened by the door is relatively narrowed.

Lastly, when the manipulation switch is disposed at a side surface of the cooking appliance as described above with reference to Related Art Document 4, it is inconvenient for the user to check the state of the manipulation switch or operate the manipulation switch.

In the configurations disclosed in Related Art Documents 1 to 4, it is difficult for the manipulation switch to be disposed in the door. According to the configurations disclosed in Related Art Documents 1 to 4, the see-through window is disposed in the door to secure the field of view that allows the user to view the inside of the cooking compartment. Since the see-through window occupies most of the region of the door, it is difficult to secure a space for installing the manipulation switch in the door.

Also, when the manipulation switch is disposed in the door, a control board electrically connected to the manipulation switch should also be disposed inside the door, but it is also difficult to secure a space for installing the control board in the door.

Therefore, for providing a configuration in which the manipulation switch is disposed in the door, the design of a configuration for solving the above problems is required.

RELATED ART DOCUMENT

Patent Document

Related Art Document 1: Japanese Patent Registration No. 6289602
Related Art Document 2: Korean Patent Publication No. 20-2011-0001565
Related Art Document 3: U.S. Pat. No. 6,271,502
Related Art Document 4: U.S. Pat. No. 6,029,649

SUMMARY OF THE INVENTION

These objects are solved by the subject-matter of the independent claim. Further advantageous embodiments and refinements are described in the respective dependent claims.

According to an aspect of the present disclosure, a cooking appliance comprises: a housing having a cooking compartment, which is surrounded by a bottom surface, both side surfaces, and a back surface of the housing, formed therein and having an upper surface and a front surface which are open; a door including a door upper surface part which covers the upper surface of the housing and a door front surface part which is connected to a front side of the door upper surface part and covers the front surface of the housing; and a heating part which generates heat inside the cooking compartment. The door may be rotatable about an axis parallel to an upper side or edge of the back part of the housing and/or an axis parallel to a rear side or edge of the door upper surface part.

Within the context of the present disclosure, the expression "bottom/side/back surface", may be understood as and substituted by the expression "bottom/side/back wall", "bottom/side/back plate" or "bottom/side/back portion", respectively.

The door upper surface part and the door front surface part may be connected to each other in an L-shape. The door may be formed in an L-shape. The door upper surface part and the door front surface part may be integrally formed.

The cooking appliance may further comprise an input part which may be disposed in the door front surface part and may control an operation of the heating part.

The cooking appliance may further comprise a first control board electrically connected to the input part. The first control board may be disposed in the door front surface part.

The input part may include at least one manipulation switch installed at an outer side of the door front surface part. The manipulation switch may be connected to the first control board by passing through the door front surface part.

The heating part may include a first heating part installed in the door upper surface part.

The first control board may be installed inside the door front surface part.

An inside of the door upper surface part and an inside of the door front surface part may be connected to each other.

The first heating part and the first control board may be electrically connected to each other through the inside of the door upper surface part and the inside of the door front surface part which may be connected to each other.

The cooking appliance may further comprise a see-through window disposed in the door upper surface part.

The see-through window may be formed including a pair of glasses disposed to be spaced a predetermined distance apart from each other in the up-down direction so that a space portion may be formed inside the see-through window.

The cooking appliance may further comprise a first control board disposed in the door front surface part.

A space portion which accommodates at least a portion of the input part and the first control board therein may formed in the door front surface part.

The space portion formed inside the door front surface part and the space portion formed inside the see-through window may be connected to each other.

An air intake port which opens the space portion inside the door front surface part to the outside may be formed at a lower end of the door front surface part An air exhaust port which opens the space portion inside the see-through window to the outside may be formed at a rear end of the door upper surface part.

The cooking appliance may further comprise a cooling fan which generates a flow of air which causes outside air to be introduced into the door through the air intake port and/or causes the air inside the door to be discharged through the air exhaust port.

The see-through window may include a pair of glasses disposed to be spaced a predetermined distance apart from each other in the up-down direction The first heating part may be disposed at each of a front outer side and a rear outer side of the see-through window.

The cooking appliance may further comprise cable mounting parts disposed at both outer sides of the see-through window.

A cable which connects the first control board and the first heating part to each other through the inside of the door upper surface part and the inside of the door front surface part which may be connected to each other may be installed at the cable mounting parts.

A power cable which supplies power to the first heating part and the first control board may be installed at any one of the cable mounting parts disposed at both outer sides of the see-through window.

A signal cable which transmits a control signal generated in the first control board to the first heating part may be installed at the other one of the cable mounting parts disposed at both outer sides of the see-through window.

The power cable and the signal cable may be disposed to be spaced apart from each other with the see-through window disposed therebetween.

The see-through window may be formed including a pair of glasses disposed to be spaced a predetermined distance apart from each other in the up-down direction so that a space portion may be formed inside the see-through window.

The cooking appliance may further comprise a door frame installed at a lower portion of the door upper surface part.

Any one of the pair of glasses may be installed in the door upper surface part.

The other one of the pair of glasses may be installed in the door frame.

The heating part may further include a first heating part disposed in the door.

The first heating part may be installed in the door frame.

The door may open and close the upper surface and the front surface of the housing by rotating about the rear side of the door upper surface part.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
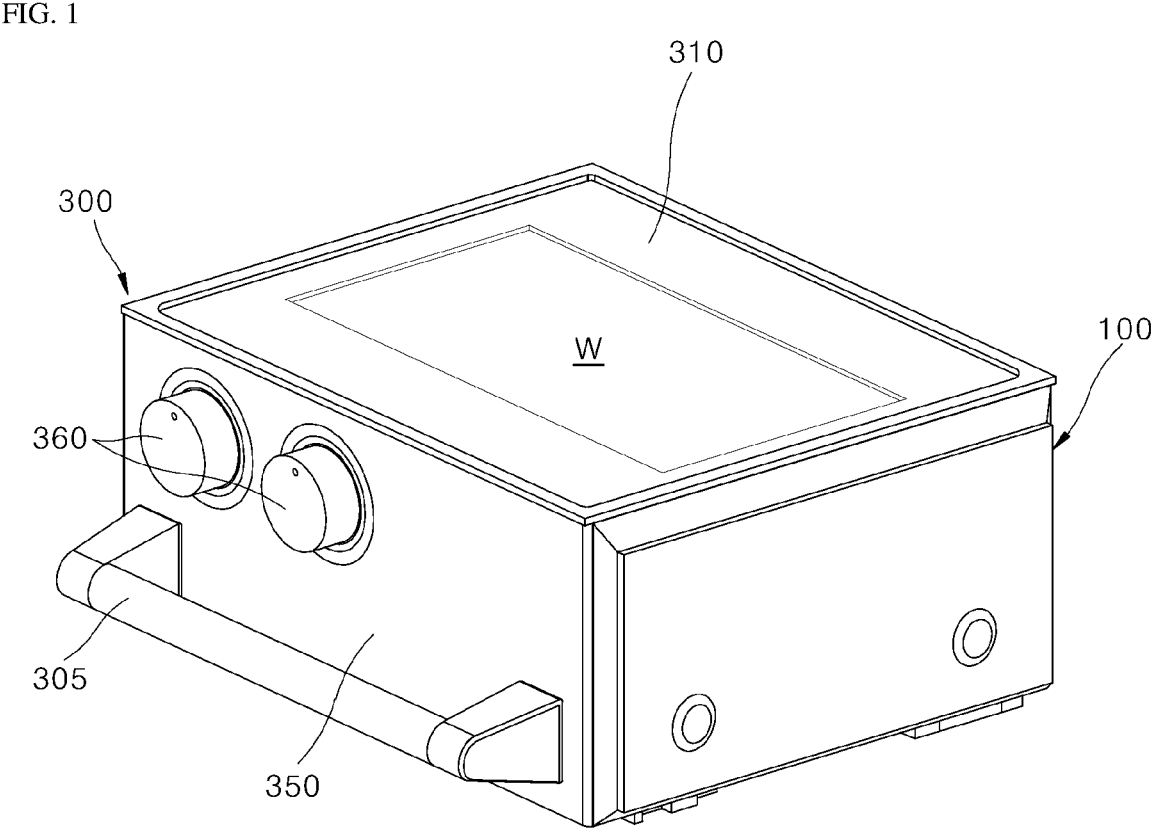
FIG. 1 is a perspective view illustrating a cooking appliance according to an embodiment of the present invention.

The above-mentioned objectives, features, and advantages will be described in detail with reference to the accompanying drawings, and accordingly, those of ordinary skill in the art to which the present invention pertains should be able to easily practice the technical idea of the present invention. In describing the present invention, when detailed description of known art related to the present invention is deemed as having a possibility of unnecessarily blurring the gist of the present invention, the detailed description will be omitted. Hereinafter, exemplary embodiments according to the present invention will be described in detail with reference to the accompanying drawings. Like reference numerals in the drawings refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present application, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise. An "up-down direction" may be understood as a vertical direction, and a "left-right direction" and a "front-rear direction" may be understood as horizontal directions, respectively, and are perpendicular to each other and perpendicular to the vertical direction, respectively.

[Overall Structure of Cooking Appliance]

Figure 2:
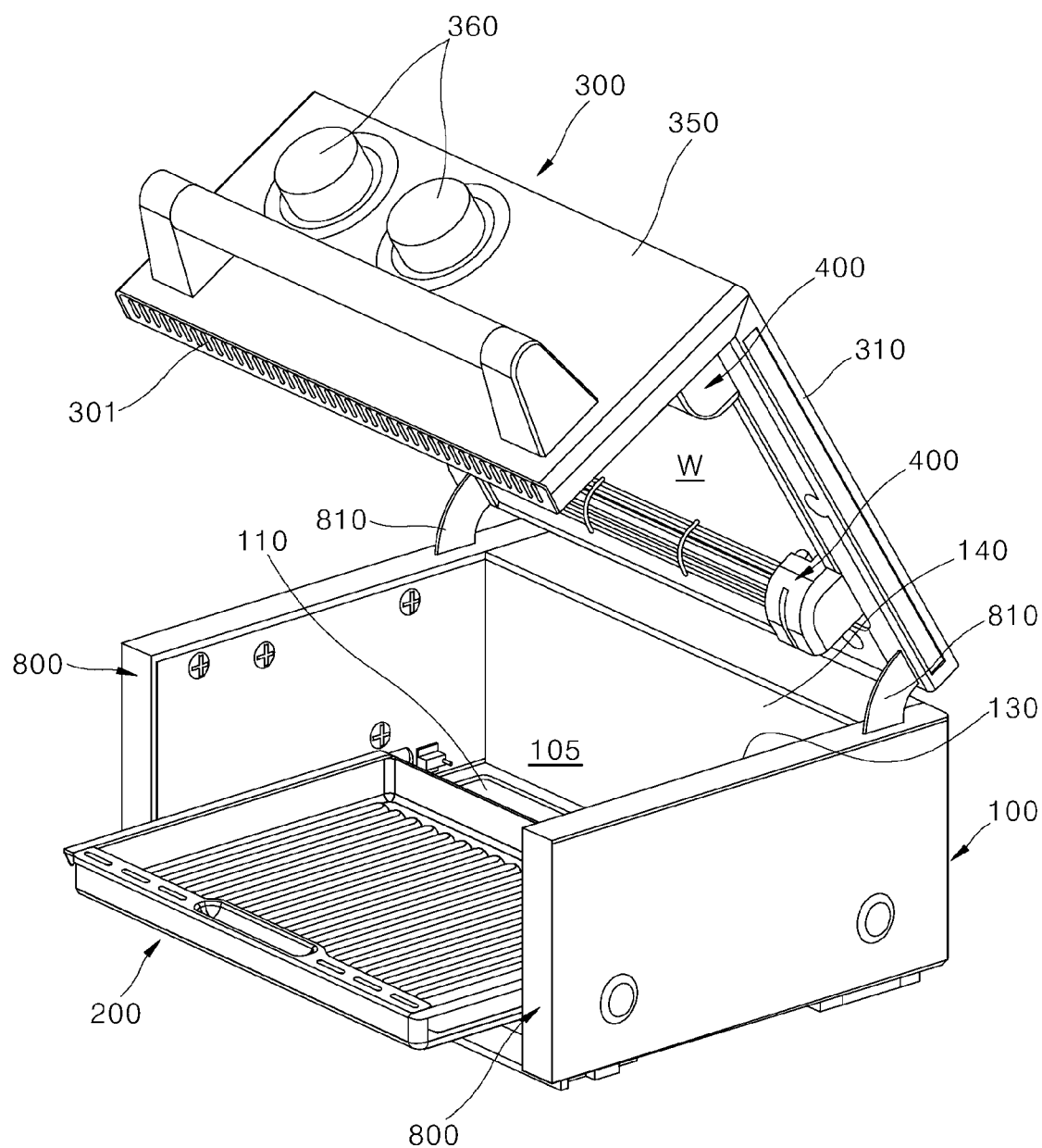
FIG. 2 is a perspective view illustrating a door-opened state of the cooking appliance illustrated in FIG. 1.
Figure 3:
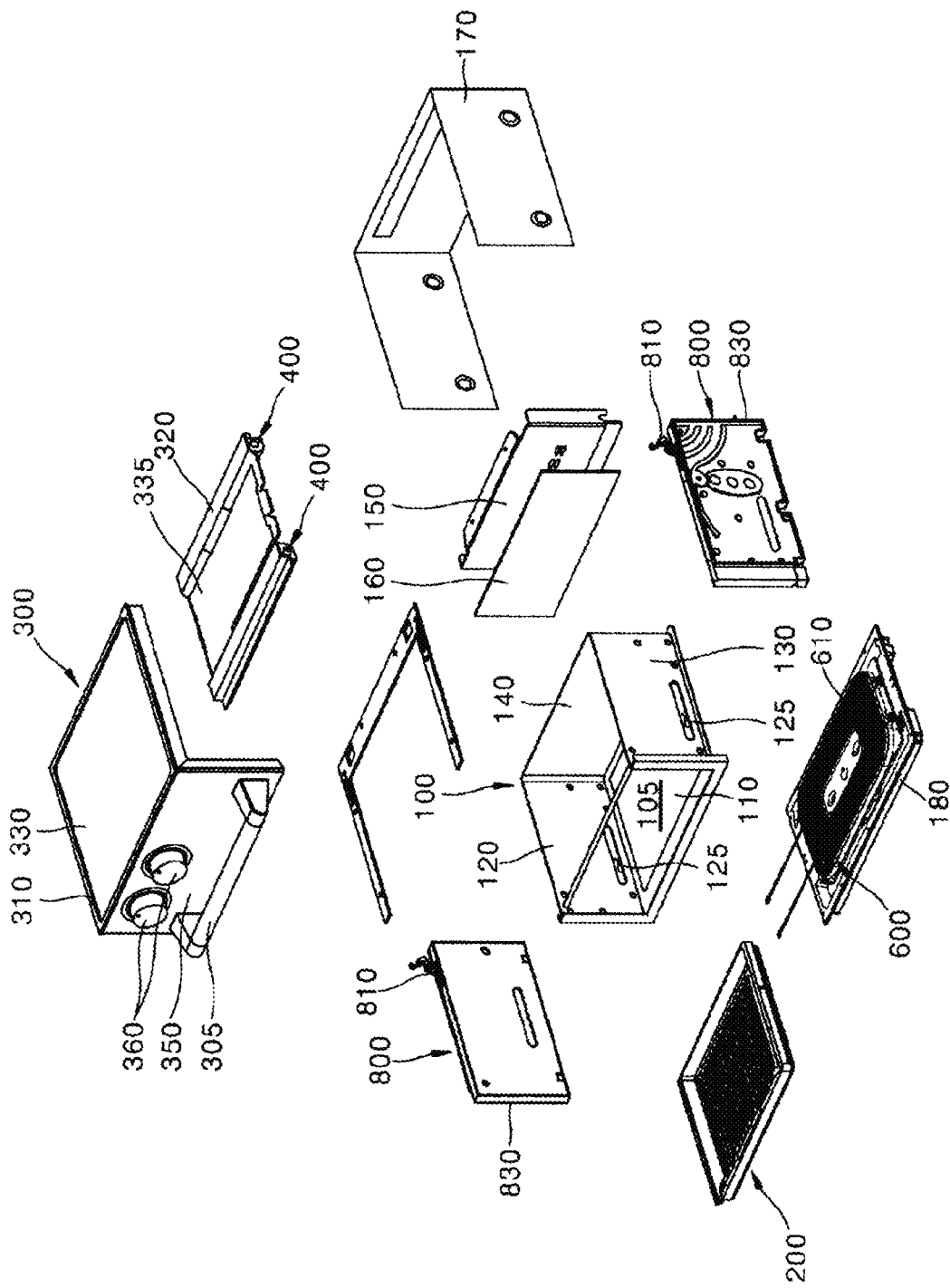
FIG. 3 is an exploded perspective view illustrating an exploded state of the cooking appliance illustrated in FIG. 1.

FIG. 1 is a perspective view illustrating a cooking appliance according to an embodiment of the present invention, FIG. 2 is a perspective view illustrating a door-opened state of the cooking appliance illustrated in FIG. 1, and FIG. 3 is an exploded perspective view illustrating an exploded state of the cooking appliance illustrated in FIG. 1.

Referring to FIGS. 1 to 3, the cooking appliance according to an embodiment of the present invention may include a housing 100, a door 300, a tray 200, and a heating part.

The housing 100 forms a frame of the cooking appliance according to the present embodiment. According to this, various components constituting the cooking appliance are installed in the housing 100, and a cooking compartment 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of side surfaces 120 and 130, and a back surface 140, has a space formed therein, and is provided in a form in which the upper surface and the front surface are open. The cooking compartment 105 surrounded by the bottom surface 110, the both side surfaces 120 and 130, and the back surface 140 of the housing 100 is formed inside the housing 100.

The tray 200 is disposed in the cooking compartment 105 formed inside the housing 100. The tray 200 is provided so that an object to be cooked is seated thereon. The tray 200 may be detachably installed inside the cooking compartment 105. Also, for convenience of a user, the tray 200 may be provided to be withdrawable to the front of the cooking compartment 105.

The tray 200 may be installed to be movable in a front-rear direction by interlocking with an operation of opening or closing the door 300, and the movement of the tray 200 in the front-rear direction may be guided by a hinge assembly 800 which will be described below. This will be described in detail below.

The door 300 is provided to open or close the open upper and front surfaces of the housing 100. In the present embodiment, the housing 100 forms an exterior of a bottom surface, side surfaces, and a back surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to an element which covers the open upper surface of the housing 100 when the door 300 closes the cooking compartment 105 inside the housing 100. Also, the door front surface part 350 forms a front surface of the door 300 and corresponds to an element which covers the open front surface of the housing 100 when the door 300 closes the cooking compartment 105.

In the present embodiment, the door 300 is illustrated as being formed in an L-shape. That is, in the door 300, the door upper surface part 310 forming the upper surface of the door 300 and the door front surface part 350 forming the front surface of the door 300 are formed in the form of being connected to each other in an L-shape. The door 300 formed in this way opens or closes the cooking compartment 105 as the door upper surface part 310 and the door front surface part 350 connected to each other in an L-shape rotate together when the door 300 rotates for opening or closing the cooking compartment 105.

The door 300 is rotatably installed at an upper portion of the housing 100 and is rotatably coupled to the housing 100 via the hinge assembly 800 installed at the housing 100. In this case, the hinge assembly 800 is disposed at each of both side portions of the housing 100, and a rear side of the door upper surface part 310 is rotatably coupled to the hinge assembly 800.

Also, a handle 305 may be provided at the front surface of the door 300, in particular the door front surface part 350, and a user may open or close the cooking compartment 105 by holding the handle 305 and rotating the door 300 in the up-down or vertical direction.

The heating part may be installed at the housing 100 or the door 300 and heat the tray 200 disposed in the cooking compartment 105. The heating part may include a first heating part 400 disposed at the door 300.

The first heating part 400 is installed at the door 300 such that, when the door 300 closes the cooking compartment 105, the first heating part 400 is accommodated inside the cooking compartment 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated on the tray 200 from an upper portion of the tray 200. In other words, the first heating part 400 may heat the object to be cooked from the top.

Further, the heating part may include a second heating part 600. In the present embodiment, the heating part is illustrated as including both the first heating part 400 and the second heating part 600, but the present invention is not limited thereto. As another example, the heating part may only include the first heating part 400 or only include the second heating part 600. In this way, various embodiments may be possible regarding the heating part.

The second heating part 600 is installed at the housing 100 such that the second heating part 600 is disposed at a lower portion of the tray 200, in particular below the tray 200. The second heating part 600 is provided in the form of a heating part which heats the tray 200 using a different heating method from the first heating part 400, e.g., an induction heating part.

The second heating part 600 may be provided in the form including a working coil 610 installed at a lower portion of the bottom surface 110 of the housing 100 and may induce heating of the tray 200 from the lower portion of the tray 200. To this end, the tray 200 may be formed of a material which may be inductively heated by the second heating part 600. The second heating part 600 may heat the object to be cooked which is seated on the tray 200 from the lower portion of the tray 200 and/or from below the tray 200.

In summary, the cooking appliance according to the present embodiment includes the housing 100 in which the cooking compartment 105 is formed, the door 300 provided to be able to simultaneously open the front and the top of the cooking compartment 105, the first heating part 400 provided to be able to heat the inside of the cooking compartment 105 from the top, and the second heating part 600 provided to be able to inductively heat the tray 200 from below inside the cooking compartment 105, wherein the withdrawal and insertion of the tray 200 may be performed by interlocking with the operation of opening or closing the door 300.

Detailed descriptions of the above-mentioned elements and other elements not mentioned yet will be sequentially given below.

[Structure of Housing]

Figure 4:
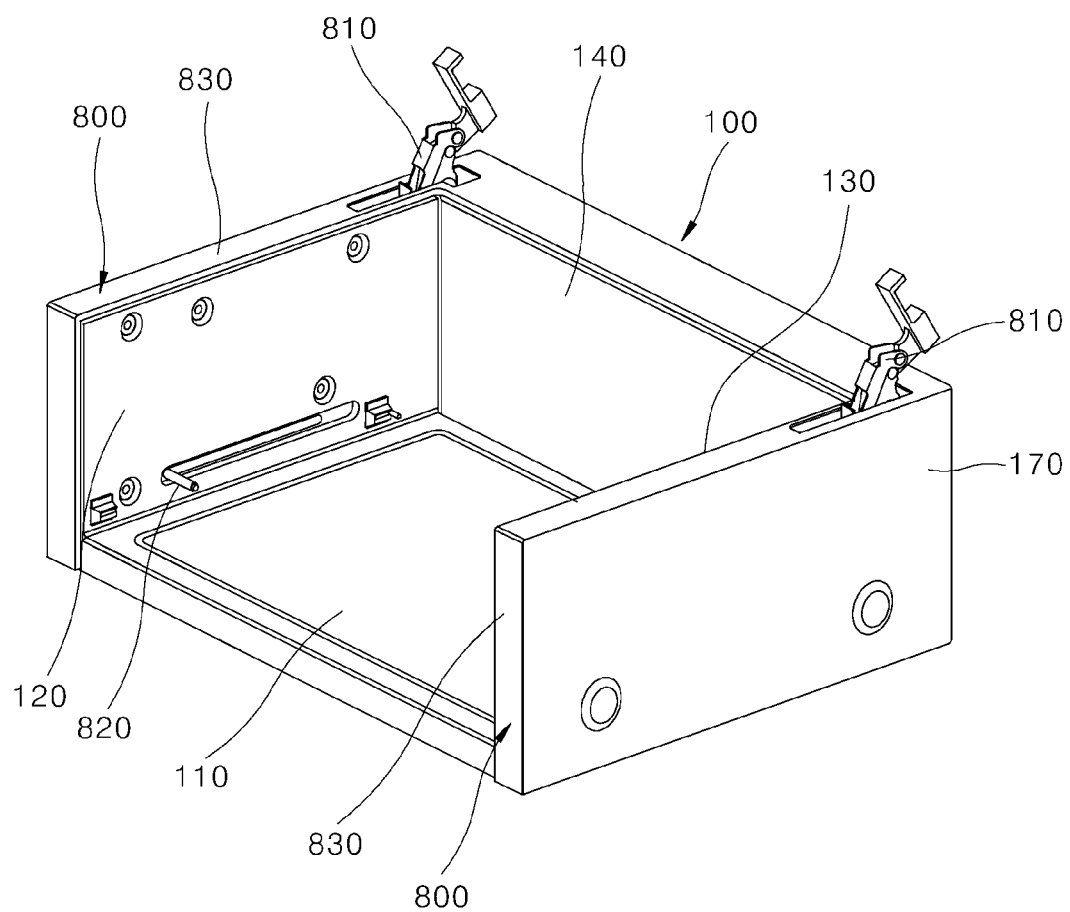
FIG. 4 is a perspective view separately illustrating a housing and a hinge assembly illustrated in FIG. 1.

FIG. 4 is a perspective view separately illustrating a housing and a hinge assembly illustrated in FIG. 1.

Referring to FIGS. 3 and 4, as described above, the housing 100 includes the bottom surface 110, the pair of side surfaces 120 and 130, and the back surface 140, has the space formed therein, and is provided in the form in which the upper surface and the front surface are open.

The cooking compartment 105 may be formed in the inner space surrounded by the bottom surface 110, the both side surfaces 120 and 130, and the back surface 140 of the housing 100, and the tray 200 may be installed in the cooking compartment 105 so as to be withdrawable therefrom.

Also, the second heating part 600 may be installed at a lower portion of the housing 100, in particular the lower portion of the bottom surface 110 of the housing 100, and an electronic component, e.g., a second control board 700 which will be described below, related to operation of the second heating part 600 may be installed a rear of the housing 100, in particular at the rear of the back surface 140 of the housing 100.

Further, the hinge assembly 800 may be installed at outer sides of the both side surfaces 120 and 130 of the housing 100, and the door 300 may be rotatably installed at the housing 100 by being coupled to the hinge assembly 800 installed as above.

For example, the housing 100 may be manufactured in the form in which a metal plate is bent in an angular U-shape and the bent metal plate forms the bottom surface and the both side surfaces of the housing 100. When the housing 100 is manufactured in this form, the bottom surface 110 of the housing 100 may be integrally connected to the both side surfaces 120 and 130 thereof without joints.

In this way, not only the esthetic sense of the inside of the cooking compartment 105 is improved, but also it is possible to obtain an advantageous effect of preventing the occurrence of contamination of the second heating part 600 due to foreign substances being stuck in a gap between the bottom surface 110 of the housing 100 and the both side surfaces 120 and 130 thereof or foreign substances being withdrawn through the gap.

As another example, the housing 100 may be manufactured in the form in which a left protruding portion and a right protruding portion of a metal plate having an upside down T-shape are folded upward to form the bottom surface 110 and the both side surfaces 120 and 130 of the housing 100 and a rear side protruding portion of the metal plate is folded upward to form the back surface 140 of the housing 100. When the housing is manufactured in this form, the bottom surface 110, the both side surfaces 120 and 130, and the back surface 140 of the housing 100 may be integrally formed without joints between the bottom surface 110 and the both side surfaces 120 and 130 of the housing 100 and between the bottom surface 110 and the back surface 140 of the housing 100.

In this way, when viewed from the front and top, the joints inside the cooking compartment 105 are almost not visible and an inner side surface of the cooking compartment 105 may be maintained as a smooth flat surface. As a result, not only the esthetic sense of the inside of the cooking compartment 105 is further improved, but also it is possible to obtain an advantageous effect of facilitating the removal of contaminants from the inner side surface of the cooking compartment 105.

Meanwhile, the bottom surface 110 of the housing 100 may be formed including ceramic glass, and the ceramic glass may be formed in the shape of a rectangular flat plate having a predetermined thickness.

For example, the ceramic glass may be disposed at a cut central portion of the bottom surface 110 formed of a metal material, and the ceramic glass may be disposed between the second heating part 600 and the tray 200.

Also, a back surface case 150 which accommodates the second control board 700 which will be described below is disposed at the rear of the back surface 140 of the housing 100. The second control board 700 is accommodated in the back surface case 150 and installed at the rear of the housing 100, and an insulating plate 160 is disposed between the back surface 140 of the housing 100 and the back surface case 150.

The insulating plate 160 serves to block transfer of hot air of the inside of the cooking compartment 105 to the second control board 700 via the back surface 140 of the housing 100 and insulate the housing 100 and the back surface case 150, in which the second control board 700 is installed, from each other.

Further, the housing 100 of the present embodiment may further include a cabinet 170. The cabinet 170 is provided to cover the both side surfaces 120 and 130 and the back surface 140 of the housing 100. The cabinet 170 may surround and protect the hinge assembly 800 installed at the both side surfaces 120 and 130 of the housing 100 and the second control board 700 installed at the back surface 140 of the housing 100 from the outside and form an exterior of the side portions and the rear of the cooking appliance.

[Structure of Door]

Figure 5:
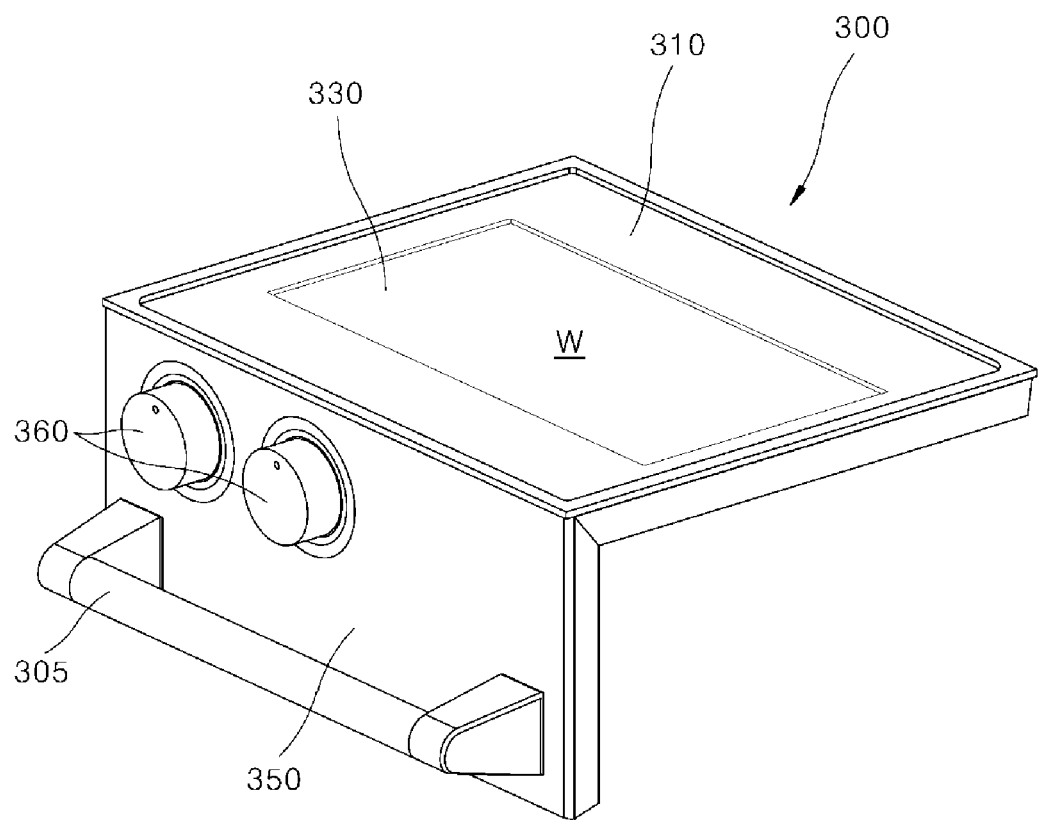
FIG. 5 is a perspective view separately illustrating a door according to an embodiment of the present invention.
Figure 6:
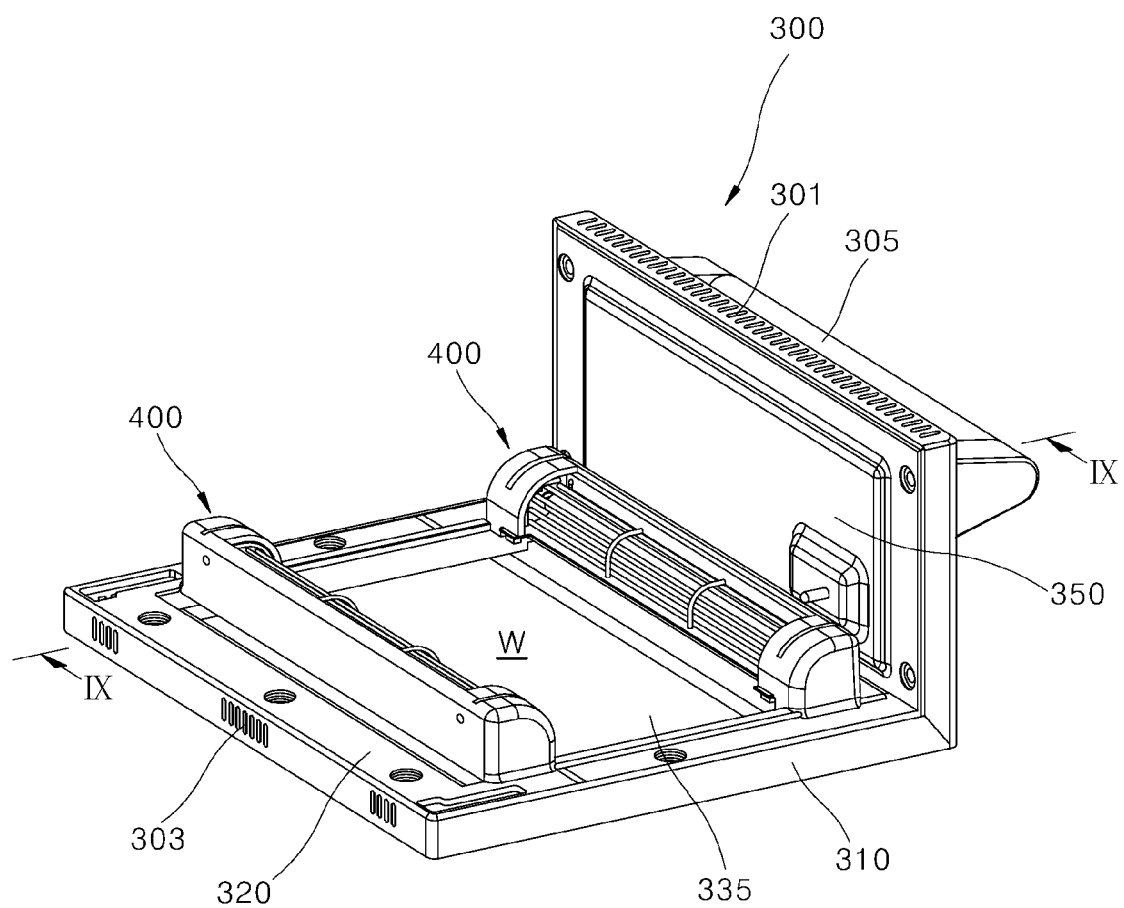
FIG. 6 is a bottom perspective view illustrating a bottom surface side of the door illustrated in FIG. 5.
Figure 7:
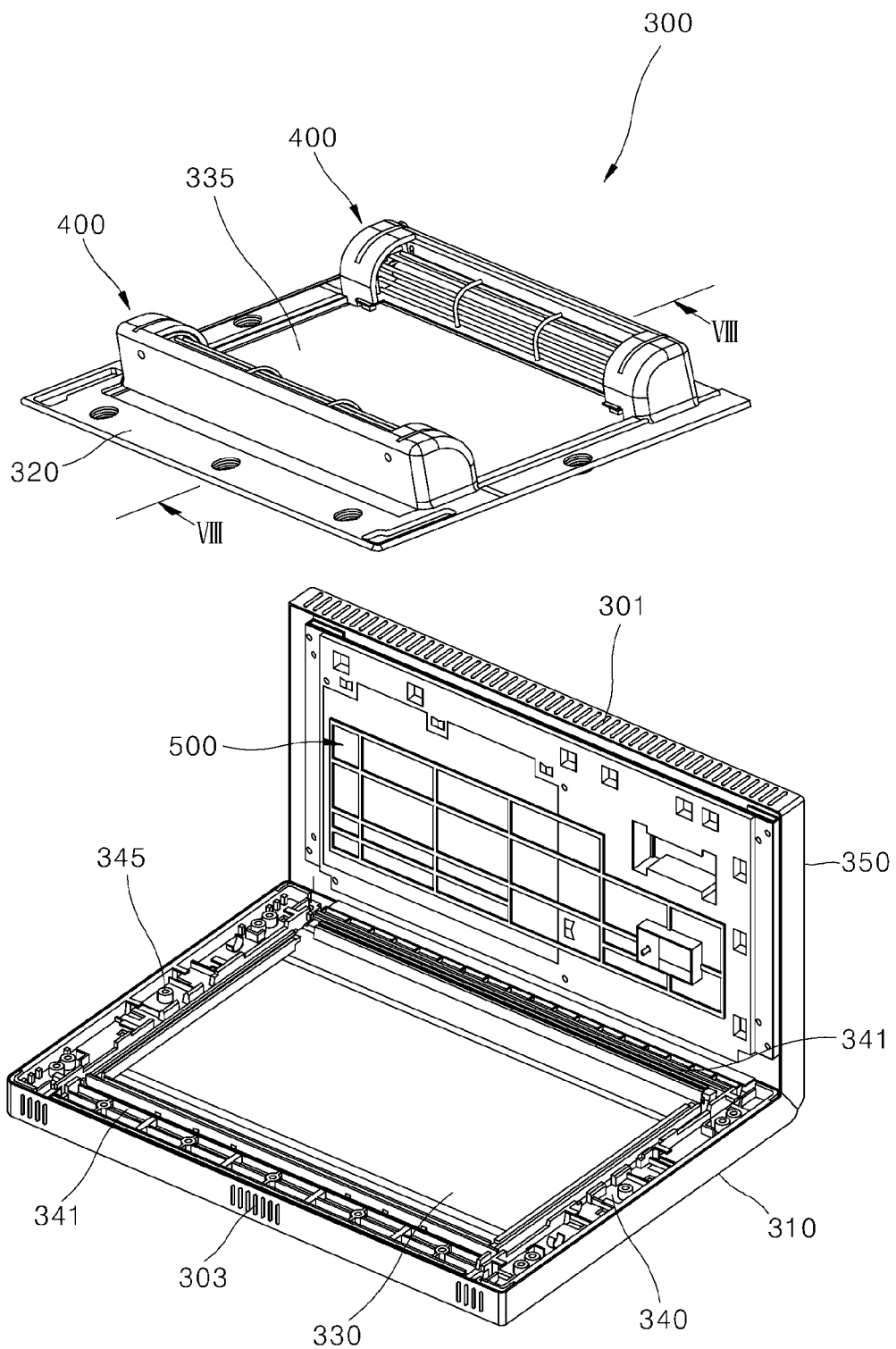
FIG. 7 is an exploded perspective view illustrating configuration of the door illustrated in FIG. 6 in an exploded manner.
Figure 8:
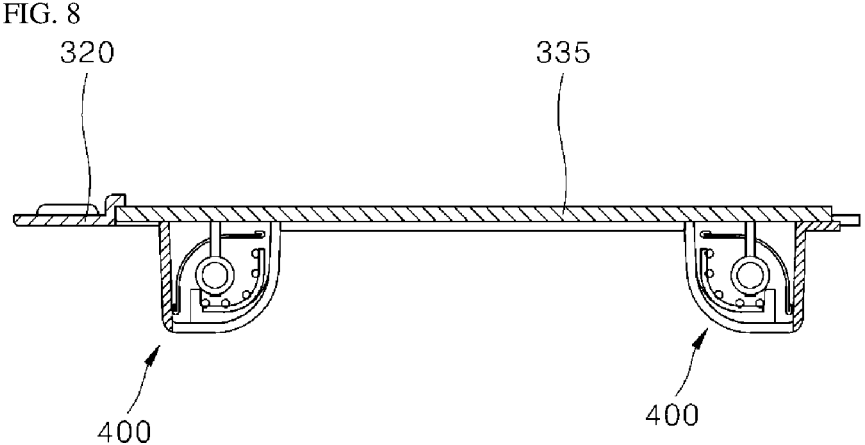
FIG. 8 is a cross-sectional view taken along line "VIII-VIII" of FIG. 7.
Figure 9:
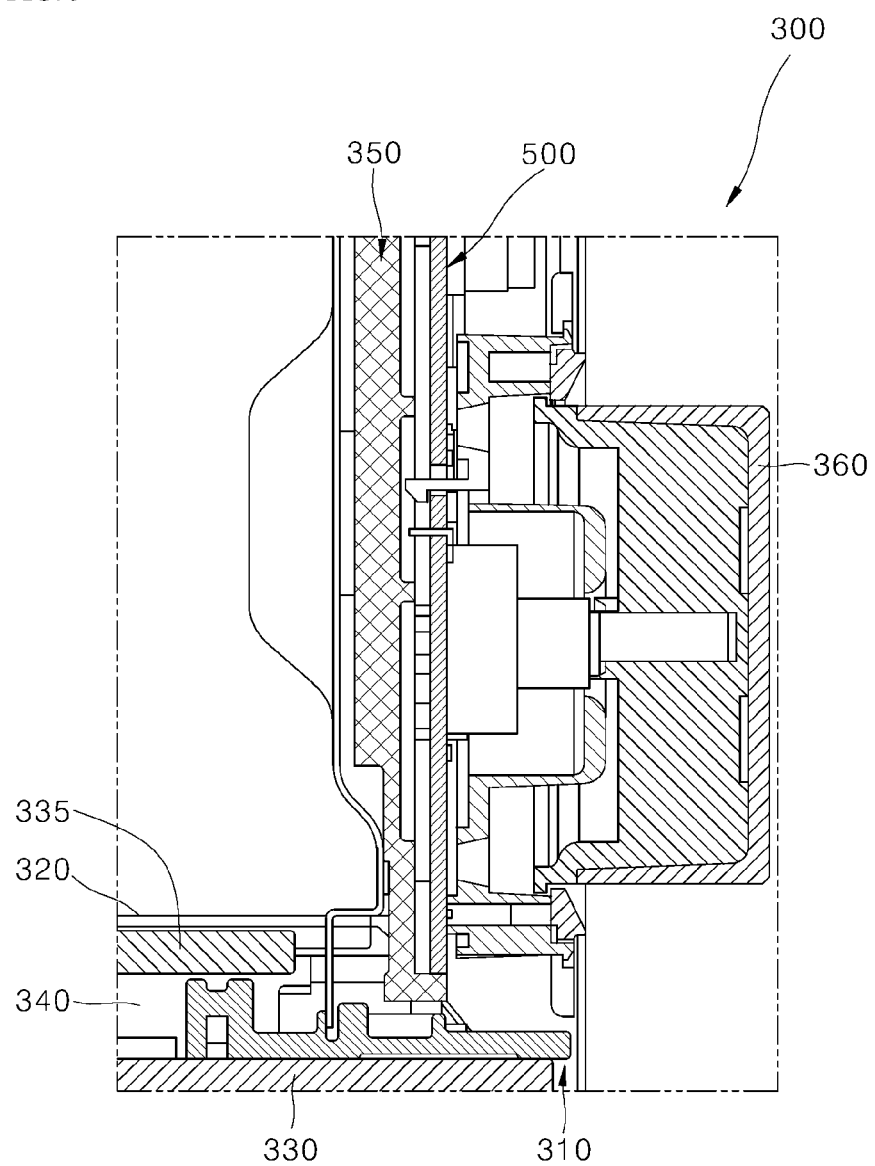
FIG. 9 is a cross-sectional view taken along line "IX-IX" of FIG. 6.
Figure 10:
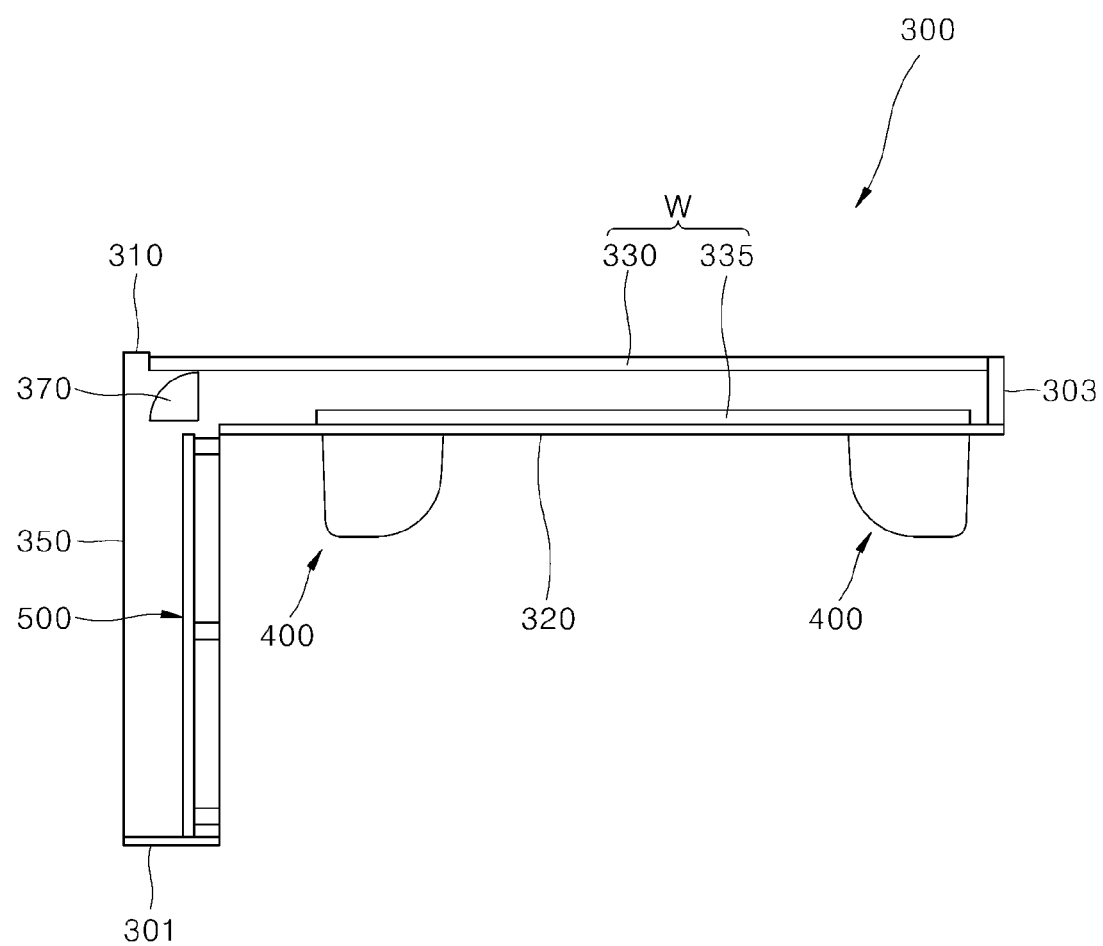
FIG. 10 is a cross-sectional view schematically illustrating a flow of air inside the door according to an embodiment of the present invention.

FIG. 5 is a perspective view separately illustrating a door according to an embodiment of the present invention, and FIG. 6 is a bottom perspective view illustrating a bottom surface side of the door illustrated in FIG. 5. Also, FIG. 7 is an exploded perspective view illustrating configuration of the door illustrated in FIG. 6 in an exploded manner, and FIG. 8 is a cross-sectional view taken along line "VIII-VIII" of FIG. 7. Also, FIG. 9 is a cross-sectional view taken along line "IX-IX" of FIG. 6, and FIG. 10 is a cross-sectional view schematically illustrating a flow of air inside the door according to an embodiment of the present invention.

Referring to FIGS. 5 to 9, the door 300 is provided in the form in which the door upper surface part 310 forming the upper surface of the door 300 and the door front surface part 350 forming the front surface of the door 300 may be integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction.

The see-through window W may be formed including a pair of glasses 330 and 335 which are disposed to be spaced a predetermined distance apart from each other in the up-down direction so that a space portion, also referred to as a "separation space" or simply "space" is formed inside the see-through window W. For example, of the glasses 330 and 335, the glass 330 (hereinafter referred to as "first glass") may be installed at the door upper surface part 310, and the other glass 335 (hereinafter referred to as "second glass") may be installed at the door frame 320.

A through-hole may be formed in each of the door upper surface part 310 and the door frame 320. The through-holes may be formed at the center of the door upper surface part 310 in the planar direction and at the center of the door frame 320 in the planar direction.

According to the present embodiment, the first glass 330 is installed in the door upper surface part 310 in such a way that the through-hole formed in the door upper surface part 310 is covered by the first glass 330 from the top, and the second glass 335 is installed in the door frame 320 in such a way that the through-hole formed in the door frame 320 is covered by the second glass 335 from the top.

The first glass 330 and the second glass 335 may be formed of glass formed of a transparent or translucent material. The see-through window W may be formed at portions of the through-holes covered by the first glass 330 and the second glass 335.

The user may view the inside of the cooking compartment 105 from the top through the see-through window W formed as above, and in this way, a cooking state of food inside the cooking compartment 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering the posture or bending the waist forward.

Further, the pair of glasses 330 and 335 forming the see-through window W are coupled to different elements, that is, one is coupled to the door upper surface part 310 and the other is coupled to the door frame 320, and are disposed to be spaced a predetermined distance apart from each other. Accordingly, a separation space between the two glasses 330 and 335 is formed inside the see-through window W.

For example, since the first glass 330 is installed at an upper portion of the door upper surface part 310, and the second glass 335 is installed at the door frame 320, the first glass 330 and the second glass 335 may be spaced apart from each other by at least a thickness of the door upper surface part 310.

That is, between the first glass 330 and the second glass 335 forming the see-through glass W, a separation space may be formed at least as much as the thickness of the door upper surface part 310. In this way, the separation space between the two glasses 330 and 335 may be formed inside the see-through window W. Also, air may be introduced into the separation space formed as above, and the air introduced into the separation space in this way may form an air layer in the separation space.

The air layer formed in the separation space formed as above serves to block transfer of heat, which has heated the second glass 335 directly exposed to the cooking compartment 105, to the first glass 330 disposed at the outermost side.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Further, the through-hole formed in the door upper surface part 310 may be formed by a width narrower than that of the through-hole formed in the door frame 320. Also, the through-hole formed in the door upper surface part 310 may be formed to be disposed in an inner side region of the through-hole formed in the door frame 320 when viewed from the top.

That is, the through-hole formed in the door upper surface part 310 may be formed such that, when viewed from the top, an inner side edge of the door frame 320 is not exposed through the see-through window W. In this case, since the door frame 320 may not be exposed through the see-through window W, there is an advantage in terms of aesthetics.

Meanwhile, the first heating part 400 is installed at the door upper surface part 310 in such a way that the first heating part 400 is disposed in a region not exposed through the see-through window W when viewed from the top. The first heating part 400 is disposed at a front outer side and a rear outer side of the see-through window W on a plane in a horizontal direction formed by the door upper surface part 310. In other words, the first heating part 400 may be disposed at outer sides of the through-holes formed in the door upper surface part 310 and the door frame 320. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable, a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed in the form extending downward from a front end portion or front portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

An input part 360 and a first control board 500 may be disposed in the door front surface part 350. In the present embodiment, a space portion is illustrated as being formed inside the door front surface part 350. In the space portion, at least a portion of the input part 360 and the first control board 500 may be accommodated.

The input part 360 may be formed including various manipulation switches for controlling and manipulating operation of the cooking appliance according to the present embodiment. For example, the input part 360 may be formed including a manipulation switch for controlling on/off states or thermal power of the first heating part 400, a manipulation switch for controlling on/off states or thermal power of the second heating part 600, a timer manipulation switch for controlling operation time of the first heating part 400 or the second heating part 600 (see FIG. 3), and the like. The input part 360 may be provided to be exposed at the front surface of the door front surface part 350, and the user may directly manipulate the input part 360 to control operation of the cooking appliance.

The first control board 500 is installed inside the door front surface part 350. Various elements and circuits related to reception of manipulation signals input via the input part 360, generation of control signals for controlling operations of the first heating part 400 and the second heating part 600, and the like are provided in the first control board 500.

The first control board 500 is required to be electrically connected to the input part 360, the first heating part 400, and the second heating part 600. The first control board 500 is disposed in the door front surface part 350 like the input part 360 and is disposed at a position very close to the input part 360. The first control board 500 is disposed at a position which is also very close to the first heating part 400 disposed on the door 300.

According to the present embodiment, the input part 360 may be electrically connected to the first control board 500 in the form of being directly mounted on the first control board 500, and the first heating part 400 may be electrically connected to the input part 360 and the first control board 500 via a cable installed through the inside of the door front surface part 350 and the inside of the door upper surface part 310 which are connected to each other That is, since the first control board 500, the input part 360, and the first heating part 400 which have to be electrically connected to one another are disposed at positions very close and spatially connected to one another, not only is it possible to easily and promptly perform a task for electrically connecting the first control board 500, the input part 360, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down or vertical direction, in such a way that the cable mounting parts 340 and 345 are disposed at outer portions, in particular both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a square shape or frame shape surrounding the see-through window W from the outside.

An assembly of the cable mounting parts 340 and 345 and the connecting members 341 provided as above is installed in the door upper surface part 310 in the form of being inserted into the space portion formed between the door upper surface part 310 and the door frame 320.

The space portion of the door upper surface part 310, in particular the inside of the door upper surface part 310, in which the cable mounting parts 340 and 345 are installed as described above is connected to the space portion of the door front surface part 350, in particular the inside of the door front surface part 350. Also, cables C1 and C2 which connect the first control board 500 and the first heating part 400 through the inside of the door upper surface part 310 and the inside of the door front surface part 350, which are connected to each other, are installed at the cable mounting parts 340 and 345 installed in the door upper surface part 310.

A power cable C2 which supplies power to the first heating part 400 and the first control board 500 may be installed at any one of the cable mounting parts 340 and 345 disposed at both outer sides of the see-through window W. Also, a signal cable C1 which transmits a control signal generated in the first control board 500 to the first heating part 400 may be installed at the other one of the cable mounting parts 340 and 345 disposed at both outer sides of the see-through window W.

That is, in the door 300, the first heating part 400 is disposed at both sides of the see-through window W in the front-rear direction, and the power cable C2 and the signal cable C1 are disposed at both sides of the see-through window W in the left-right direction.

The arrangement structure of the first heating part 400, the power cable C2, and the signal cable C1 is a result of designing in consideration of the arrangement structure of the first heating part 400 and the hinge assembly 800.

According to the present embodiment, each first heating part 400 is disposed in the form in which a heating element thereof extends longitudinally in the left-right direction. Also, the hinge assembly 800 (see FIG. 2) is disposed at both sides of the see-through window W in the left-right direction.

Figure 21:
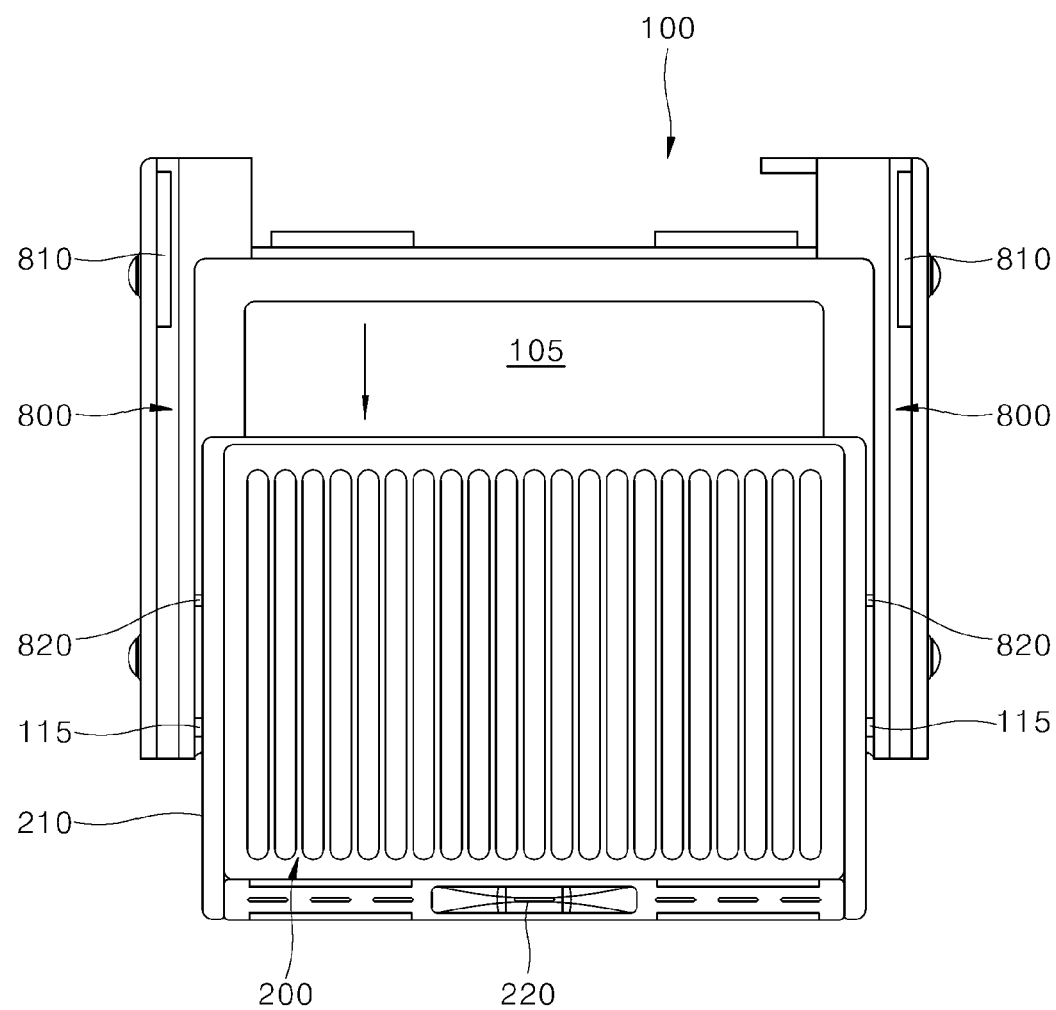
FIG. 21 is a cross-sectional view taken along line "XXI-XXI" of FIG. 20.

The power cable C2 and the signal cable C1 are not only connected to the elements disposed in the door 300 such as the first heating part 400 and the first control board 500, but also connected to the elements disposed in the housing 100 such as the second control board 700 (see FIG. 21).

In order to pass through a portion between the door 300 and the housing 100 with the least possible exposure to the outside, the power cable C2 and the signal cable C1 may pass through the portion in which the hinge assembly 800 is disposed, which is the only connecting portion between the door 300 and the housing 100.

For example, sections of the power cable C2 and the signal cable C1 connecting the housing 100 and the door 300 to each other may be disposed in the form of passing through the inside of the hinge assembly 800. In this way, exposure of the power cable C2 and the signal cable C1 to the outside of the cooking appliance may be suppressed in a section between the housing 100 and the door 300, and the power cable C2 and the signal cable C1 may be protected from the risk of damage.

Further, considering that the heating element of the first heating part 400 extends longitudinally in the left-right direction, the power cable C2 and the signal cable C1 may be disposed at the farthest possible side from the heating element and disposed to extend in a direction different from a direction in which the heating element extends.

This is a result of designing to avoid an influence of heat generated in the first heating part 400 on the power cable C2 and the signal cable C1. Also, considering that a plurality of first heating parts 400 are disposed to be spaced apart from each other in the front-rear direction, a structure in which the power cable C2 and the signal cable C1 are disposed at both sides of the first heating parts 400 in the left and right direction may be advantageous for connecting the first heating parts 400 using the power cable C2 and the signal cable C1.

Also, in the present embodiment, the power cable C2 and the signal cable C1 may be disposed to be spaced apart from each other in the left-right direction with the see-through window W disposed therebetween and may be installed at the cable mounting parts 340 and 345 different from each other.

In this case, the power cable C2 passes through the inside of any one of the hinge assemblies 800 disposed at both side surfaces of the housing 100 and is installed at the cable mounting parts 340 and 345 adjacent thereto. Also, the signal cable C1 passes through the inside of the other one of the hinge assemblies 800 disposed at both side surfaces of the housing 100 and is installed at the cable mounting parts 340 and 345 adjacent thereto.

For example, the power cable C2 may pass through the inside of the hinge assembly 800 disposed at the left side of the housing 100 and be installed at the cable mounting parts 340 and 345 disposed at the left side of the door 300. Also, the signal cable C1 may pass through the inside of the hinge assembly 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

[Cooling Structure Inside Door]

FIG. 10 is a cross-sectional view schematically illustrating a flow of air inside the door according to an embodiment of the present invention.

Referring to FIG. 10, a space portion is formed inside each of the door upper surface part 310 and the door front surface part 350. Particularly, a space portion is formed between the pair of glasses 330 and 335, which are disposed to be spaced a predetermined distance apart from each other in the up-down direction, inside the see-through window W installed in the door upper surface part 310. Also, the space portion inside the door upper surface part 310 including the see-through window W and the space portion inside the door front surface part 350 are connected to each other.

An air intake port 301 is formed at a lower end of the door front surface part 350. The air intake port 301 is formed to pass through the lower end of the door front surface part 350 and forms a passage which opens the space portion inside the door front surface part 350 to the outside on the door front surface part 350.

An air exhaust port 303 may be formed at a rear end of the door upper surface part 310. The air exhaust port 303 may be formed to pass through the rear end of the door upper surface part 310 and forms a passage which opens the space portion inside the door upper surface part 310 to the outside on the door upper surface part 310.

Further, the cooking appliance of the present embodiment may further include a first cooling fan disposed inside the door 300. The first cooling fan may be installed inside the door upper surface part 310 or inside the door front surface part 350. In the present embodiment, the first cooling fan is illustrated as being installed in the space portion inside the door front surface part 350.

Since the see-through window W, the first heating part 400, and the like are installed in the door upper surface part 310, available space in the door upper surface part 310 is insufficient. In contrast, since components which account for a large volume are not disposed in the door front surface part 350 except for the first control board 500, the door front surface part 350 has a relatively sufficient available space than the door upper surface part 310. As a result of designing in consideration of such an aspect, the first cooling fan may be installed inside the door front surface part 350.

The first cooling fan provided as above generates a flow of air which causes outside air to be introduced into the door 300 via the air intake port 301 and causes air inside the door to be discharged via the air exhaust port 303.

By the flow of air generated by the first cooling fan as above, the outside air is introduced into the door front surface part 350 via the air intake port 301, and the outside air introduced into the door front surface part 350 cools the first control board 500. Also, the air which has cooled the first control board 500 is introduced into the door upper surface part 310, passes through the space portion inside the see-through window W, and then is discharged to the outside of the door 300 via the air exhaust port 303.

During operation of the cooking appliance, the temperature of the first control board 500 is at a level significantly lower than the temperature of the see-through window W heated by the first heating part 400. Therefore, the air which has cooled the first control board 500 after being introduced into the door 300 via the air intake port 301 may pass through the inside of the see-through window W while the temperature of the air is sufficiently low for cooling the see-through window W. Therefore, the cooling of the first control board 500 and the cooling of the see-through window W may be sufficiently efficiently performed by the flow of air generated by the first cooling fan.

By the cooling structure inside the door 300 formed as above, the occurrence of overheating and deterioration of the components inside the door 300 such as the first control board 500 is suppressed. In this way, the occurrence of breakdown of the cooking appliance, deterioration of performance of the cooking appliance, etc. may be effectively suppressed.

Also, since the cooling air passing through the inside of the door 300 blocks heat transfer between the pair of glasses 330 and 335 constituting the see-through window W and suppresses the occurrence of overheating of the see-through window W, the occurrence of accidents in which a user suffers an injury such as a burn due to coming into contact with the see-through window W may be effectively reduced.

[Tray Withdrawal Structure]

Figure 11:
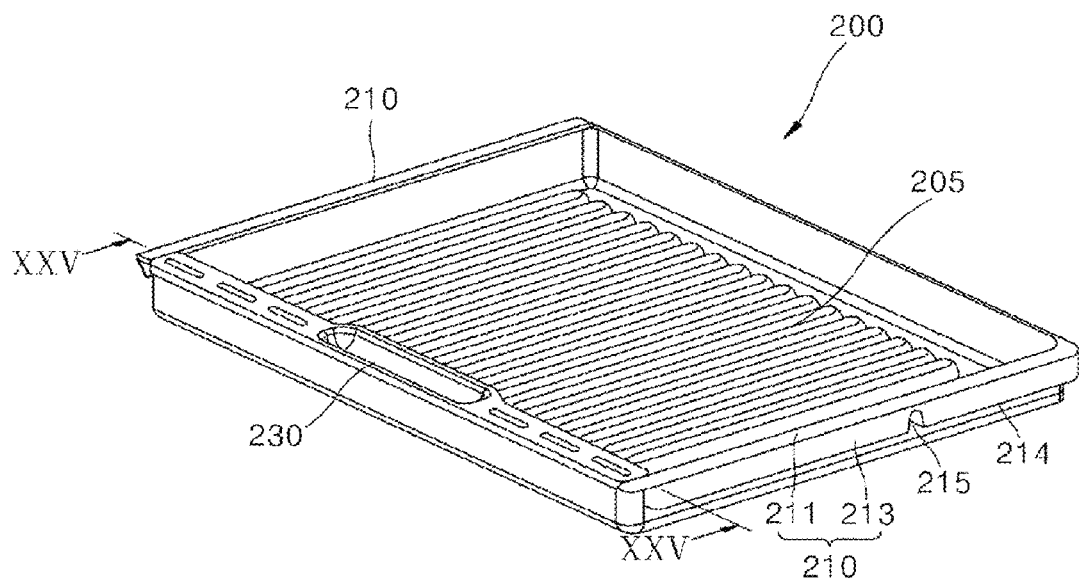
FIG. 11 is a perspective view illustrating a tray according to an embodiment of the present invention.
Figure 12:
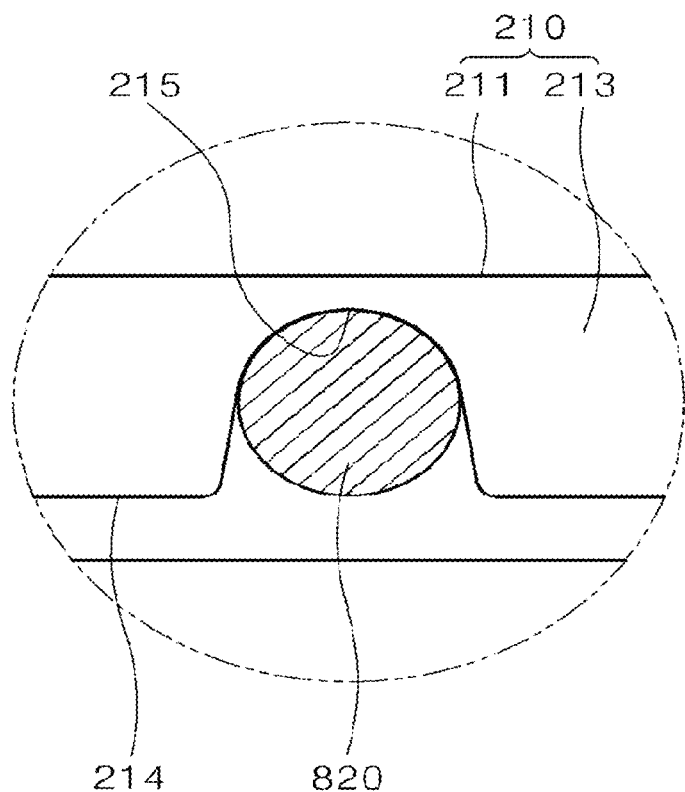
FIG. 12 is a cross-sectional view schematically illustrating a coupling structure between the tray illustrated in FIG. 11 and a mounting protrusion.

FIG. 11 is a perspective view illustrating a tray according to an embodiment of the present invention, and FIG. 12 is a cross-sectional view schematically illustrating a coupling structure between the tray illustrated in FIG. 11 and a mounting protrusion.

Referring to FIGS. 2 and 3 and FIGS. 11 and 12, the tray 200 is disposed in the cooking compartment 105 formed inside the housing 100. The tray 200 may be installed to be movable in the front-rear direction by interlocking with an operation of opening or closing the door 300, and the movement of the tray 200 in the front-rear direction may be guided by the hinge assembly 800.

The tray 200 may be formed including a tray main body 205 and a mounting part 210.

The tray main body 205 has a bottom surface formed in a shape corresponding to the bottom surface 110 of the housing 100. In the present embodiment, the tray main body 205 is illustrated as being formed in the shape of a box which has an open upper portion and is flat in the up-down direction. The bottom surface of the tray main body 205 is formed in a shape corresponding to the bottom surface 110 of the housing 100, e.g., the shape of a quadrilateral plate, and four side surfaces of the tray 200 are formed in the form of extending in upward from edges of the bottom surface of the tray 200.

The mounting part 210 is provided at each of a pair of side surfaces facing both side surfaces of the housing 100 in the left-right or horizontal direction among the four side surfaces of the tray 200. The mounting part 210 may be formed including a first protrusion 211 protruding toward the outside of the tray 200 from an upper end portion of the side surface of the tray 200 and a second protrusion 213 extending downward from an outer end portion of the first protrusion 211. For example, the mounting part 210 may be formed in the form in which the first protrusion 211 and the second protrusion 213 are connected to each other in an L-shape.

The hinge assembly 800 interlocks with rotation of the door 300 and causes the tray 200 to be withdrawn forward from the inside of the cooking compartment 105 when the door is opened. Also, the hinge assembly 800 may interlock with the rotation of the door 300 and cause the tray 200 to be inserted rearward toward the inside of the cooking compartment 105 when the door is closed.

The hinge assembly 800 may be installed at both sides of the housing 100 in the left-right direction so that the hinge assembly 800 is disposed at each of both outer sides of the tray 200 in the left-right direction. Also, each hinge assembly 800 may be formed including a hinge part 810 and the mounting protrusion 820.

The hinge part 810 is provided to be hinge-coupled to the rear side of the door upper surface part 310. A state of the hinge part 810 may be changed by the hinge part 810 interlocking with rotation of the door 300.

The mounting protrusion 820 is connected to one of the connecting members of the hinge part 810 inside the hinge case 830 and protrudes toward the inside of the cooking compartment 105 via the first slot 835 formed in the hinge case 830 and a second slot 125 formed in the housing 100. Here, the second slot 125 may be formed in a side surface of the housing 100 and formed with a shape overlapping the first slot 835 and at a position overlapping the first slot 835.

The tray 200 may be mounted on the mounting protrusion 820. Specifically, the tray 200 may be mounted on the mounting protrusion 820 by the mounting protrusion 820 being fitted to the mounting groove 215 formed in the side portion of the tray 200.

According to the present embodiment, the mounting groove 215 is formed in the mounting part 210 provided at each of both side surfaces of the tray 200. The mounting groove 215 may be formed in the form in which the mounting part 210, more specifically, the second protrusion 213, is cut out from the lower end thereof. The mounting protrusion 820 may be fitted into the mounting groove 215 through the cut-out lower portion of the mounting groove 215, and the tray 200 and the mounting protrusion 820 may be fitted and coupled to each other by the mounting groove 215 and the mounting protrusion 820 being fitted and coupled to each other.

Further, a sliding surface 214 may be formed at the mounting part 210, more specifically, at the lower end of the second protrusion 213. The sliding surface 214 is provided to allow sliding of the mounting protrusion 820 coming into contact with the lower end of the second protrusion 213. The sliding surface 214 may extend in the front-rear direction and be connected to the mounting groove 215.

The user may perform cooking using the cooking appliance while the tray 200 is installed inside the cooking compartment 105 or take the tray 200 out of the cooking compartment 105 in order to take out the cooked food or wash the tray 200.

When taking the tray 200 out of the cooking compartment 105, the tray 200 may be taken out after slightly lifting the tray 200 upward so that the mounting protrusion 820 may fall out of the mounting groove 215.

Also, when attempting to install the withdrawn tray 200 back into the cooking compartment 105, the tray 200 may be pushed to the inside of the cooking compartment 105 so that the mounting protrusion 820 is fitted to the mounting groove 215.

However, since the mounting groove 215 is disposed at the lower portion of the tray 200 and the mounting protrusion 820 is covered by the tray 200, it is difficult for the user to accurately grasp the positions of the mounting groove 215 and the mounting protrusion 820.

In consideration of such an aspect, in the present embodiment, the sliding surface 214 is formed at the lower end of the second protrusion 213 so as to extend in the front-rear and/or the left-right direction, and the sliding surface 214 is connected to the mounting groove 215.

Accordingly, when pushing the tray 200 back into the cooking compartment 105, the user does not have to accurately fit the mounting protrusion 820 into the mounting groove 215 from the beginning. The user just has to push the tray 200 into the cooking compartment 105 so that the sliding surface 214 is placed on the mounting protrusion 820 and then move the tray 200 in the front-rear direction.

In this process, the mounting protrusion 820 may slide on the sliding surface 214 due to the tray 200 moving in the front-rear direction and then be fitted to the mounting groove 215.

That is, the mounting protrusion 820 does not have to be accurately fitted to the mounting groove 215 for installing the tray 200 back into the cooking compartment 105. Simply by placing the tray 200 on the mounting protrusion 820 and then moving the tray 200 in the front-rear direction, fitting and coupling the mounting protrusion 820 and the mounting groove 215 to each other and, in this way, fitting and coupling the mounting protrusion 820 and the tray 200 to each other may be easily and promptly performed.

The above-described structure for fitting and coupling the mounting groove 215 and the mounting protrusion 820 to each other is merely an example, and various other modifications may be possible.

Figure 13:
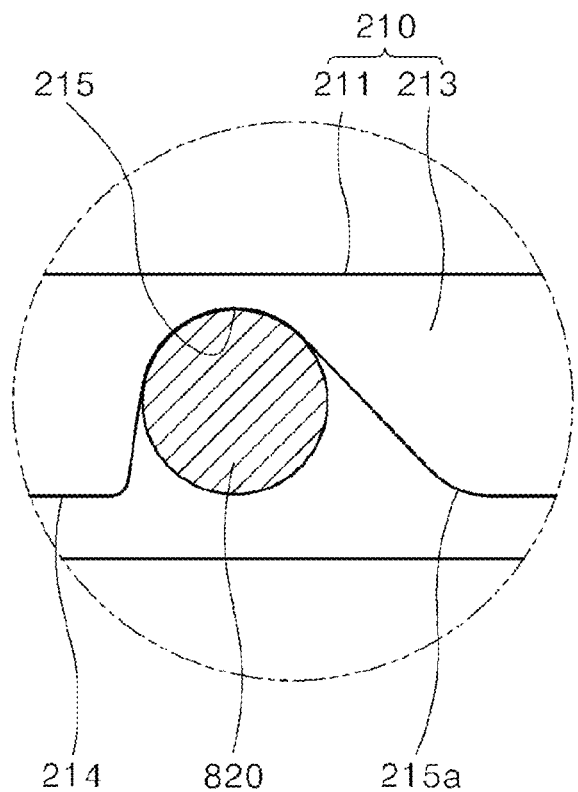
FIG. 13 is a cross-sectional view schematically illustrating another example of the coupling structure between the tray and the mounting protrusion illustrated in FIG. 12.
Figure 14:
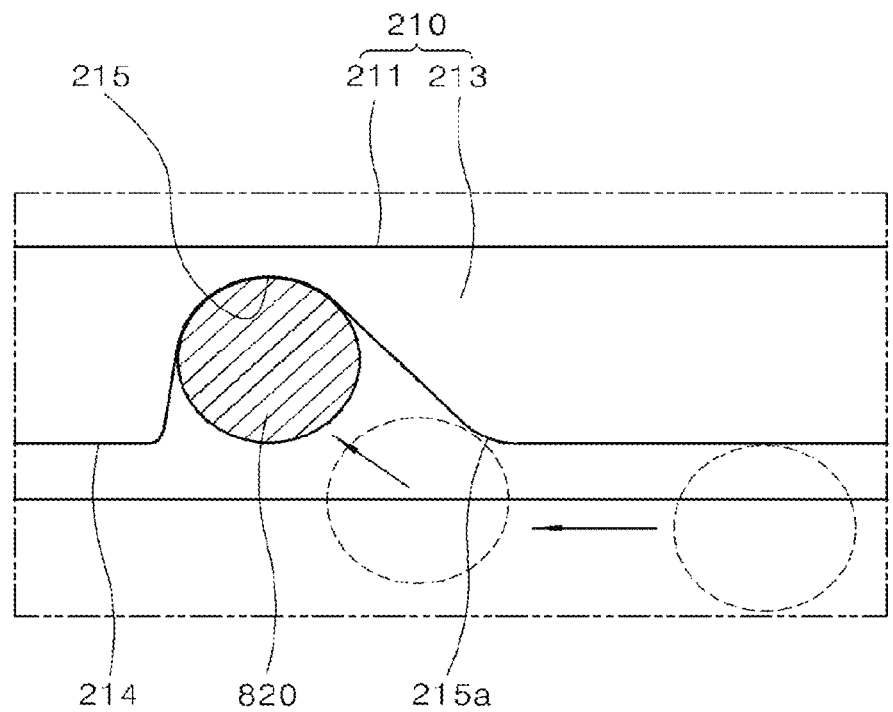
FIG. 14 is a view illustrating a coupling process between the tray and the mounting protrusion illustrated in FIG. 13.
Figure 15:
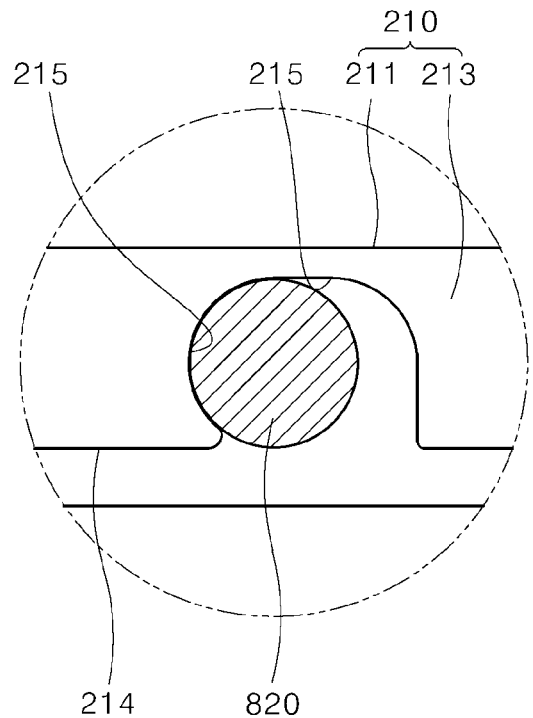
FIG. 15 is a cross-sectional view schematically illustrating still another example of the coupling structure between the tray and the mounting protrusion illustrated in FIG. 12.
Figure 16:
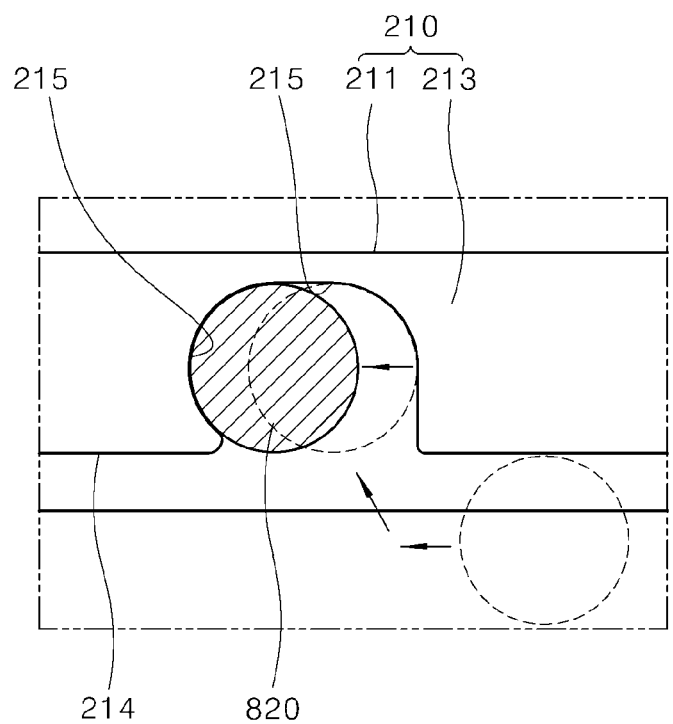
FIG. 16 is a view illustrating a coupling process between the tray and the mounting protrusion illustrated in FIG. 15.

FIG. 13 is a cross-sectional view schematically illustrating another example of the coupling structure between the tray and the mounting protrusion illustrated in FIG. 12, and FIG. 14 is a view illustrating a coupling process between the tray and the mounting protrusion illustrated in FIG. 13. Also, FIG. 15 is a cross-sectional view schematically illustrating still another example of the coupling structure between the tray and the mounting protrusion illustrated in FIG. 12, and FIG. 16 is a view illustrating a coupling process between the tray and the mounting protrusion illustrated in FIG. 15.

As one of the modifications of the structure for fitting and coupling the mounting groove 215 and the mounting protrusion 820 to each other, as illustrated in FIG. 13, an inclined surface 215a may be formed between the mounting groove 215 and the sliding surface 214. As illustrated in FIG. 14, the inclined surface 215a may be formed on a path along which the mounting protrusion 820, which slides while in contact with the sliding surface 214, is inserted into the mounting groove 215 and may guide movement of the mounting protrusion 820.

When the inclined surface 215a is formed between the mounting groove 215 and the sliding surface 214 as described above, impact and noise that may be generated in the process in which the mounting protrusion 820 is fitted to the mounting groove 215 may be reduced, and, in this way, fitting and coupling the tray 200 and the mounting protrusion 820 to each other may be more smoothly and stably performed.

The inclined surface 215a may be disposed at a rear side of the mounting groove 215. This is a result of designing in consideration of the fact that, when the user pushes the tray 200 into the cooking compartment 105 in order to install the tray 200 inside the cooking compartment 105, the tray 200 is often not pushed enough to the position where the mounting groove 215 and the mounting protrusion 820 are fitted and coupled to each other.

When the inclined surface 215a is formed at the rear side of the mounting groove 215 as described above, fitting and coupling between the mounting groove 215 and the mounting protrusion 820 may be smoothly and stably guided even when the tray 200 is mounted on the mounting protrusion 820 in a state in which the tray 200 is not pushed enough to position where the mounting groove 215 and the mounting protrusion 820 are fitted and coupled to each other.

As another one of the modifications of the structure for fitting and coupling the mounting groove 215 and the mounting protrusion 820 to each other, as illustrated in FIG. 15, a fitting groove 215b may be further provided in the second protrusion 213. The fitting groove 215b may be formed in the form in which a portion of the second protrusion 213 is cut out. The fitting groove 215b may be formed in the form of a groove which is concavely depressed in the front-rear direction. The fitting groove 215b may be formed to be connected to the mounting groove 215 in such a way that the fitting groove 215b is concavely depressed in the front-rear direction at an upper end of the mounting groove 215.

The fitting groove 215b may be disposed at a front side of the mounting groove 215. Accordingly, when, while the mounting protrusion 820 is fitted to the mounting groove 215, the user further pushes the tray 200 rearward toward the inside of the cooking compartment 105 as illustrated in FIG. 16, the mounting protrusion 820 which has been fitted to the mounting groove 215 may be fitted to the fitting groove 215b extending to the front of the mounting groove 215.

When the mounting protrusion 820 and the fitting groove 215b are fitted and coupled to each other as described above, since movement of the tray 200 in the up-down direction is restricted by the coupling between the mounting protrusion 820 and the fitting groove 215b, the risk of the tray 200 falling forward is significantly lowered.

Meanwhile, the mounting protrusion 820 may interlock with a change in the state of the hinge part 810 and move in the front-rear direction. The mounting protrusion 820 may move the tray 200 mounted on the mounting protrusion 820 in the front-rear direction. That is, the tray 200 mounted on the mounting protrusion 820 may be moved in the front-rear direction by interlocking with the movement of the mounting protrusion 820 in the front-rear direction.

Figure 17:
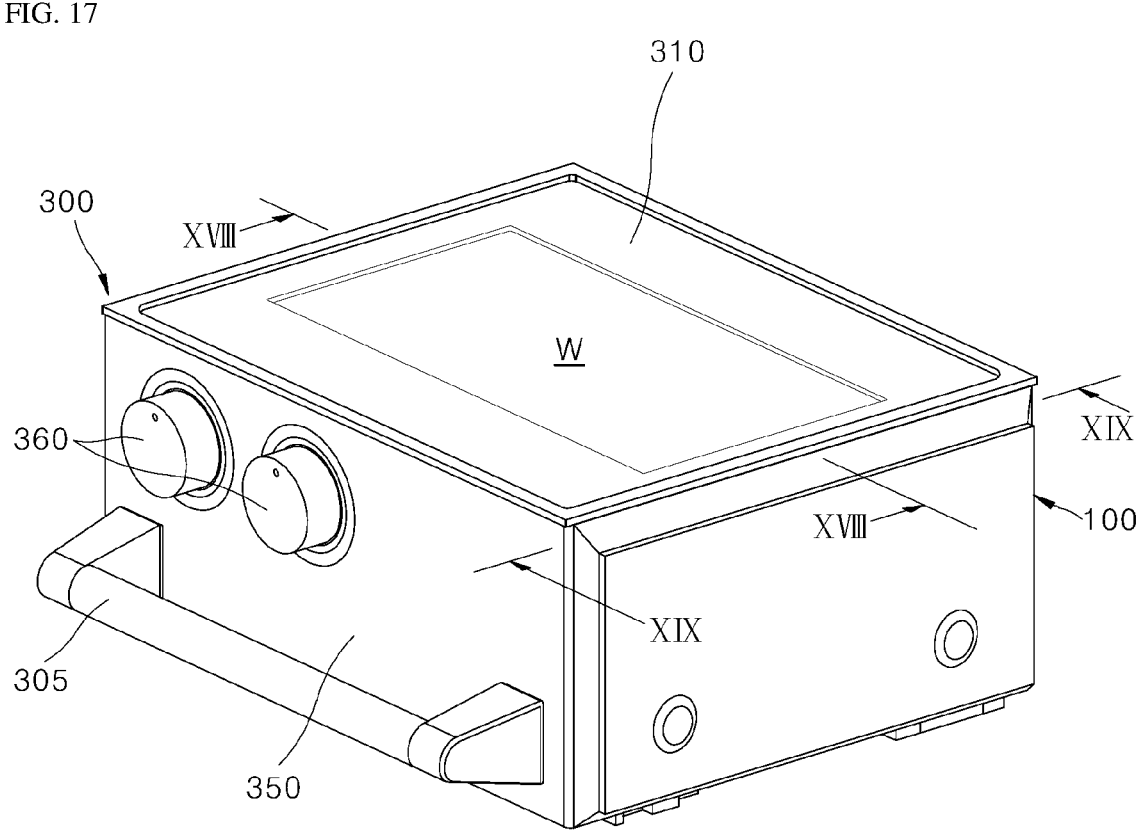
FIG. 17 is a perspective view illustrating a door-closed state of the cooking appliance according to an embodiment of the present invention.
Figure 18:
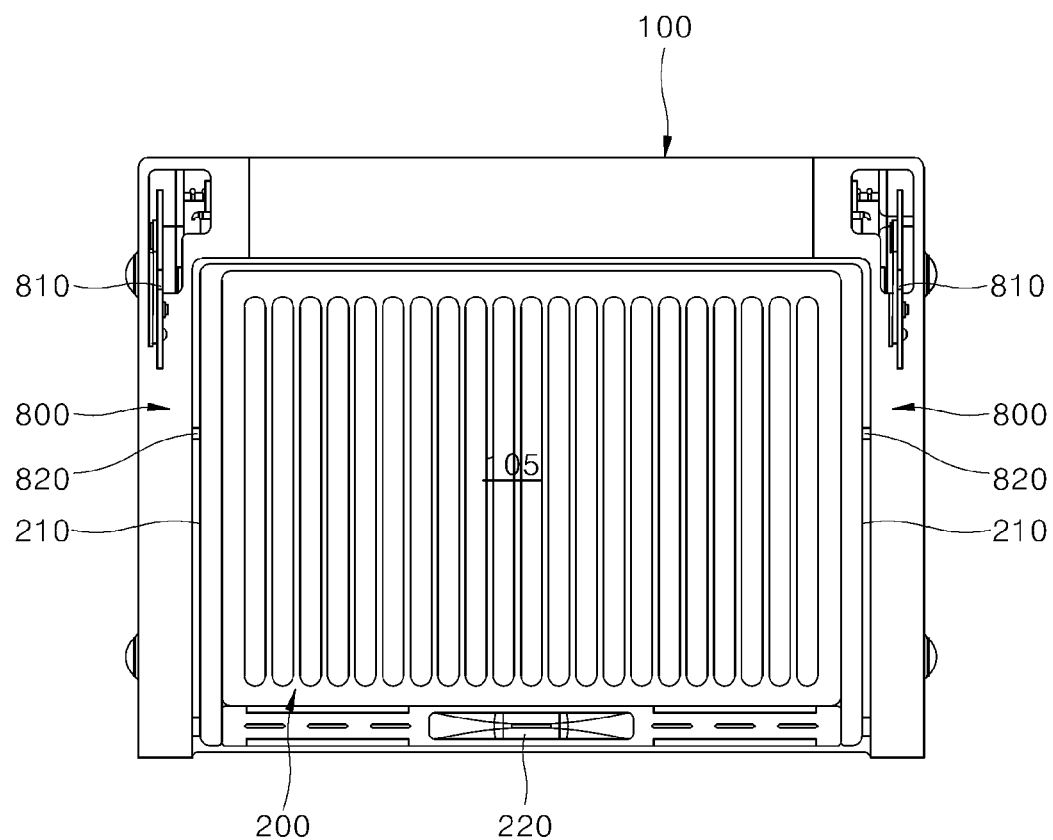
FIG. 18 is a cross-sectional view taken along line "XVIII-XVIII" of FIG. 17.
Figure 19:
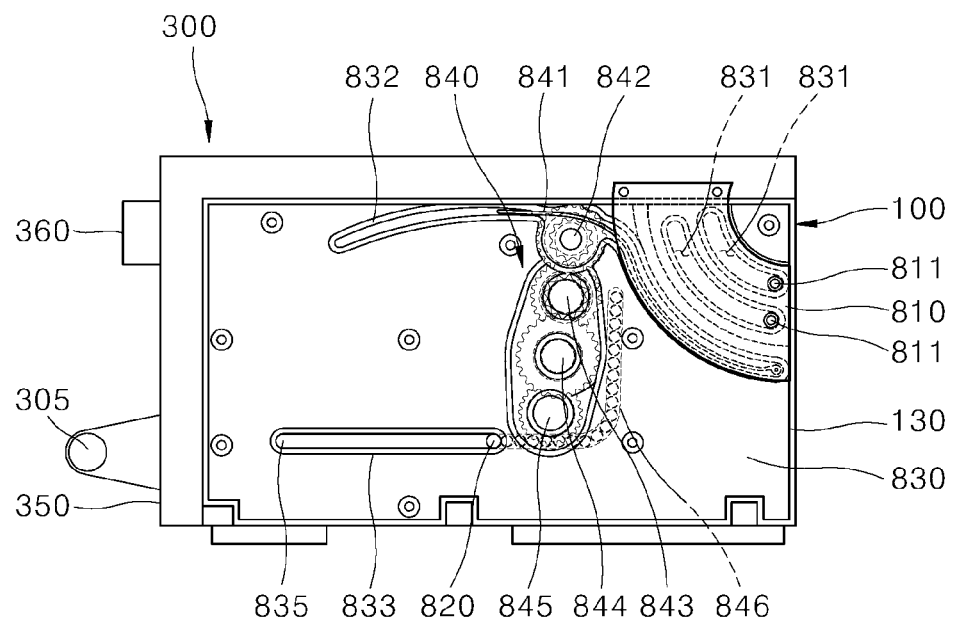
FIG. 19 is a cross-sectional view taken along line "XIX-XIX" of FIG. 17.
Figure 22:
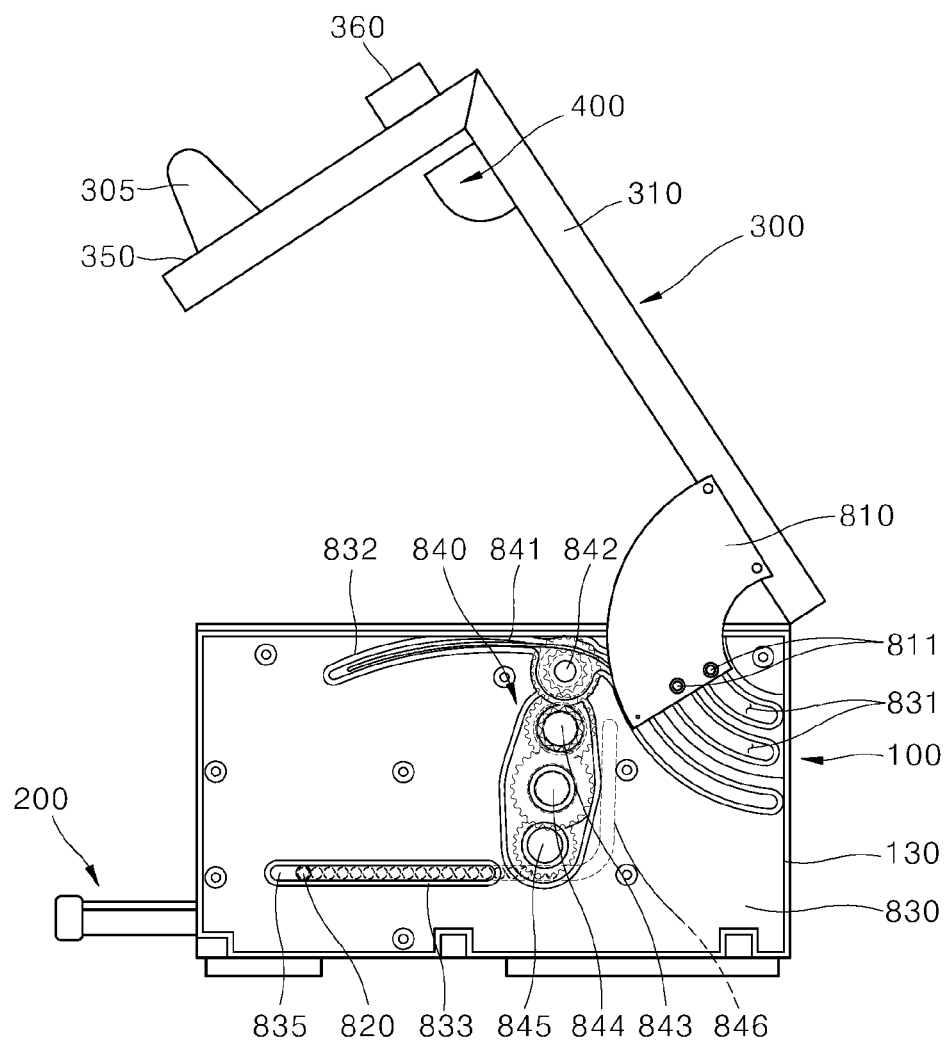
FIG. 22 is a cross-sectional view taken along line "XXII-XXII" of FIG. 20.

FIG. 17 is a perspective view illustrating a door-closed state of the cooking appliance according to an embodiment of the present invention, FIG. 18 is a cross-sectional view taken along line "XIII-XIII" of FIG. 17, and FIG. 19 is a cross-sectional view taken along line "XIX-XIX" of FIG. 17. Also, FIG. 20 is a perspective view illustrating a door-opened state of the cooking appliance illustrated in FIG. 17, FIG. 21 is a cross-sectional view taken along line "XXI-XXI" of FIG. 20, and FIG. 22 is a cross-sectional view taken along line "XXII-XXII" of FIG. 20.

Figure 20:
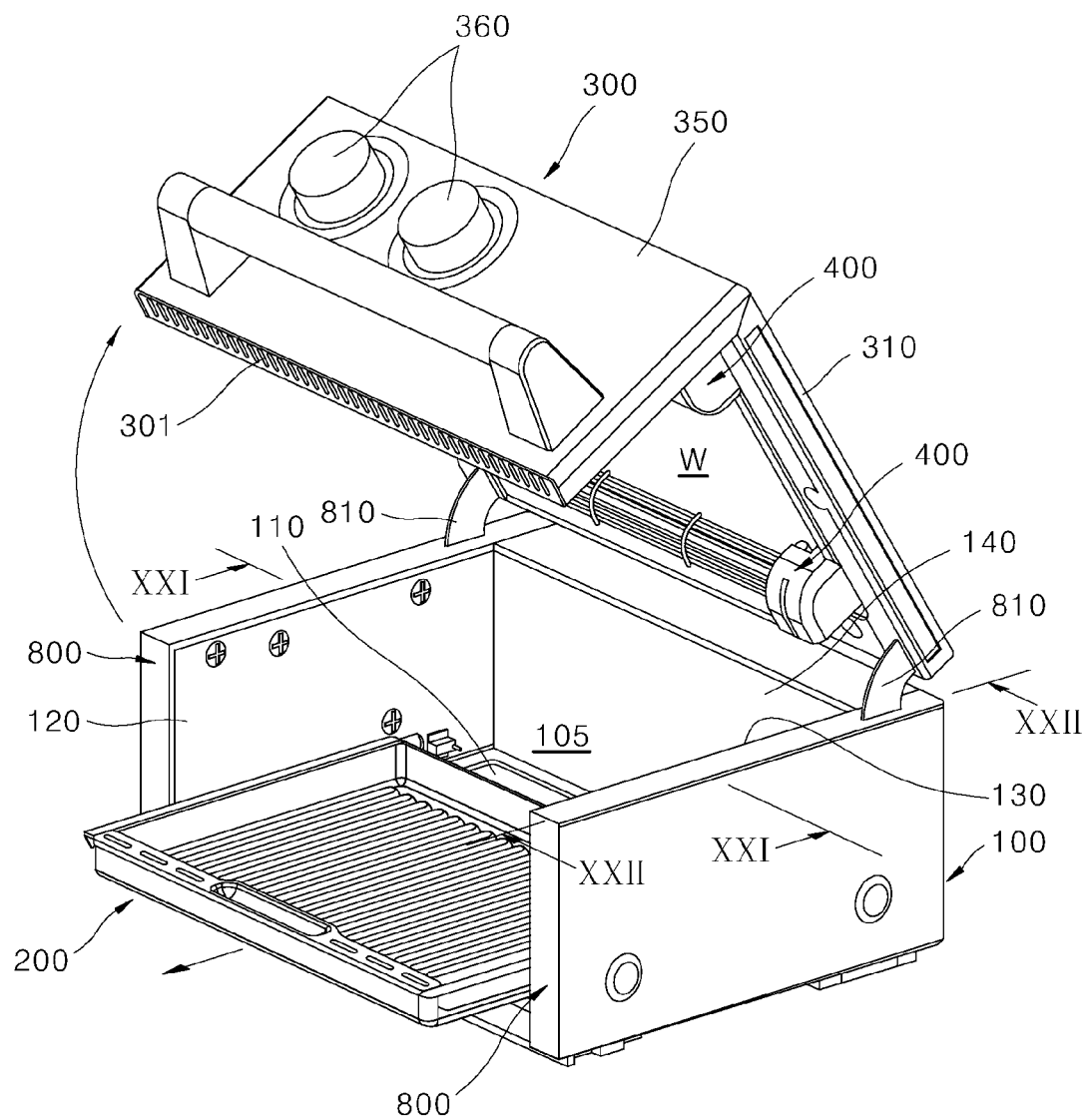
FIG. 20 is a perspective view illustrating a door-opened state of the cooking appliance illustrated in FIG. 17.

According to the present embodiment, in a state in which the cooking compartment 105 is closed by the door 300 as illustrated in FIGS. 17 and 18, the tray 200 is inserted into the cooking compartment 105 (see FIG. 20). Also, the mounting protrusion 820 on which the tray 200 is mounted is disposed at a position biased toward the rear side of the cooking compartment 105.

The rear side of the tray 200 may be supported by a pair of mounting protrusions 820. Also, the front side of the tray 200 may be supported by a pair of support rollers 115.

That is, the tray 200 may be stably supported by the pair of mounting protrusions 820 disposed at the rear side and the pair of support rollers 115 disposed at the front side and may be installed in the cooking compartment 105 so as to be movable in the front-rear direction.

The support rollers 115 may be disposed at the both side surfaces 120 and 130 of the housing 100 in such a way that the support rollers 115 are disposed at the front side of the housing 100 adjacent to the door 300. The mounting part 210, more specifically, the sliding surface 214 (see FIG. 11), of the tray 200 may be seated on the support roller 115. The support roller 115 may rotate along with the movement of the tray 200 and support the tray 200 so that the tray 200 may move smoothly.

Also, the door 300 may be rotatably installed at the housing 100 via the hinge assembly 800 and rotate in the up-down direction to open or close the cooking compartment 105.

The hinge assembly 800 is disposed at each of both side portions of the housing 100, and a rear side of the door upper surface part 310 is rotatably coupled to the hinge assembly 800.

That is, a left side corner portion and a right side corner portion at the rear side of the door upper surface part 310 are rotatably coupled to the hinge assembly 800 disposed at the both side portions of the housing 100. The door 300 opens or closes the upper surface and the front surface of the housing 100 by rotating in an up-down direction about the rear side of the door upper surface part 310 rotatably coupled to the hinge assembly 800.

Referring to FIGS. 17 to 19, the hinge assembly 800 may be formed including a hinge case 830, the hinge part 810, the mounting protrusion 820, and a converting and outputting part 840.

The hinge case 830 forms an exterior of the hinge assembly 800 and accommodates portions of the hinge part 10 and the mounting protrusion 820 and the converting and outputting part 840 therein. Various structures for supporting the hinge part 810, the mounting protrusion 820, and the converting and outputting part 840 may be formed in the hinge case 830.

The hinge part 810 is installed in the hinge case 830 such that the position of the hinge part 810 is changeable. The hinge part 810 may be installed in the hinge case 830 such that the hinge part 810 may rotate along a trajectory corresponding to a rotation trajectory of the door 300. An upper end of the hinge part 810 may be coupled to the door 300. The posture of the hinge part 810 coupled to the door 300 in this way may be changed by the hinge part 810 interlocking with rotation of the door 300. Also, the trajectory and range of rotation of the door 300 coupled to the hinge part 810 may be guided by the hinge part 810.

For example, the hinge part 810 may be provided in the form of a flat plate. The hinge part 810 maybe formed to be bent along the shape corresponding to the rotation trajectory of the door 300.

Also, a guide hole 831 formed in the shape corresponding to the rotation trajectory of the door 300 may be provided in the hinge case 830. The guide hole 831 may be formed in the hinge case 830 to pass through the hinge case 830 in the left-right direction. The guide hole 831 formed in this way may provide a passage for guiding a rotation path of the hinge part 810 in the hinge case 830.

For example, the guide hole 831 may be provided to form a passage which gradually ascends toward the front and gradually descends toward the rear.

A stopper 811 may be provided in the hinge part 810. The stopper 811 may be provided to protrude from the hinge part 810 so as to protrude in the left-right direction. The stopper 811 may be inserted into the guide hole 831 and move along the passage formed by the guide hole 831. That is, the stopper 811 may guide rotation of the hinge part 810 by moving along the guide hole 831.

Also, at front and upper end portions of the guide hole 831, the stopper 811 may interfere with the hinge case 830 and restrict further forward and upward movements of the hinge part 810, and, at rear and lower end portions of the guide hole 831, the stopper 811 may interfere with the hinge case 830 and restrict further rearward and downward movements of the hinge part 810. That is, the stopper 811 may limit the range of movement of the hinge part 810 to a range corresponding to the range in which the guide hole 831 is formed.

The mounting protrusion 820 is connected to any one of elements constituting the converting and outputting part 840 inside the hinge case 830 and protrudes toward the inside of the cooking compartment 105 via the first slot 835 formed in the hinge case 830 and the second slot 125 formed in the housing 100. Here, the second slot 125 may be formed in the side surface of the housing 100 and formed with a shape overlapping the first slot 835 and at a position overlapping the first slot 835.

The converting and outputting part 840 is provided inside the hinge case 830. The converting and outputting part 840 may convert a force input by a change in the posture of the hinge part 810 to a linear force for moving the mounting protrusion 820 in the front-rear direction. The converting and outputting part 840 may be formed including a moving member and a converting member.

The moving member corresponds to an element which moves the mounting protrusion 820 in the front-rear direction. Also, the converting member corresponds to an element which moves the moving member in the front-rear direction by interlocking with a change in the posture of the hinge part 810, that is, movement of the hinge part 810.

For example, the converting and outputting part 840 may be formed including a belt 841, a plurality of rotary gears 842, 843, 844, and 845, and a rack gear 846. Among the elements, the belt 841 and the plurality of rotary gears 842, 843, 844, and 845 are illustrated as corresponding to the converting members. Also, the rack gear 846 is illustrated as corresponding to the moving member.

The belt 841 is provided in the form of an open timing belt in which a gear is formed on at least one of an upper surface and a lower surface. A first guide rib 832 provided to protrude from an inner side surface of the hinge case 830 may restrict a vertical position of the belt 841 and guide a front-rear movement path of the belt 841.

A rear side end portion of the belt 841 may be connected to the hinge part 810. The belt 841 may be moved in the front-rear direction by interlocking with a change in the posture of the hinge part 810. For example, when the hinge part 810 moves forward and upward, the belt 841 may move forward by interlocking with the movement of the hinge part 810. Also, when the hinge part 810 moves rearward and downward, the belt 841 may move rearward by interlocking with the movement of the hinge part 810.

The gear formed at the belt 841 may be engaged with the plurality of rotary gears 842, 843, 844, and 845.

The first rotary gear 842 is disposed most adjacent to the belt 841 among the plurality of rotary gears 842, 843, 844, and 845. In the present embodiment, the first rotary gear 842 is illustrated as being formed including a timing gear. The first rotary gear 842 may be engaged with the belt 841 and be rotated by interlocking with the movement of the belt 841.

The second rotary gear 843 and the third rotary gear 844 are disposed between the first rotary gear 842 and the fourth rotary gear 845 to transmit rotation of the first rotary gear 842 to the fourth rotary gear 845.

That is, the movement of the belt 841 is performed by interlocking with a change in the posture of the hinge part 810, and the rotation of the plurality of rotary gears 842, 843, 844, and 845 is performed by interlocking with the movement of the belt 841. Therefore, it can be said that a change in the posture of the hinge part 810 causes rotation of the fourth rotary gear 845.

The fourth rotary gear 845 rotated as described above may be engaged with the rack gear 846 disposed below the fourth rotary gear 845. A second guide rib 833 provided to protrude from the inner side surface of the hinge case 830 may restrict a vertical position of the rack gear 846 and guide a front-rear movement path of the rack gear 846.

The rack gear 846 may be moved in the front-rear direction by interlocking with rotation of the fourth rotary gear 845. For example, when the hinge part 810 moves forward and upward and the fourth rotary gear 845 is rotated in a first direction according to the movement of the hinge part 810, the rack gear 846 may interlock therewith and move forward (see FIG. 22). Also, when the hinge part 810 moves rearward and downward and the fourth rotary gear 845 is rotated in a second direction, which is the reverse of the first direction, according to the movement of the hinge part 810, the rack gear 846 may interlock therewith and move rearward (see FIG. 21).

The mounting protrusion 820 is coupled to the rack gear 846. Accordingly, the mounting protrusion 820 may interlock with movement of the rack gear 846 and move in the front-rear direction. For example, when the rack gear 846 moves forward, the mounting protrusion 820 may also move forward according to the movement of the rack gear 846, and, when the rack gear 846 moves rearward, the mounting protrusion 820 may also move rearward according to the movement of the rack gear 846.

In summary, the hinge assembly 800 having the above-described configuration is provided so that states of the elements constituting the hinge assembly 800, that is, the hinge part 810 and the converting and outputting part 840, may be changed by interlocking with rotation of the door 300 and the elements whose states are changed in this way may move the mounting protrusion 820 in the front-rear direction.

As illustrated in FIGS. 20 to 22, when the door 300 rotates upward to open the cooking compartment 105, a rotary force due to the rotation of the door 300 changes the state of the hinge part 810 of the hinge assembly 800, and the mounting protrusion 820 moves forward as a result. Also, the tray 200 may move forward due to the mounting protrusion 820 moving forward and be withdrawn to the outside of the cooking compartment 105.

That is, when the door 300 is opened, the tray 200 is automatically withdrawn. Accordingly, the user may easily and safely put food to be cooked on the tray 200 or take out the cooked food placed on the tray 200 from the tray 200 and may easily take out the tray 200, which is withdrawn forward, from the inside of the cooking compartment 105 and move the tray 200.

Further, in the cooking appliance of the present embodiment, the door 300 is provided to be able to open both the front surface and the upper surface of the cooking compartment 105. Accordingly, the user may insert or withdraw food or the tray 200 into or from the cooking compartment 105 through a much larger passage as compared with when the door 300 only opens the front surface or the upper surface of the cooking compartment 105.

That is, the cooking appliance of the present embodiment may not only provide a much larger passage for allowing the user to easily and conveniently insert or withdraw food or the tray 200 into or from the cooking compartment 105 but also provide a function of allowing the food or the tray 200 to be more easily and conveniently withdrawn by the automatic withdrawal of the tray 200 when the door 300 is opened.

The cooking appliance of the present embodiment may also provide a function of allowing the tray 200 to be automatically inserted into the cooking compartment 105 when the door 300 is closed as long as the tray 200 is mounted on the mounting protrusion 820. The function may contribute to improving convenience and safety of the cooking appliance by eliminating the need for a user to put his or her hand inside the cooking compartment 105 filled with hot air when the user wants to put the tray 200 back into the cooking compartment 105 after taking out the tray 200 from the cooking compartment 105 while cooking is performed.

Further, according to the cooking appliance of the present embodiment, since the door 300 is opened by rotating upward without being unfolded forward, there is little concern about the center of mass of the cooking appliance being biased toward the front even when the door 300 is opened. Rather, when the door 300 is opened, the center of mass of the door 300 moves further to the rear than when the door 300 is closed.

In the structure in which the center of mass of the cooking appliance moves to the rear when the door 300 is opened, the risk of the cooking appliance falling forward when the door 300 is opened is significantly lowered. Also, in the structure, the weight of the tray 200 may be freely increased because the risk of the cooking appliance falling forward is low even when the weight of the tray is increased. That is, in the above structure, it is possible to use the tray 200 which is thicker and heavier than that used in the structure in which the door is unfolded forward.

The thicker and heavier the tray 200, the better the high-temperature cooking performance and the easier it is to maintain warmth for a long time. Therefore, better cooking performance may be expected to an extent that the tray 200 is thicker and heavier.

Also, the tray 200 usable in an environment heated by the induction heating part generally weighs more than an ordinary tray. Therefore, when it becomes possible to use the tray 200 which is much thicker and heavier than the ordinary tray, even when the second heating part 600 is provided in the form of an induction heating part, it is possible to provide the tray 200 suitable for the second heating part 600.

[Structure for Suppressing Occurrence of Cooking Appliance Falling Forward]

As described above, in the cooking appliance of the present embodiment, the tray 200 may be withdrawn forward when the door 300 is opened. Also, the tray 200 may be provided in the form extremely thicker and heavier than ordinary trays in order to improve high-temperature cooking performance and warmth maintaining performance.

In a state in which the tray 200 is withdrawn forward, the center of mass of the cooking appliance is biased toward the front as much as the extent to which the tray 200 is withdrawn, and thus a risk of the cooking appliance falling forward is inevitably increased.

In consideration of such an aspect, the cooking appliance of the present embodiment includes various forms of configurations for preventing the cooking appliance from falling forward when the door 300 is opened.

Hereinafter, configurations for preventing the cooking appliance from falling forward when the door 300 is opened will be described in detail.

Figure 23:
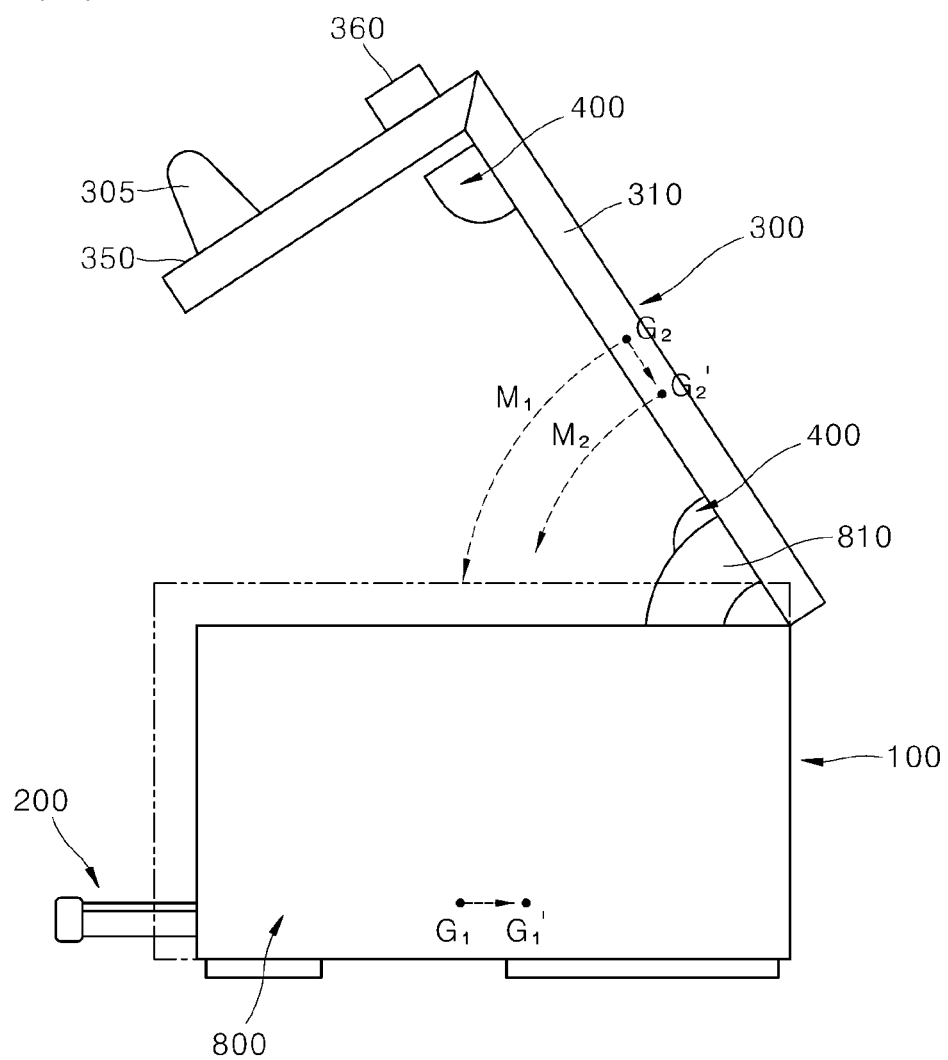
FIG. 23 is a view illustrating a center-of-mass change state in the door-opened state of the cooking appliance.

FIG. 23 is a view illustrating a center-of-mass change state in the door-opened state of the cooking appliance.

Referring to FIGS. 20 to 23, the hinge part 810 is disposed at the both side surfaces 120 and 130 of the housing 100 in such a way that the hinge part 810 is disposed at sides adjacent to the back surface 140 of the housing 100. That is, the hinge part 810 is disposed at the rear of both sides of the housing 100.

The hinge part 810 is coupled to the door 300 in such a way that the hinge part 810 is coupled to the rear side of the door upper surface part 310. That is, the hinge part 810 is coupled to the rear of each of both sides of the door upper surface part 310, and the door 300 may open or close the cooking compartment 105 by rotating in the up-down direction about the rear side of the door upper surface part 310 coupled to the hinge part 810 as described above.

The door 300 may rotate about the rear side of the door upper surface part 310 such that, in a state in which the front surface and the upper surface of the housing 100 are opened (hereinafter referred to as "opened state"), the door 300 is located more behind than in a state in which the front surface and the upper surface of the housing 100 are closed (hereinafter referred to as "closed state").

By the door 300 rotating about the rear side of the door upper surface part 310 as described above, the position of the door 300 may be further biased toward the rear in the opened state than in the closed state.

The door 300 whose position is relatively further biased toward the rear in the opened state as described above may cause the center of mass of the cooking device to be biased toward the rear from the center of the cooking appliance in the front-rear direction when the door 300 is in the opened state.

That is, the first configuration provided for preventing the cooking appliance from falling forward when the door 300 is opened is allowing the door 300 to rotate about the rear side of the door upper surface part 310. Accordingly, the position of the door 300 may be further biased toward the rear in the opened state than in the closed state, and, in this way, the center of mass of the cooking appliance may be formed to be biased toward the rear from the center of the cooking appliance in the front-rear direction when the door 300 is in the opened state ($G_1 \rightarrow G_1'$).

Meanwhile, when looking at the configuration of the door 300 itself, the door 300 is provided in the form in which the up-down length of the door front surface part 350 is shorter than the front-rear length of the door upper surface part 310. That is, when the door 300 is in the closed state, the up-down length of the door front surface part 350 is shorter than the front-rear length of the door upper surface part 310.

Accordingly, in the door 300, the proportion occupied by the volume of the door upper surface part 310 is larger than the proportion occupied by the volume of the door front surface part 350. Accordingly, in the total weight of the door 300, the proportion occupied by the weight of the door upper surface part 310 is larger than the proportion occupied by the weight of the door front surface part 350. Accordingly, the center of mass of the door 300 is located to be biased toward the rear past the center of the door 300 in the front rear direction ($G_2 \rightarrow G_2'$).

When the door 300 is rotated rearward to be opened, the center of mass of the door 300 gradually moves rearward. In the door 300, the door front surface part 350 is disposed at the front side, and the door upper surface part 310 is disposed behind the door front surface part 350.

Accordingly, the larger the proportion occupied by the weight of the door upper surface part 310 in the total weight of the door 300, the greater the extent to which the center of mass of the door 300 moves rearward when the door 300 rotates rearward.

In other words, the greater the proportion occupied by the weight of the door upper surface part 310 in the total weight of the door 300, the easier it is for the center of mass of the door 300 to promptly move rearward when the door 300 rotates rearward. Also, as the center of mass of the door 300 moves rearward in this way, the center of mass of the overall cooking appliance may also move rearward more promptly.

That is, the second configuration provided for preventing the cooking appliance from falling forward when the door 300 is opened is providing the door 300 in the form in which the up-down length of the door front surface part 350 is shorter than the front-rear length of the door upper surface part 310. Accordingly, when the door 300 rotates rearward, the center of mass of the door 300 and the center of mass of the cooking appliance may move further rearward more promptly.

Meanwhile, the first heating part 400 and the see-through window W are provided in the door 300, and the first heating part 400 and the see-through window W are disposed in the door upper surface part 310.

As described above, the see-through window W may be formed including the pair of glasses 330 and 335 (see FIG. 10). Generally, glasses are formed of a heavyweight material. Therefore, when the see-through window W formed of glass is disposed in the door upper surface part 310, the weight of the door upper surface part 310 is inevitably increased as much as the weight of the see-through window W.

Further, the see-through window W of the present embodiment may be formed including the pair of glasses 330 and 335, i.e., two layers of glasses. Therefore, the weight of the door upper surface part 310 is inevitably increased as much as the weight of the see-through window W.

Since the see-through window W is disposed in the door upper surface part 310 as described above, the proportion occupied by the weight of the door upper surface part 310 in the total weight of the door 300 is increased as much as the weight of the glasses forming the see-through window W.

Accordingly, when the door 300 rotates rearward, the center of mass of the door 300 and the center of mass of the cooking appliance may more promptly move further rearward as much as the increase in the weight of the door upper surface part 310 due to the first heating part 400.

Further, the pair of first heating parts 400 are disposed at the bottom surface side of the door upper surface part 310. In this case, the first heating part 400 is disposed at each of the front outer side and the rear outer side of the see-through window W. One of the pair of first heating parts 400 is disposed at the rear side of the door upper surface part 310 adjacent to the hinge part 810.

Since the first heating part 400 is disposed in the door upper surface part 310 as described above, the proportion occupied by the weight of the door upper surface part 310 in the total weight of the door 300 is further increased as much as the weight of the first heating part 400.

Accordingly, when the door 300 rotates rearward, the center of mass of the door 300 and the center of mass of the cooking appliance may more promptly move further rearward as much as the increase in the weight of the door upper surface part 310 due to the first heating part 400.

Further, due to the first heating part 400 disposed at the rear side of the door upper surface part 310 adjacent to the hinge part 810, the center of mass of the door 300 may move further rearward. In this way, when the door 300 rotates rearward, the center of mass of the door 300 and the center of mass of the cooking appliance may more promptly move further rearward.

That is, the third configuration provided for preventing the cooking appliance from falling forward when the door 300 is opened is placing the first heating part 400 and the see-through window W in the door upper surface part 310. Accordingly, when the door 300 rotates rearward, the center of mass of the door 300 may more promptly move further rearward.

In summary, the door 300 of the present embodiment is provided in the form in which the position of the door 300 moves rearward when the door 300 rotates rearward, the up-down length of the door front surface part 350 is shorter than the front-rear length of the door upper surface part 310, and the first heating part 400 and the see-through window W are disposed in the door upper surface part 310.

The door 300 is provided so that, when the cooking compartment 105 is opened and the tray 200 is withdrawn forward as a result, the door 300 itself is moved toward the rear of the cooking appliance, and the center of mass of the door 300 promptly moves rearward according to the rearward rotation of the door 300.

Since the door 300 provided as described above causes the center of mass of the cooking appliance to be biased toward the rear from the center in the front-rear direction when the cooking compartment 105 is opened and the tray 200 is withdrawn forward as a result, the door 300 may contribute to significantly lowering the risk of the occurrence of the cooking appliance falling forward.

Meanwhile, the door 300 rotates about the rear side of the door upper surface part 310 coupled to the hinge part 810. When the door 300 is in the opened state, most of the load of the door 300 acts toward the hinge part 810.

Since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of mass of the cooking appliance moves toward the rear side of the cooking appliance to the extent that most of the load of the door 300 is concentrated on the rear side of the cooking appliance.

In other words, when the door 300 is in the opened state, in addition to the influence of the change in the position of the door 300 itself and the change in the center of mass of the door 300 itself, an additional influence is caused by most of the load of the door 300 being concentrated on the rear side of the cooking appliance. In this way, the center of mass of the cooking appliance may be further biased toward the rear side.

That is, the fourth configuration provided for preventing the cooking appliance from falling forward when the door 300 is opened is a configuration in which a coupling point between the door 300 and the hinge part 810 is disposed at the rear side of the cooking appliance so that an additional influence is caused by most of the load of the door 300 being concentrated on the rear side of the cooking appliance.

Also, when the door 300 is in the opened state, moment is applied to the cooking appliance around a portion where the door 300 and the hinge part 810 are coupled to each other. The moment acts as a force rotating the cooking appliance forward. That is, as the moment is greater, since the force attempting to rotate the cooking appliance forward becomes larger, the risk of the cooking appliance falling forward is also increased.

Further, when the door 300 is in the opened state, the tray 200 is withdrawn forward, and moment acting from the tray 200 withdrawn in this way is applied to the cooking appliance. The moment also acts as the force rotating the cooking appliance forward.

Accordingly, the force equivalent to the sum of the moment acting from the door 300 and the moment acting from the tray 200 may act as a force further increasing the risk of the cooking appliance falling forward.

The size of the moment acting from the door 300 may be determined by a force acting on the door 300 and a distance between a position on which the force acts and a rotation shaft (portion where the door and the hinge part are coupled to each other). In this case, only gravity acts on the door 300 unless a separate force is applied thereto. Since gravity acts on the entire part of the door 300, it can be seen that gravity acts on the center of mass of the door 300. Therefore, it can be said that the moment increases ($M_1$) as the center of mass of the door 300 moves away from the portion where the door 300 and the hinge part 810 are coupled to each other and decreases ($M_2$) as the center of mass of the door 300 approaches the portion where the door 300 and the hinge part 810 are coupled to each other.

According to the present embodiment, as the door 300 rotates rearward to open the cooking compartment 105, the center of mass of the door 300 also moves rearward, and, as a result, the size of the moment acting from the door 300 may be decreased ($M_1 \rightarrow M_2$).

That is, when the door 300 is in the opened state, the moment acting from the tray 200 may increase due to the tray 200 being withdrawn forward, but the moment acting from the door 300 may relatively decrease.

In this way, since the cooking appliance of the present embodiment allows the size of the moment acting on the cooking appliance due to the door 300 to be decreased, the risk of the occurrence of the cooking appliance falling forward due to the tray 200 withdrawn forward may be significantly lowered.

That is, the fifth configuration provided for preventing the cooking appliance from falling forward when the door 300 is opened is a configuration in which the center of mass of the door 300 is allowed to be more biased toward the rear so that the size of the moment acting on the cooking appliance due to the door 300 is decreased.

Meanwhile, the mounting protrusion 820 may protrude toward the inside of the cooking compartment 105 via the first slot 835 formed in the hinge case 830 and the second slot 125 formed in the housing 100.

The first slot 835 and the second slot 125 may provide a passage for allowing the mounting protrusion 820, which is connected to the converting and outputting part 840 inside the hinge case 830, to protrude toward the inside of the cooking compartment 105 and provide a passage required for the mounting protrusion 820 to move in the front-rear direction.

To this end, the first slot 835 and the second slot 125 may be formed to pass through the hinge case 830 and the side surface 120 of the housing 100, respectively, and each of the first slot 835 and the second slot 125 may be formed in the form of a slot having an up-down width corresponding to the thickness of the mounting protrusion 820 and a length extending in the front-rear direction.

The front-rear lengths of the first slot 835 and the second slot 125 may be less than ½ of the front-rear length of the tray 200.

The lengths of the first slot 835 and the second slot 125 relate to the range of withdrawal of the tray 200. That is, since the tray 200 may be withdrawn to the extent that the mounting protrusion 820 moves forward, and the range of the forward movement of the mounting protrusion 820 is limited by the first slot 835 and the second slot 125, it can be said that the range of withdrawal of the tray 200 is determined by the first slot 835 and the second slot 125.

Therefore, when the front-rear lengths of the first slot 835 and the second slot 125 are less than ½ of the front-rear length of the tray 200, a distance along which the tray 200 is movable is limited to less than ½ of the front-rear length of the tray 200.

Accordingly, when it is assumed that the tray 200 is completely inserted into the cooking compartment 105 when the mounting protrusion 820 is disposed at the rearmost end portions of the first slot 835 and the second slot 125, in a case in which the mounting protrusion 820 is disposed at the foremost end portions of the first slot 835 and the second slot 125, the tray 200 may be withdrawn to the outside of the cooking compartment 105 only as much as a length less than ½ of the longitudinal length of the tray 200.

This is a result of designing so that the center of mass of the tray 200 is located inside the cooking compartment 105 even when the tray 200 is withdrawn. That is, in consideration of the fact that, when the tray 200 is excessively withdrawn, the risk of the tray 200 falling forward increases to the extent that the tray 200 is excessively withdrawn, the center of mass of the tray 200 is allowed to be located inside the cooking compartment 105 even when the tray 200 is withdrawn. Also, when the tray 200 is excessively withdrawn and the center of mass of the cooking appliance is biased to the front, the size of the moment acting on the cooking appliance increases to the extent that the center of mass of the cooking appliance is biased to the front, and, as a result, the risk of the cooking appliance itself falling forward also increases.

In consideration of such an aspect, in the present embodiment, the tray 200 is allowed to be withdrawn to the outside of the cooking compartment 105 only as much as a length less than ½ of the longitudinal length of the tray 200. In this way, since the tray 200 is automatically withdrawn when the door 300 is opened, advantageous effects in that withdrawal of food or the tray 200 is more easily and conveniently performed and the risk of the tray 200 and the cooking appliance falling forward is lowered may be provided.

In the case of a conventional cooking appliance in which a door only opens the front of a cooking compartment, when, as described above, the tray 200 is withdrawn to the outside of the cooking compartment 105 only as much as the length less than ½ of the longitudinal length of the tray 200, various inconveniences may occur.

That is, since the tray 200 is not completely exposed to the outside of the cooking compartment, it is difficult to properly check the cooking state of food placed on the tray 200, and there is an inconvenience in placing food on the tray 200 or taking out the food placed on the tray 200.

In contrast, in the cooking appliance of the present embodiment, since the upper surface of the cooking compartment 105 as well as the front surface thereof are opened together when the door 300 is opened, the entire tray 200 may be exposed to the outside even when, as described above, the tray 200 is withdrawn to the outside of the cooking compartment 105 only as much as the length less than ½ of the longitudinal length of the tray 200.

Therefore, even when the tray 200 is withdrawn to the outside of the cooking compartment 105 only as much as the length less than ½ of the longitudinal length of the tray 200, it is easy to check the cooking state of the entire food placed on the tray 200, and placing food on the tray 200 or taking out the food placed on the tray 200 may be easily and promptly performed.

That is, the sixth configuration provided for preventing the cooking appliance from falling forward when the door 300 is opened is a configuration in which the tray 200 is allowed to be withdrawn to the outside of the cooking compartment 105 only as much as the length less than ½ of the longitudinal length of the tray 200 so that the entire tray 200 may be exposed to the outside while the risk of the occurrence of the cooking appliance falling forward is lowered.

[Steam Generating Structure of Tray]

Figure 24:
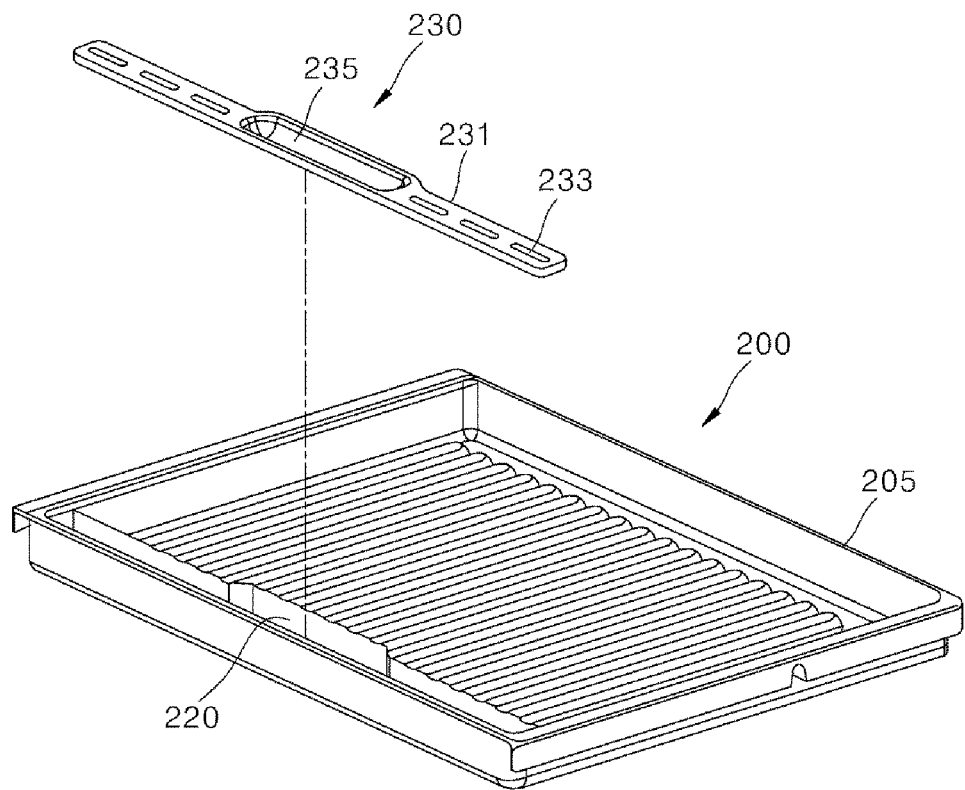
FIG. 24 is an exploded perspective view illustrating a partial configuration of the tray illustrated in FIG. 11.
Figure 25:
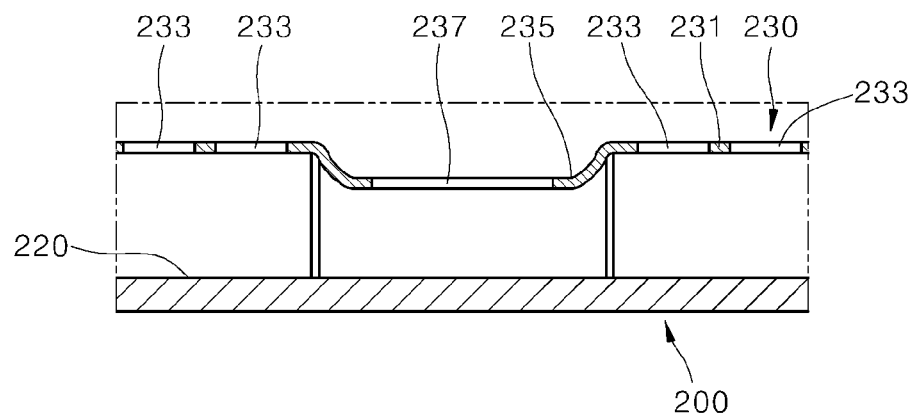
FIG. 25 is a cross-sectional view taken along line "XXV-XXV" of FIG. 11.

FIG. 24 is an exploded perspective view illustrating a partial configuration of the tray illustrated in FIG. 11, and FIG. 25 is a cross-sectional view taken along line "XXV-XXV" of FIG. 11.

Referring to FIG. 3 and FIGS. 24 and 25, a water receiving groove 220 may be formed in the tray 200. The water receiving groove 220 may be disposed in at least one of the four side surfaces of the tray 200. In the present embodiment, the water receiving groove 220 is illustrated as being disposed in the side surface disposed at the front of the tray main body 205. The water receiving groove 220 may be formed in the form of a groove which is concavely depressed downward from an upper end of the side surface of the tray 200.

Water may be held in the water receiving groove 220, and the water held in the water receiving groove 220 may be evaporated when the inside of the cooking compartment 105 or the tray 200 is heated and then be provided as steam acting in the cooking compartment 105.

Further, the tray 200 may further include a steam cover 230. The steam cover 230 may be provided as an element which covers the water receiving groove 220 from the top and may be formed including a cover main body part 231 and a water entrance guide surface 235.

The cover main body part 231 may cover the water receiving groove 220 from the top and be detachably coupled to the tray 200. A plurality of steam holes 233 may be disposed in the cover main body part 231. Each steam hole 233 is formed in the cover main body part 231 to pass through the cover main body part 231 in the up-down direction. By each steam hole 233 formed in this way, a passage connecting the cooking compartment 105 and the inside of the water receiving groove 220 covered by the steam cover 230 may be formed in the steam cover 230.

According to the present embodiment, the water receiving groove 220 and the steam cover 230 are disposed in front of the tray 200 and extend in the left-right direction. Also, the plurality of steam holes 233 are disposed in the cover main body part 231 of the steam cover 230 in such a way that the plurality of steam holes 233 are arranged to be spaced a predetermined distance apart from each other in the left-right direction. That is, the steam holes 233 are provided to be evenly disposed inside the cooking compartment 105 in the left-right direction.

Also, the water entrance guide surface 235 is formed on the cover main body part 231 so as to be concave in the up-down direction. A water entrance hole 237 is formed in the water entrance guide surface 235 to pass through the water entrance guide surface 235 in the up-down direction.

The water entrance hole 237 forms a passage connecting the water receiving groove 220 and an upper surface of the steam cover 230 to each other in the steam cover 230. Also, the water entrance guide surface 235 guides the flow of water so that the flow of water supplied through the upper surface of the steam cover 230 is guided toward the water entrance hole 237.

The water entrance hole 233 may be disposed at a central side of the water entrance guide surface 235 in the left-right direction, and the water entrance guide surface 235 may be inclined to connect the cover main body part 231 and the water entrance hole 237 to each other. Accordingly, water supplied to the water entrance guide surface 235 may flow toward the water entrance hole 237 by an inclined surface formed by the water entrance guide surface 235 and then be supplied into the water receiving groove 220 through the water entrance hole 237.

The water supplied into the water receiving groove 220 as described above may be used as water for generating steam to be supplied into the cooking appliance.

For example, when operation of the cooking appliance begins in a state in which water is accommodated in the water receiving groove 220 and the tray 200 is inserted into the cooking compartment 105, heating of the tray 200 is performed by operation of at least one of the first heating part 400 and the second heating part 600.

When the tray 200 is heated in this way, the water accommodated in the water receiving groove 220 is heated and steam is generated. The steam generated inside the water receiving groove 220 may pass through the steam cover 230 through the steam holes 233 and be introduced into the cooking compartment 105. In this case, since the water receiving groove 220 is formed to extend in the left-right direction, and the plurality of steam holes 233 are evenly disposed inside the cooking compartment 105 in the left-right direction, steam may be evenly spread inside the cooking compartment 105. The steam may also be discharged through the water entrance hole 237 disposed at the center of the steam cover 230 in the left-right direction.

Since the steam is evenly spread inside the cooking compartment 105 as described above instead of being concentrated on any one portion of the cooking compartment 105, the steam may be evenly supplied to the entire food which is an object to be cooked. In this way, the cooking appliance of the present embodiment may provide a cooking function which allows moisture to be effectively maintained in the food by the steam evenly supplied to the inside of the cooking compartment 105.

Also, since the steam cover 230 is provided to be separable from the tray 200, the inside of the water receiving groove 220 may be easily washed, and, when necessary, only the steam cover 230 may be replaced easily and promptly. Therefore, it is possible to provide a cooking appliance which facilitates hygiene care and maintenance and repair.

[Arrangement Structure of Components of Door]

According to the present embodiment, the input part 360 and the first control board 500 are disposed in the door front surface part 350, and the see-through window W and the first heating part 400 are disposed in the door upper surface part 310.

The arrangement structure is not an arbitrarily-selected arrangement structure but is an arrangement structure derived as a result of designing to maximally improve convenience and safety of the cooking appliance.

Accordingly, the input part 360 is disposed in the door front surface part 350 rather than the door upper surface part 310. The see-through window W is disposed in the door upper surface part 310. Since the see-through window W occupies most of the region of the door upper surface part 310, it is difficult to provide a proper space for placing the input part 360 in the door upper surface part 310.

Particularly, considering that most of the region of the door upper surface part 310 is covered by the glass 330, it is difficult to provide a portion for installing the input part 360 in the door upper surface part 310.

In addition to the see-through window W, the first heating part 400 is installed in the door upper surface part 310. The first heating part 400 is a heat generating component which generates high heat, and the door upper surface part 310 is provided in the form in which most of the region of the upper surface thereof is covered by the glass 330 so that a temperature rise of an outer side surface thereof with which the user may come in contact is suppressed.

Since thermal conductivity of the glass 330 is lower than that of a metal material forming an exterior frame of the door 300, most of the region of the upper surface of the door upper surface part 310 may be covered by the glass 330 so that a temperature rise of the outer side surface of the door upper surface part 310, with which the user may come in contact, due to heat generated by the first heating part 400 and the like is maximally suppressed.

Even when the glass 330 only covers a portion of the see-through window W instead of covering most of the door upper surface part 310, a region in which the input part 360 may be installed is limited to an outer side region of the see-through window W in the planar direction.

However, since this region is a region right above the first heating part 400, when the input part 360 is installed in this region, the input part 360 is inevitably exposed to high-temperature heat.

When the input part 360 is installed in such an environment, each manipulation switch constituting the input part 360 and cables or various electronic components electrically connected to each manipulation switch are inevitably negatively affected.

Also, since heat tends to rise, the door upper surface part 310 inevitably has a higher temperature than the door front surface part 350. Further, considering that the first heating part 400 is installed in the door upper surface part 310, it is highly likely that most of the door upper surface part 310 has a higher temperature than the door front surface part 350.

When the input part 360 is disposed in the door upper surface part 310, not only the input part 360 itself is negatively affected, but also the risk of the user getting burns due to coming in contact with the door upper surface part 310 increases in the process in which the user operates the cooking appliance.

The first heating part 400 is disposed in the door upper surface part 310 as a result of designing to allow the first heating part 400 to be disposed at an upper portion facing the second heating part 600 with the tray 200 disposed therebetween. The first heating part 400 should be disposed at an upper portion of the tray 200 as described above to evenly heat food placed on the tray 200. Thus, the first heating part 400 should necessarily be disposed in the door upper surface part 310.

Also, when the see-through window W is disposed at an upper portion of the cooking appliance, since the user may view the inside of the cooking compartment 105 from the top through the see-through window W formed at the upper portion of the cooking appliance, the user is allowed to easily and conveniently check a cooking state of food without lowering the posture or bending the waist forward. Thus, the see-through window W should also necessarily be disposed in the door upper surface part 310.

That is, in consideration of various matters, the first heating part 400 and the see-through window W may be disposed in the door upper surface part 310, and thus, most of the region of the door upper surface part 310 is occupied by the first heating part 400 and the see-through window W.

In consideration of such an aspect, the input part 360 is disposed in the door front surface part 350 instead of the door upper surface part 310. Generally, a user uses a cooking appliance by facing the cooking appliance from the front. Accordingly, when the input part 360 is disposed in the door front surface part 350, which is a surface that the user faces, the user may more easily recognize the input part 360 and more easily and conveniently operate the input part 360.

Also, as compared with the door upper surface part 310, the door front surface part 350 is a portion where it is not necessary to install components which account for a large volume. That is, since heavy, large components such as the see-through window W or the first heating part 400 are not installed in the door front surface part 350, there is more available space inside the door front surface part 350 than inside the door upper surface part 310.

The first control board 500 is disposed in the space portion inside the door front surface part 350. Since the first control board 500 is installed inside the door front surface part 350, there are the following advantages.

Various elements and circuits related to reception of manipulation signals input via the input part 360, generation of control signals for controlling operations of the first heating part 400 and the second heating part 600, and the like are provided in the first control board 500.

When the first control board 500 is installed inside the door front surface part 350, the input part 360 and the first control board 500 may be disposed very close to each other. The first control board 500 is an element that should necessarily be electrically connected to the input part 360 in order to receive a manipulation signal input via the input part 360.

When the first control board 500 is disposed at a position very close to the input part 360, the electrical connection between the first control board 500 and the input part 360 may be performed very easily and effectively. Particularly, in the present embodiment, since the input part 360 may be electrically connected to the first control board 500 in the form in which the input part 360 is directly mounted on the first control board 500, the connection between the input part 360 and the first control board 500 may be very efficiently performed.

Also, since the first control board 500 installed inside the door front surface part 350 may be disposed at a position which is also very close to the first heating part 400, the electrical connection between the first heating part 400 and the first control board 500 may also be performed very easily and efficiently.

That is, in the present embodiment, when the input part 360 is disposed in the door front surface part 350 as described above, the input part 360 may be installed in a portion with relatively more available space by avoiding the door upper surface part 310 which does not have sufficient space for installing the input part 360. Accordingly, there are advantages in that the design freedom may be improved regarding the size and number of manipulation switches and positions thereof, the operational stability and safety in use of the cooking appliance are improved due to the input part 360 being less affected by high temperature, and the electrical connection among the input part 360, the first control board 500, and the first heating part 400 may also be performed very easily and efficiently.

Meanwhile, when the see-through window W and the first heating part 400 are disposed in the door upper surface part 310 and the input part 360 and the first control board 500 are disposed in the door front surface part 350 as described above, relatively heavyweight components may be disposed in the door upper surface part 310, and relatively lightweight components may be disposed in the door front surface part 350.

That is, since the see-through window W and the first heating part 400, which are relatively heavyweight components, are disposed in the door upper surface part 310, and the input part 360 and the first control board 500, which are relatively lightweight components, are disposed in the door front surface part 350, the door upper surface part 310 becomes relatively heavier than the door front surface part 350, and accordingly, the center of mass of the door 300 is further biased toward the rear side of the door 300.

Further, since the door 300 is provided in the form in which the up-down length of the door front surface part 350 is shorter than the front-rear length of the door upper surface part 310, the center of mass of the door 300 is clearly biased toward the rear side of the door 300.

Also, since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of mass of the cooking appliance moves toward the rear side of the cooking appliance to the extent that most of the load of the door 300 is concentrated on the rear side of the cooking appliance.

In this way, there are advantages in that, since concern about the center of mass of the cooking appliance being biased toward the front is decreased even when the door is opened, the risk of the cooking appliance falling forward is significantly lowered, and thus safety and convenience in use of the cooking appliance are improved.

Meanwhile, in the present embodiment, as described above, the input part 360 is disposed in the door 300 instead of the housing 100.

According to the present embodiment, the door 300 is formed including the door upper surface part 310 disposed at the upper side of the door 300 and the door front surface part 350 disposed at the front side of the door 300. Also, since the see-through window W, which is an element used to occupy most of the region of the door in conventional cooking appliances, is disposed in the door upper surface part 310, a sufficient space for placing the input part 360 may be provided in the door front surface part 350.

Also, since elements such as the see-through window W or the first heating part 400 are not disposed in the door front surface part 350, a space portion sufficient for installing the first control board 500, which is an element that should be closely connected to the input part 360, may be formed inside the door front surface part 350.

In this way, the cooking appliance of the present embodiment may provide an environment advantageous for installing the input part 360 in the door 300. Accordingly, efficient arrangement of the input part 360 is possible by placing the input part 360 in the door 300.

Also, by the input part 360 and the first control board 500 being installed in the door 300 as described above, the electrical connections among the first heating part 400, the input part 360, and the first control board 500 which are installed in the door 300 may also be more efficiently performed.

That is, not only the electrical connections among the first heating part 400, the input part 360, and the first control board 500 is performed inside the door 300, but also lengths of wires for the electrical connections may be shortened. In this way, the wires may be arranged in a simple and neat manner, and the wires may be arranged inside the door 300 so as not to be exposed to the outside.

Also, when the input part 360 is installed in the door 300 as in the present embodiment, there is no need to provide a space for installing the input part 360 and the first control board 500 in the housing 100.

Accordingly, the housing 100 may be designed in size and shape only in consideration of the size of the cooking compartment 105 and the size of the door 300 without the need for taking into consideration the space for installing the input part 360 and the first control board 500.

Accordingly, the housing 100 may be provided in a size reduced to the extent that the space for installing the input part 360 and the first control board 500 is eliminated, and the door 300 may also be provided in a size enlarged corresponding to the size of the housing 100.

In this way, it is possible to, while reducing the size of the housing 100, provide an entrance that is large enough for the tray 200 and food to enter and exit the cooking appliance, thereby providing the cooking appliance of the present embodiment which has a compact exterior and is more convenient to use.

[Structure of Second Heating Part, Receiver Coil, and Second Control Board]

Figure 26:
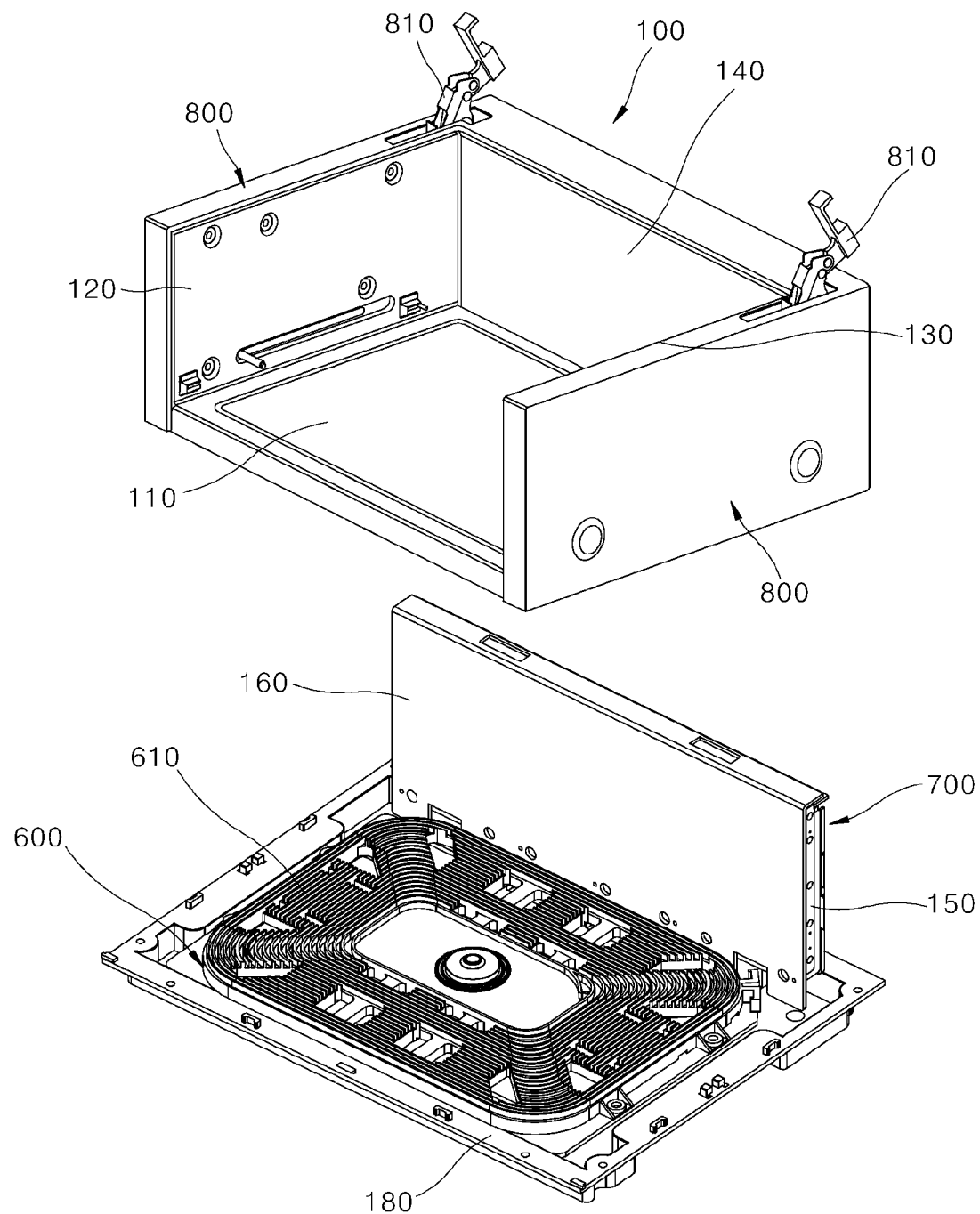
FIG. 26 is an exploded perspective view separately illustrating a housing and a second heating part according to an embodiment of the present invention.
Figure 27:
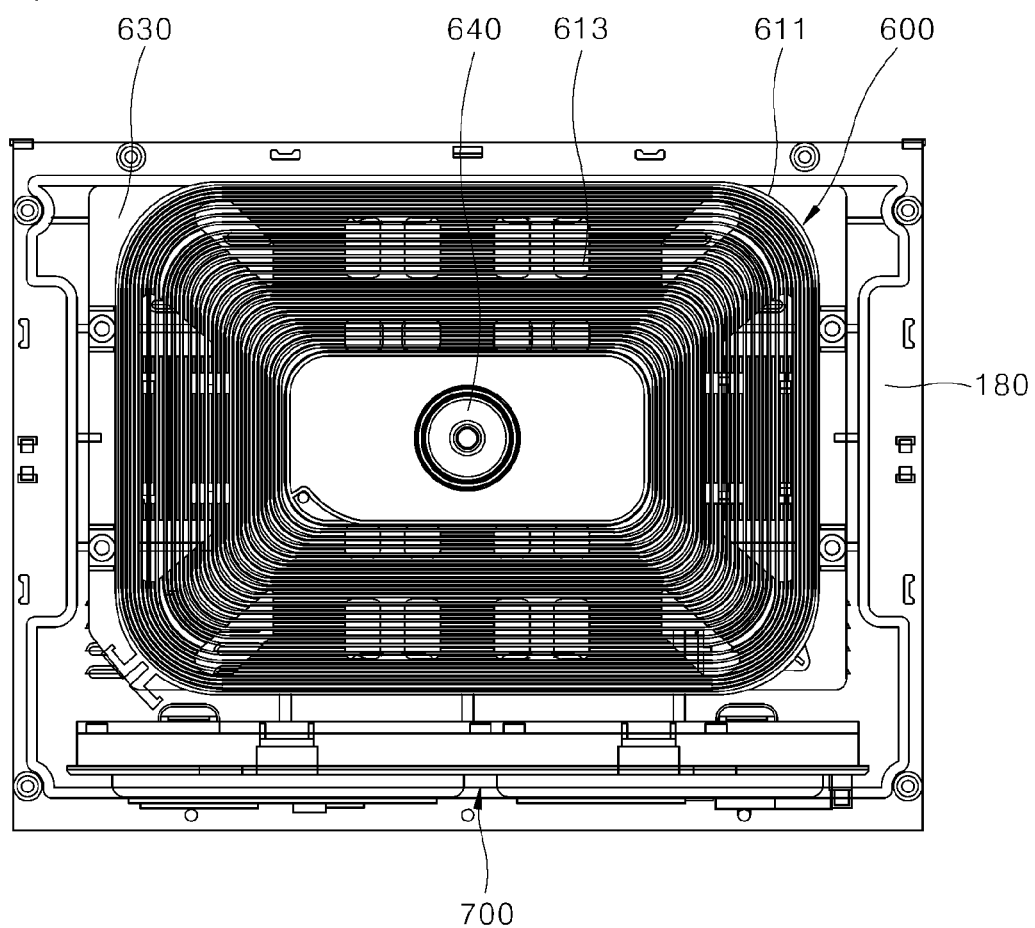
FIG. 27 is a plan view illustrating the second heating part illustrated in FIG. 26.
Figure 28:
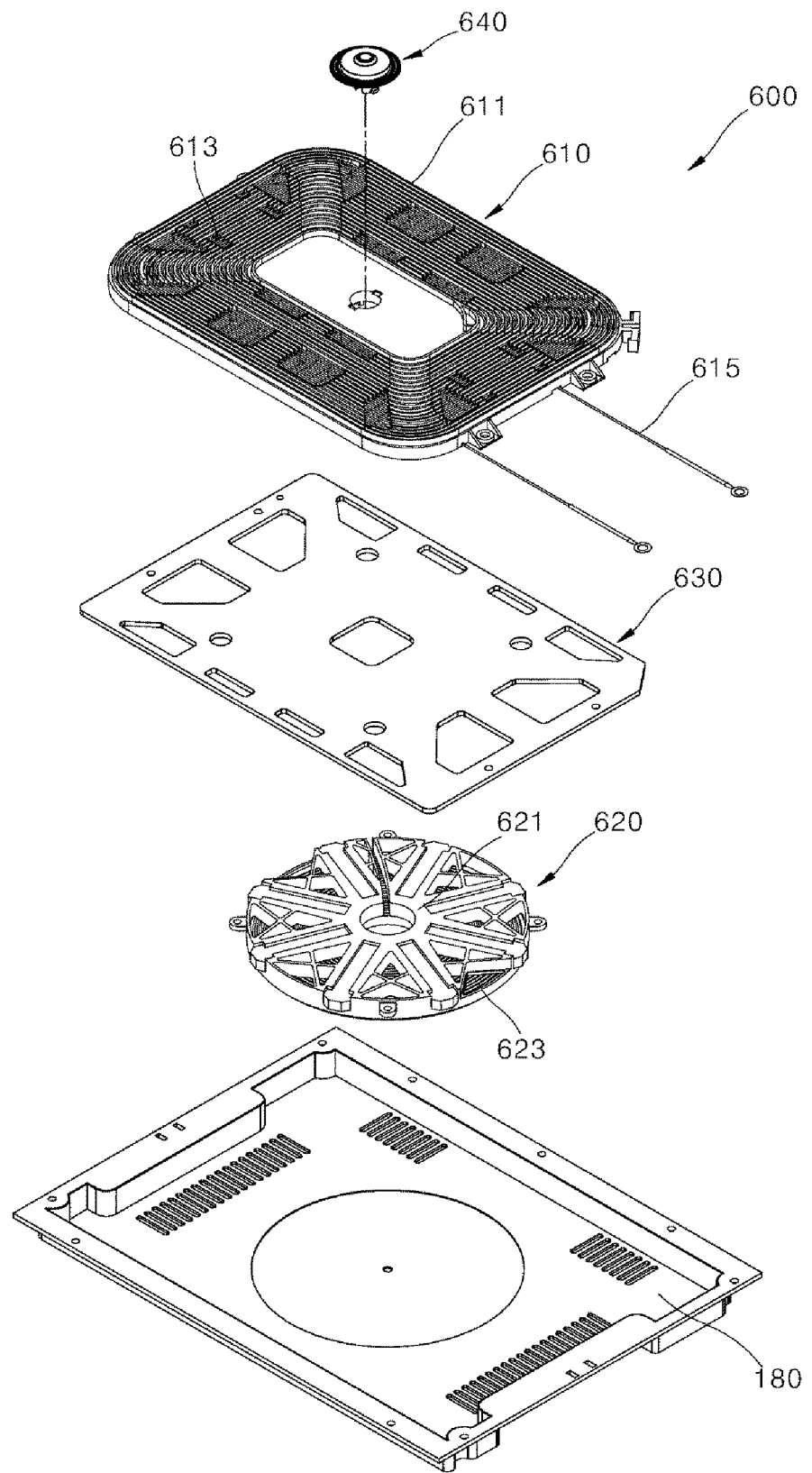
FIG. 28 is an exploded perspective view separately illustrating the second heating part illustrated in FIG. 26, a receiver coil, and an electromagnetic shielding plate.

FIG. 26 is an exploded perspective view separately illustrating a housing and a second heating part according to an embodiment of the present invention, and FIG. 27 is a plan view illustrating the second heating part illustrated in FIG. 26. FIG. 28 is an exploded perspective view separately illustrating the second heating part illustrated in FIG. 26, a receiver coil, and an electromagnetic shielding plate, FIG. 29 is a cross-sectional view illustrating a coupling state among the second heating part illustrated in FIG. 26, a temperature sensor, the receiver coil, and the electromagnetic shielding plate, and FIG. 30 is a rear view illustrating a second control board illustrated in FIG. 26.

Referring to FIG. 3 and FIGS. 26 and 27, the second heating part 600 is disposed at the lower portion of the tray 200. The second heating part 600 is installed at the lower portion of the bottom surface 110 of the housing 100 and is provided in the form of a heating part which heats the tray 200 using a different heating method from the first heating part 400, e.g., an induction heating part. The induction heating part may be provided in the form including the working coil 610 installed at the lower portion of the bottom surface 110 of the housing 100 and may induce heating of the tray 200 from the lower portion of the tray 200.

The working coil 610 includes a coil installation base 611. In the present embodiment, the coil installation base 611 is illustrated as being formed in a quadrilateral shape similar to the shape of the tray 200. This is a result of designing the size and shape of the working coil 610 to be similar to those of the tray 200 so that the entire region of the tray 200 may be heated by the working coil 610.

Figure 29:
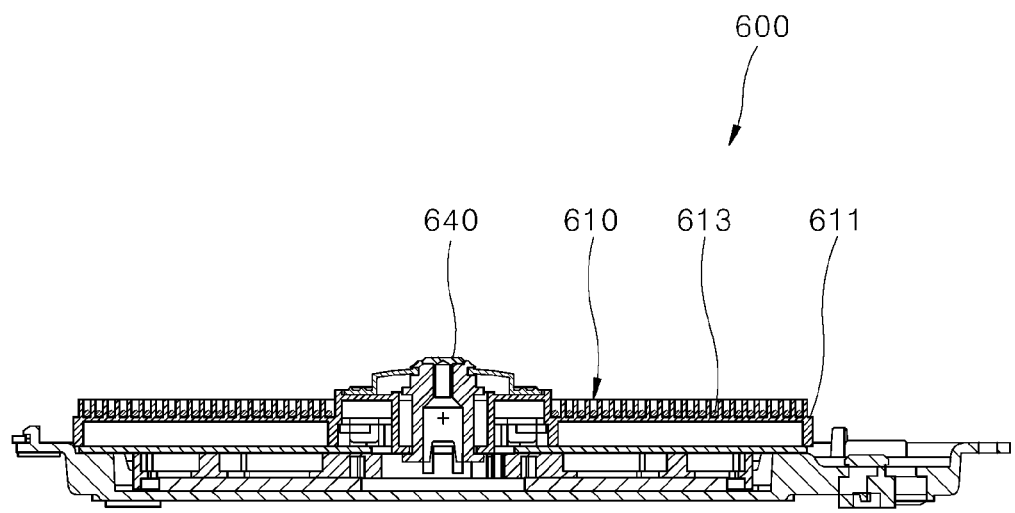
FIG. 29 is a cross-sectional view illustrating a coupling state among the second heating part illustrated in FIG. 26, a temperature sensor, the receiver coil, and the electromagnetic shielding plate.
Figure 30:
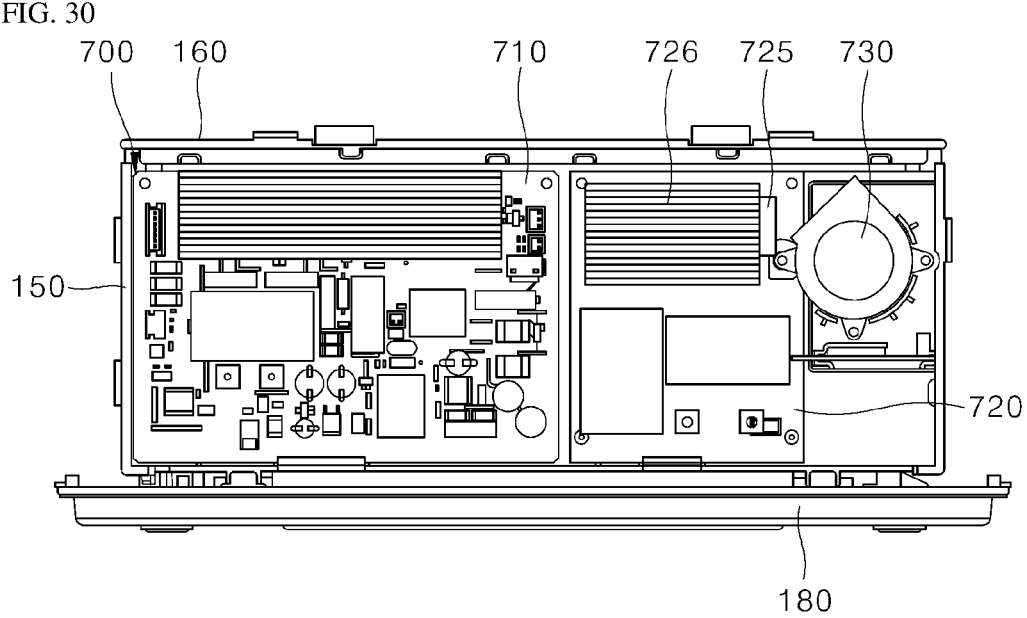
FIG. 30 is a rear view illustrating a second control board illustrated in FIG. 26.

As illustrated in FIGS. 28 and 29, the coil installation base 611 has a spiral groove, in which a coil 613 may be installed provided, at the center thereof. The coil 613 is accommodated in the spiral groove and fixed by being densely wound at an upper portion of the coil installation base 611. A coil connection wiring 615 connected to a coil control printed circuit board (PCB) for controlling the coil 613 is provided at an end portion of the coil 613.

Further, the second heating part 600 may further include a receiver coil 620. The receiver coil 620 is an element provided to receive wirelessly-transmitted power and is disposed at a lower portion of the second heating part 600. Also, a base 180 is disposed at a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may be formed including a coil installation base 621 and a coil 623. Unlike the coil installation base 611 of the working coil 610, the coil installation base 621 of the receiver coil 620 is formed in a substantially circular shape. This is a result of designing the shape of the receiver coil 620 to be similar to the shape of a working coil of an induction heating part provided at a cooktop.

According to the present embodiment, the receiver coil 620 is provided to be able to receive power from an induction heating part of another cooking appliance, i.e., a cooktop, which is separately provided from the cooking appliance of the present embodiment.

For example, the cooking appliance of the present embodiment may be used while being placed on a cooktop. In this case, power required for operation of the cooking appliance may be received from an induction heating part of the cooktop.

For example, when the working coil of the cooktop and the cooking appliance of the present embodiment are operated together while the cooking appliance of the present embodiment is placed on the cooktop, power supplied through the cooktop may be transmitted to the receiver coil 620.

In this case, current is induced toward the receiver coil 620 through a magnetic field which changes in the working coil of the cooktop due to the magnetic induction phenomenon. In this way, power supplied through the cooktop may be transmitted to the receiver coil 620. In this process, in order to improve power reception efficiency of the receiver coil 620, the cooking appliance of the present embodiment may be placed on the cooktop such that the position of the receiver coil 620 and the position of the working coil provided in the induction heating part of the cooktop overlap in the up-down direction.

Further, the induction heating part may further include an electromagnetic shielding plate 630 disposed between the working coil 610 and the receiver coil 620. The electromagnetic shielding plate 630 may be provided in the form of a metal plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

The cooking appliance of the present embodiment including the receiver coil 620 may be operated by wirelessly receiving power from the induction heating part of the cooktop. Since the cooking appliance does not require untidy power cables and thus may be provided in a simple and neat exterior, and the cooking appliance may be operated by wirelessly receiving power just by being placed on the cooktop, a user's satisfaction may be further improved.

As illustrated in FIGS. 26, 27, and 30, the receiver coil 620 is electrically connected to the second control board 700 disposed behind the working coil 610 and the receiver coil 620. The power wirelessly transmitted from the working coil of the cooktop to the receiver coil 620 is transmitted to the second control board 700 electrically connected to the receiver coil 620.

According to the present embodiment, the inner space at the lower portion of the bottom surface 110 of the housing 100 and the inner space at the rear of the back surface 140 of the housing 100 are connected to each other. The working coil 610 of the induction heating part disposed at the lower portion of the bottom surface 110 of the housing 100 and the second control board 700 disposed at the rear of the back surface 140 of the housing 100 may be electrically connected to each other by a cable which connects the working coil 610 and the second control board 700 through the inner space at the lower portion of the bottom surface 110 of the housing 100 and the inner space at the rear of the back surface 140 of the housing 100 which are connected to each other.

A power processing part to which power required for operation of the induction heating part and the like of the second heating part 600 is supplied is provided at the second control board 700. The power processing part is connected to the receiver coil 620 and receives power from the receiver coil 620 and processes the received power to a form suitable for use in the second heating part 600 and the like. The power processing part may include a noise filter PCB 710, and a coil control PCB 720 for controlling operation of the working coil 610 may be further provided at the second control board 700.

The noise filter PCB 710 serves to remove noise from power to be supplied to the working coil 610, and the coil control PCB 720 controls operation of the working coil 610. A chip for controlling the operation of the working coil 610, e.g., an insulated gate bipolar transistor (IGBT) chip 725, may be mounted on the coil control PCB 720.

The IGBT chip 725 is a kind of high heat generation chip that requires temperature management. When the IGBT chip 725 is overheated to a predetermined temperature or more, the IGBT chip 725 is unable to control the working coil 610.

In consideration of such an aspect, a second cooling fan 730 is installed at the second control board 700. The second cooling fan 730 may be a sirocco fan which suctions air from an outer space of the housing 100 and discharges the air toward the IGBT chip 725.

The second cooling fan 730 may be disposed at the side of the IGBT chip 725 and may suction air from the rear side of the housing 100 and discharge the air sideward toward the IGBT chip 725.

The air introduced into the space portion at the rear of the back surface of the housing 100 through the second cooling fan 730 may first come into contact with the IGBT chip 725 and a heat sink 726 for cooling the IGBT chip 725, cool the IGBT chip 725 and the heat sink 726, cool a portion of the noise filter PCB 710, and then be discharged to the outside.

Meanwhile, as illustrated in FIGS. 26 to 29, the second heating part 600 of the present embodiment may further include a temperature measurement module 640. The temperature measurement module 640 is provided to measure a temperature of the tray or a temperature of the inside of the cooking compartment 105 in which the tray is disposed.

The temperature measurement module 640 may be disposed at the center of the working coil 610. Specifically, the temperature measurement module 640 may be disposed at a portion where the coil 613 is not disposed on the coil installation base 611, e.g., a central portion of the coil installation base 611.

The temperature measurement module 640 may be fitted and coupled to the working coil 610 via a through-hole formed in the central portion of the coil installation base 611. Also, the temperature measurement module 640 installed in this way may be formed including a temperature sensor such as a thermistor and may be disposed at the lower portion of the bottom surface 110 of the housing 100 and measure the temperature of the tray or the temperature of the inside of the cooking compartment 105 in which the tray is disposed.

[Arrangement Relationship Among Hinge Assembly, Second Heating Part, Second Control Board, See-Through Window, First Heating Part, Input Part, and First Control Board]

Referring to FIG. 3 and FIGS. 26 to 30, the hinge assembly 800, the second heating part 600, and the second control board 700 are disposed in the housing 100.

The cooking compartment 105 may be formed inside the housing 100, and the tray 200 may be installed in the cooking compartment so as to be withdrawable therefrom. The second heating part 600 for heating the tray 200 is disposed at the lower portion of the housing 100. Also, the hinge assembly 800 which rotatably supports the door 300 is disposed at each of both side portions of the housing 100.

The hinge assembly 800 is disposed at both side portions of the housing 100 in order to stably support the door 300 from both sides of the door 300. Also, the hinge assembly 800 interlocks with rotation of the door 300 and causes the tray 200 to be withdrawn. To allow the hinge assembly 800 to be coupled to the tray 200 so that the hinge assembly 800 may move the tray 200 in the front-rear direction, the hinge assembly 800 is disposed at both side portions of the housing 100.

That is, the hinge assembly 800 should be disposed at both side portions of the housing 100 for the hinge assembly 800 to be coupled to the tray 200 so that the hinge assembly 800 may stably support the door 300 and move the tray 200 in the front-rear direction.

Further, since the upper surface and the front surface of the housing 100 are open and the second heating part 600 is installed at the lower portion of the housing 100, the hinge assembly 800 is inevitably disposed at the rear or both side portions of the housing 100. Due to the above-described reasons, in many ways, it is advantageous for the hinge assembly 800 to be disposed at both side portions of the housing 100.

The receiver coil 620 is disposed at the lower portion of the housing 100, more specifically, at the lower portion of the second heating part 600. Since the receiver coil 620 has to be disposed at a position most adjacent to a target of wireless power transmission, e.g., the working coil of the cooktop, the receiver coil 620 should be disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such an aspect, the electromagnetic shielding plate 630 may be disposed between the working coil 610 and the receiver coil 620.

Since the second control board 700 is an element closely related to the power reception through the receiver coil 620 and the operation of the working coil 610, the second control board 700 may be disposed at a position adjacent to the receiver coil 620 and the working coil 610.

Since the second heating part 600 and the receiver coil 620 are disposed at the lower portion of the housing 100, and the hinge assembly 800 is disposed at both side portions of the housing 100, the rear of the housing 100 may be the most suitable position for arrangement of the second control board 700.

In consideration of such an aspect, the second control board 700 is installed in a space at the rear of the back surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assembly 800. Accordingly, since, when configuring wires for connecting the second control board 700 and the elements disposed in the door 300, the wires may be easily concealed inside the hinge assembly 800, there is an advantage in that it is possible to configure the wires in a neat and simple manner such that the wires are not easily exposed to the outside.

As described above, the second heating part 600 and the receiver coil 620, the hinge assembly 800, and the second control board 700 are disposed at the lower portion of the housing 100, both side portions of the housing 100, and the rear of the housing 100, respectively. The elements are those suitable to be disposed in the housing 100 and are disposed at optimal positions that allow the elements to function optimally, have high structural stability, have neat and simple wiring configurations, and efficiently avoid interference therebetween.

Meanwhile, referring to FIGS. 3 to 5, the see-through window W, the first heating part 400, the input part 360, and the first control board 500 are disposed in the door 300. The elements are those more suitable to be disposed in the door 300 than in the housing 100 due to functions thereof. Also in consideration of an aspect that various other elements are already disposed in the housing 100 and thus it is difficult for other elements to be disposed in the housing 100, the see-through window W, the first heating part 400, the input part 360, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking compartment 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed at a higher portion than the tray 200.

The first heating part 400 installed in the door upper surface part 310 together with the see-through window W as described above should be disposed at a position at which the first heating part 400 is not exposed through the see-through window W when viewed from the top. When the first heating part 400 is disposed in a region exposed through the see-through window W, it is aesthetically not desirable, a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the input part 360 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the input part 360 in the door upper surface part 310. Also, when the input part 360 is disposed in the door upper surface part 310, in the process of opening the door 300, a collision occurs between the input part 360 and an obstacle disposed at the upper portion of the cooking appliance, and there is a risk of damage of the input part 360. Particularly, when the input part 360 is provided in the form protruding from the door 300, the risk is even greater.

Also, the door upper surface part 310 in which the first heating part 400 is disposed is likely to have a higher temperature than the door front surface part 350. Considering that the input part 360 is an element held by the user's hand and manipulated, when the input part 360 is disposed in the door upper surface part 310, the possibility that the user will come into contact with a hot portion of the door upper surface part 310 in the process of manipulating the input part 360 will be increased. That is, when the input part 360 is disposed in the door upper surface part 310, a risk that the user will suffer an injury such as a burn in the process of manipulating the input part 360 may be increased.

In consideration of such an aspect, the input part 360 is disposed in the door front surface part 350 instead of the door upper surface part 310. Since the input part 360 is disposed in the door front surface part 350, the user may safely and conveniently control the operation of the cooking appliance from the front of the cooking appliance.

In addition to the input part 360, the first control board 500 is also disposed in the door front surface part 350.

Various elements and circuits related to reception of manipulation signals input via the input part 360, generation of control signals for controlling operations of the first heating part 400 and the second heating part 600, and the like are provided in the first control board 500. Therefore, in particular, the first control board 500 is required to be electrically connected to the input part 360.

According to the present embodiment, like the input part 360, the first control board 500 is installed in the door front surface part 350 and disposed at a position very close to the input part 360. Therefore, connection between the input part 360 and the first control board 500 may be configured in the form in which the input part 360 is directly connected to the first control board 500, and, accordingly, a very simple and stable connection structure may be provided for the input part 360 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, the stability and operational reliability of the cooking appliance may be further improved.

[Structure of Door Frame]

Figure 31:
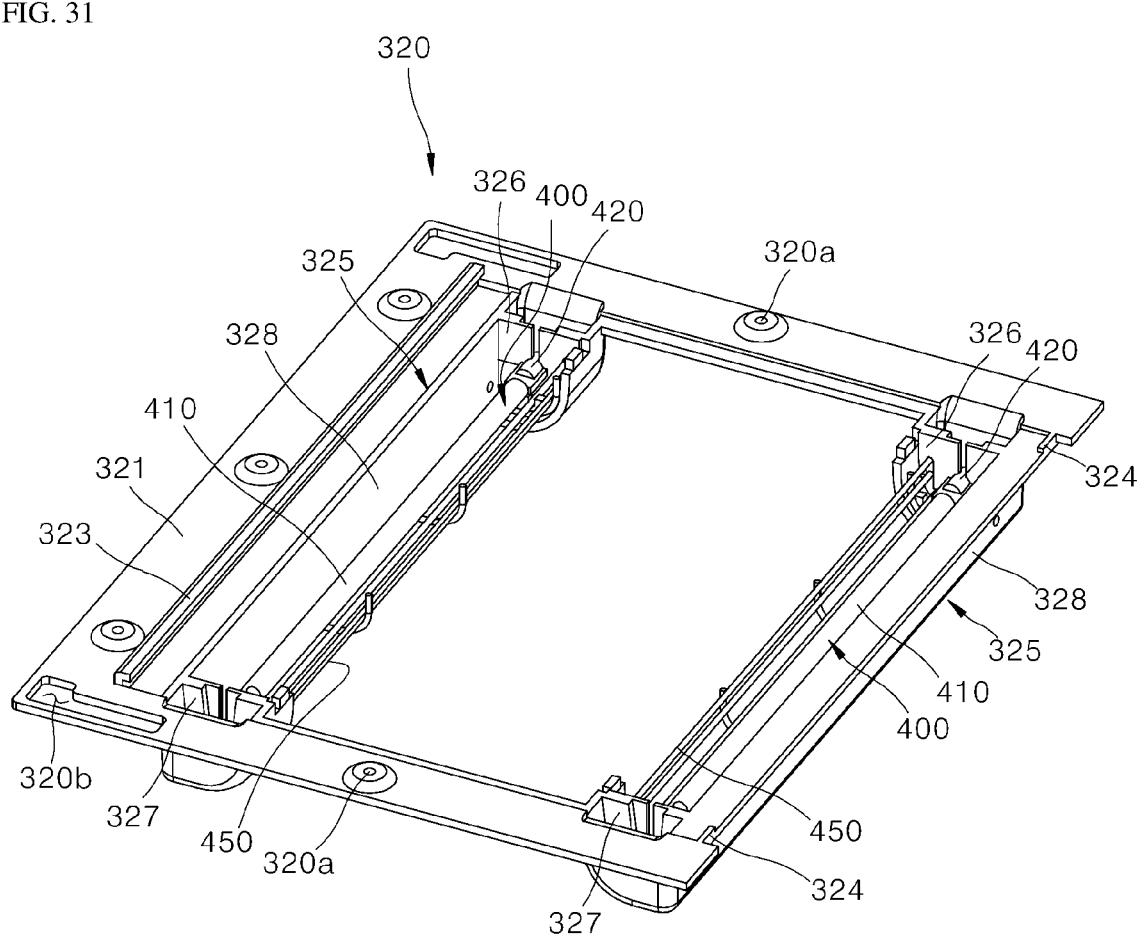
FIG. 31 is a perspective view separately illustrating a door frame and elements installed in the door frame according to an embodiment of the present invention.
Figure 32:
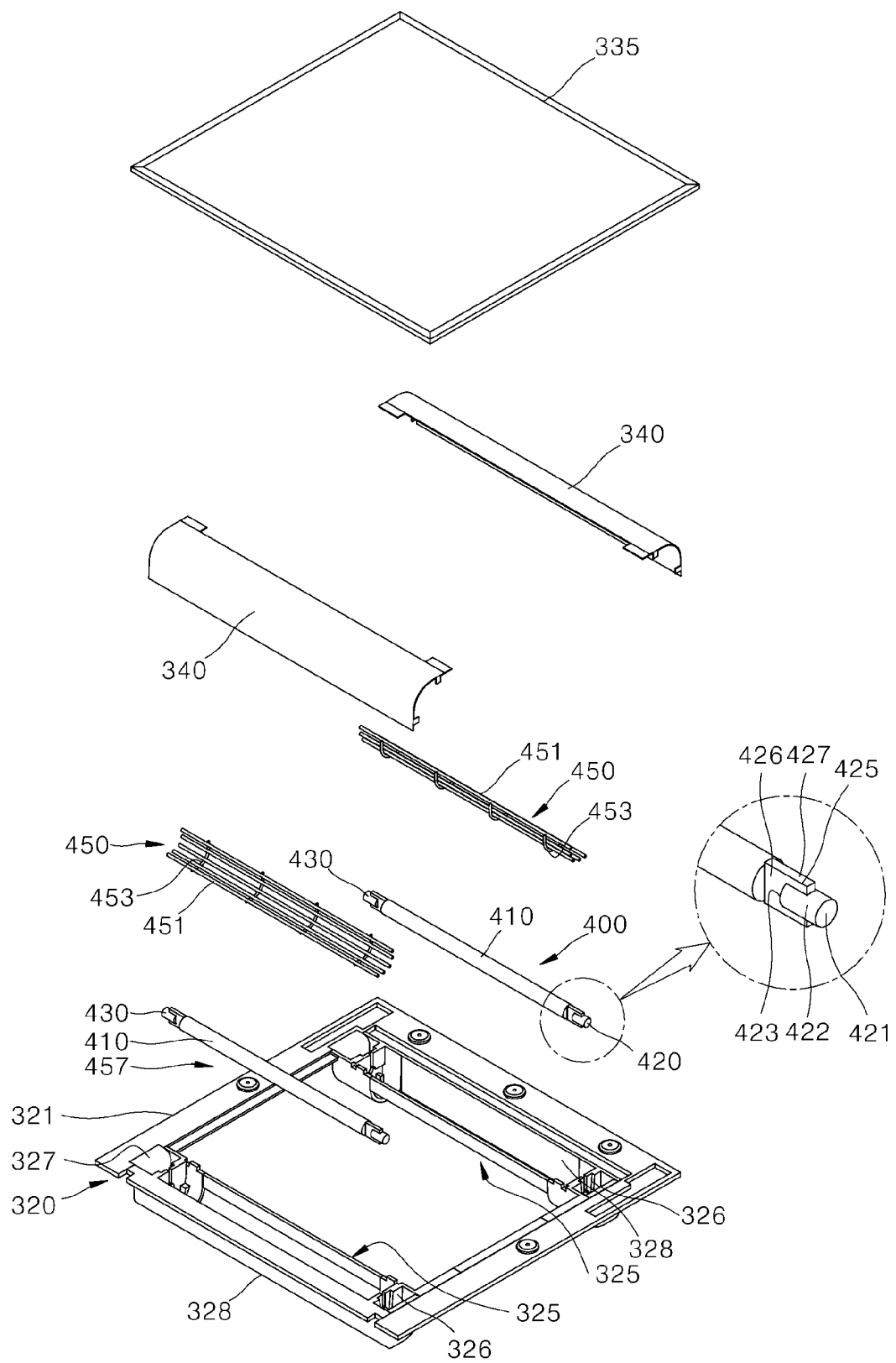
FIG. 32 is an exploded perspective view illustrating the door frame and the elements installed in the door frame, which are illustrated in FIG. 31, in an exploded manner.

FIG. 31 is a perspective view separately illustrating a door frame and elements installed in the door frame according to an embodiment of the present invention, and FIG. 32 is an exploded perspective view illustrating the door frame and the elements installed in the door frame, which are illustrated in FIG. 31, in an exploded manner. Also, FIG. 33 is an enlarged view of portions of the door frame and the elements installed in the door frame, which are illustrated in FIG. 31, and FIG. 34 is a view illustrating a state in which a first heating part and a protective grille are removed from the door frame illustrated in FIG. 33.

Figure 33:
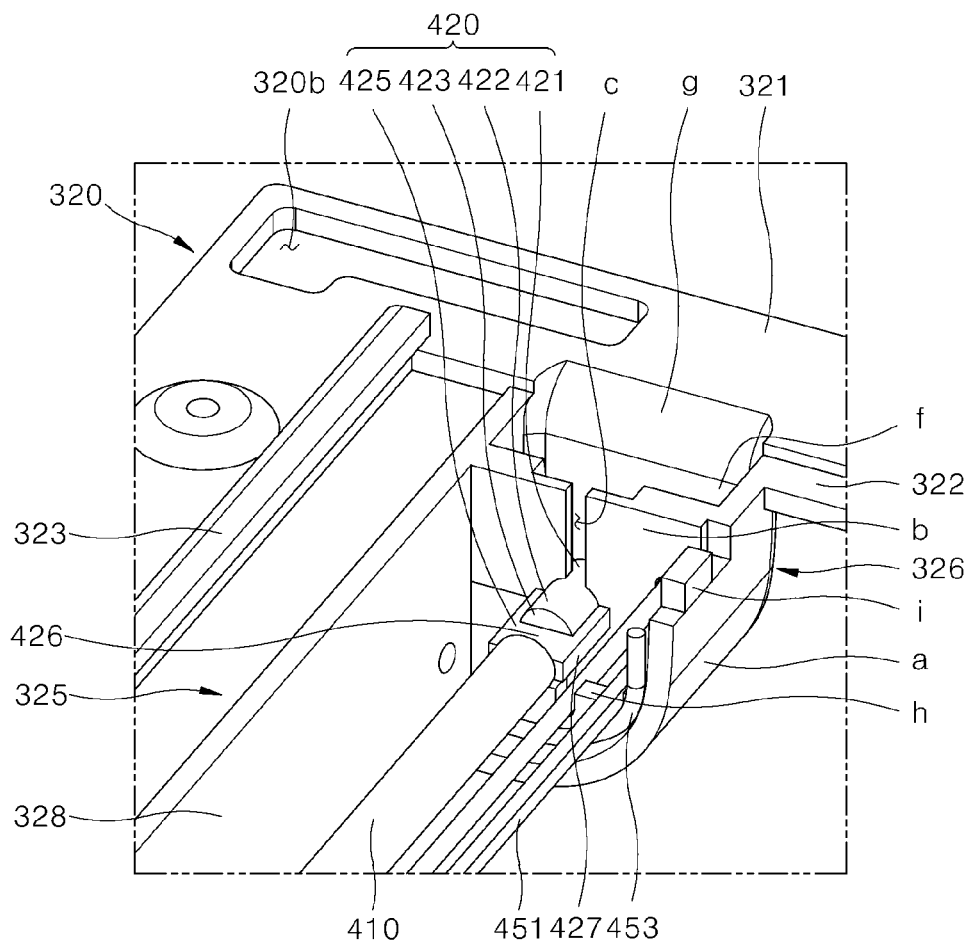
FIG. 33 is an enlarged view of portions of the door frame and the elements installed in the door frame, which are illustrated in FIG. 31.
Figure 34:
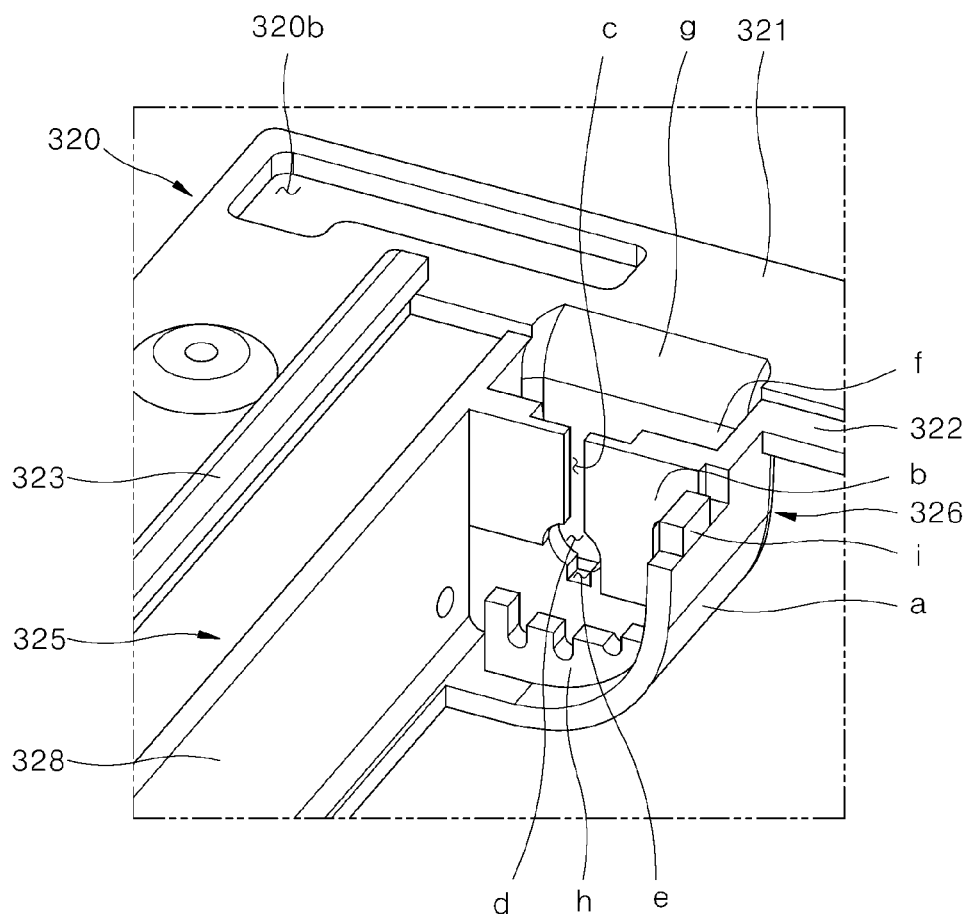
FIG. 34 is a view illustrating a state in which a first heating part and a protective grille are removed from the door frame illustrated in FIG. 33.

In FIGS. 31, 33, and 34, a glass and a reflector are not illustrated.

Referring to FIGS. 31 to 34, the door frame 320 is coupled to the door 300 in such a way that the door frame 320 covers the lower portion of the door upper surface part 310. The door frame 320 may be coupled to the door 300 in such a way that the door frame 320 supports the first heating part 400. Also, the first heating part 400 coupled to the door frame 320 may be maintained in a state of being disposed in the door 300, more specifically, at the lower portion of the door upper surface part 310.

The door frame 320 may be formed including a coupling part 321 and a heater mounting part 325. The heater mounting part 325 may be provided in the form protruding from the coupling part 321, and the first heating part 400 may be coupled to the heater mounting part 325.

The coupling part 321 may be coupled to the door upper surface part 310 so that the heater mounting part 325 is supported by the door upper surface part 310. The coupling part 321 may be provided in the form of a hollow square-shaped frame in which a through-hole is formed.

A seating surface 322 may be formed at an inner side surface of the coupling part 321 adjacent to the through-hole. The seating surface 322 may form a concave plane whose height is lower than that of an upper surface of the coupling part 321, and surrounding portions of edges of the glass 335 may be seated on the seating surface 322.

In this way, the glass 335 seated on the seating surface 322 may be disposed at upper portions of the heater mounting part 325 and the first heating part 400 installed at the heater mounting part 325 in such a way that the glass 335 covers the through-hole from the top. In this case, the seating surface 322 may form a plane whose height is lower than that of the upper surface of the coupling part 321. The seating surface 322 may form a plane whose height is lower than that of the coupling part 321 as much as a height substantially corresponding to a thickness of the glass 335. In this way, the glass 335 may be installed in the door frame 320 while being disposed at a position where the glass 335 does not protrude upward past the upper surface of the coupling part 321.

The seating surface 322 may be disposed at both sides of the through-hole in the left-right direction. The seating surface 322 may also be disposed at one side or the other side of the through-hole in the front-rear direction. In the present embodiment, the seating surface 322 is illustrated as being disposed at both sides of the through hole in the left-right direction and the front side of the through-hole. Accordingly, the glass 335 may be stably installed in the door frame 320 such that surrounding portions of three edges of the glass 335 are supported by the seating surface 322.

Also, since movement of the glass 335 in the left-right direction is restricted by the inner side surface of the coupling part 321 surrounding the seating surface 322, an installation position of the glass 335 may be guided in the left-right direction, and shaking of the glass 335 may be suppressed in the left-right direction such that the installation of the glass 335 may be stably performed.

Further, a restricting rib 323 and a stopper 324 may be further provided in the door frame 320. The restricting rib 323 may be disposed at one side of the through-hole in the front-rear direction, and the stopper 324 may be disposed at the other side of the through-hole in the front-rear direction. In the present embodiment, the restricting rib 323 is illustrated as being disposed at the rear of the through-hole, and the stopper 324 is illustrated as being disposed at the front of the through-hole.

The restricting rib 323 may be formed to protrude from the coupling part 321. Specifically, the restricting rib 323 may be formed in a shape in which a portion protruding upward from the coupling part 3321 and a portion protruding toward the through-hole from the portion protruding upward are connected in an L-shape. The restricting rib 323 interferes with a rear edge and an upper surface of the glass 335 from the rear of the glass 335, thereby restricting rearward and upward movements of the glass 335.

The stopper 324 may be formed to protrude upward from the coupling part 321. The stopper 324 interferes with a front edge of the glass 335 from the front of the glass 335, thereby restricting forward movement of the glass 335.

That is, the glass 335 may be seated on the seating surface 322 such that the surrounding portions of the three edges of the glass 335 are supported by the seating surface 322 and both sides of the glass 335 in the left-right direction are supported by the inner side surface of the coupling part 321. Also, the forward movement of the glass 335 may be restricted by the stopper 324, and the rearward and upward movements of the glass may be restricted by the restricting rib 323. In this way, the glass 335 may be stably supported and installed in the door frame 320.

Meanwhile, the first heating part 400 may be formed including a heating element 410, a first connecting end 420, and a second connecting end 430.

The heating element 410 corresponds to a portion emitting heat in the first heating part 400 provided in the form of an electric heater. The heating element 410 may be formed in the shape of a rod having a predetermined length.

The first connecting end 420 is disposed at an end of one side of the heating element 410 in the longitudinal direction, and the second connecting end 430 is disposed at an end of the other side of the heating element 410 in the longitudinal direction.

At least one of the first connecting end 420 and the second connecting end 430 includes a cylindrical part 421 and a key-shaped part 425. In the present embodiment, both the first connecting end 420 and the second connecting end 430 are illustrated as including the cylindrical part 421 and the key-shaped part 425.

The cylindrical part 421 is disposed at an end of the heating element 410 in the longitudinal direction. The cylindrical part 421 may be formed in a cylindrical shape in which an underside of a circular shape is disposed at the outermost end portion of the first heating part 410.

The key-shaped part 425 is disposed between the heating element 410 and the cylindrical part 421. That is, the key-shaped part 425 is disposed at both side ends of the heating element 410 in the longitudinal direction, and the cylindrical part 421 is disposed at the outermost side of the heating element 410 in the longitudinal direction.

The key-shaped part 425 may be formed in a flat hexahedral shape whose thickness is smaller than a diameter of the cylindrical part 421 and whose width is larger than the diameter of the cylindrical part 421. For example, a pair of quadrilateral surfaces 426 (hereinafter referred to as "first surfaces") parallel to a width direction of the key-shaped part 425 may be disposed to be spaced apart from each other in a thickness direction of the key-shaped part 425 and form an upper surface and a lower surface of the key-shaped part 425. Also, two pairs of quadrilateral surfaces 427 (hereinafter referred to as "second surfaces") parallel to the thickness direction of the key-shaped part 425 may be disposed between the pair of first surfaces 426 and form four side surfaces of the key-shaped part 425.

In this case, the first surface 426 may be formed of a quadrilateral surface having a side longer than the diameter of the cylindrical part 421, and the second surface 427 may be formed of a quadrilateral surface having a side shorter than the diameter of the cylindrical part 421.

Therefore, when the first connecting end 420 or the second connecting end 430 is viewed in the longitudinal direction of the first heating part 410, the cylindrical part 421 may protrude outward past the key-shaped part 425 in the radial direction of the cylindrical part 421 in most of the region, and the key-shaped part 425 may protrude outward past the cylindrical part 421 in the radial direction of the cylindrical part 421 only in a portion of the region.

The heater mounting part 325 is provided to fix the first connecting end 420 and the second connecting end 430 which are provided as described above. The heater mounting part 325 may be formed including a first connecting end fixing part 326 which fixes the first connecting end 420 and a second connecting end fixing part 327 which fixes the second connecting end 430.

At least one of the first connecting end fixing part 326 and the second connecting end fixing part 327 may be formed including a cover a and a support wall b. In the present embodiment, both the first connecting end fixing part 326 and the second connecting end fixing part 327 are illustrated as identically including the cover a and the support wall b.

The cover a is provided in the form of surrounding the surrounding portions of the connecting end from the outer side of the connecting end in the circumferential direction. The cover a may be formed in a curved shape surrounding a lower portion and one side portion of the connecting end and may be formed in a length corresponding to a length of each connecting end or in a length slightly longer than the length of each connecting end.

Further, the heater mounting part 325 may further include a shielding plate 328. The shielding plate 328 is disposed at a side farther from the center of the cooking compartment in the front-rear direction than the first heating part 400 and connects the first connecting end fixing part 326 and the second connecting end fixing part 327 to each other. The shielding plate 328 may be formed in the shape of a plate having a length extending in the longitudinal direction of the first heating part 400.

According to the present embodiment, the first connecting end fixing part 326 and the second connecting end fixing part 327 are disposed at both end portions of the first heating part 400 in the longitudinal direction. Also, the shielding plate 328 is disposed at a side farther from the center of the cooking compartment in the front-rear direction than the first heating part 400, of a front side and a rear side of the first heating part 400.

Also, the cover a is disposed at a side closer to the center of the cooking compartment in the front-rear direction than the first heating part 400, of the front side and the rear side of the first heating part 400. The cover a may surround the connecting end at a lower portion of the first heating part 400 and at the side closer to the center of the cooking compartment in the front-rear direction than the first heating part 400.

A lower side of the cover a is connected to the shielding plate 328. Accordingly, a space surrounded by the cover a and the shielding plate 328, which are connected in a U-shape, is formed around the connecting end.

The support wall b is disposed in the space surrounded by the cover a and the shielding plate 328 as described above. The support wall b may be formed in the form protruding toward the space from the cover a and the shielding plate 328. The support wall b formed in this way may divide the space surrounded by the cover a and the shielding plate 328 into an inner side space and an outer side space in the longitudinal direction of the first heating part 400. Also, the connecting end may be fitted and coupled to the support wall b.

A coupling hole c and a through-hole d may be formed in the support wall b.

The coupling hole c may be formed to pass through the support wall b. The coupling hole c may have a shape corresponding to the shape of an outer circumferential surface of the cylindrical part 421, e.g., a hollow circular shape. By the cylindrical part 421 being fitted to the coupling hole c having the above-described shape, the connecting end may be fitted and coupled to the support wall b.

The through-hole d may be formed to pass through the support wall b. The through-hole d may be formed by being cut out up to the coupling hole c from an upper side end portion of the support wall b. The through-hole d may be formed to pass through the support wall b while having a width corresponding to the length of the short side of the key-shaped part 425. In this way, the through-hole d may form a passage connecting the coupling hole c and an outer portion of the support wall b to each other.

The through-hole d may be formed in a width corresponding to the length of the short side of the key-shaped part 425, in other words, the thickness of the key-shaped part 425.

Any one of the first connecting end 420 and the second connecting end 430 may pass through the through-hole d and be inserted into the coupling hole c in a state in which the first heating part 400 takes a first posture. Here, the first posture is defined as a posture of the first heating part 400 in which the surface parallel to the thickness direction of the key-shaped part 425, that is, the second surface 427, is disposed parallel to a width direction of the through-hole d (see FIG. 36).

Further, an extension hole e may be further formed in the support wall b. The extension hole e may be formed to pass through the support wall b like the through-hole d. The extension hole e may be formed in the shape in which the through-hole d formed at an upper portion of the coupling hole c passes through the coupling hole c and extends to the lower portion of the coupling hole c.

When the connecting end takes the first posture, the key-shaped part 425 protrudes more upward and downward than the cylindrical part 421. Also, when the connecting end takes the first posture, for the cylindrical part 421 to reach a state in which the cylindrical part 421 is allowed to be inserted into the coupling hole c, the cylindrical part 421 and the coupling hole c should be disposed at the same height. However, for the cylindrical part 421 and the coupling hole c to be disposed at the same height, the portion of the key-shaped part 425 protruding downward should be disposed at a lower position than the coupling hole c.

To this end, the extension hole e may be formed at the lower portion of the coupling hole c, and the portion of the key-shaped part 425 protruding downward may be inserted into the extension hole e. That is, the extension hole e may provide a passage that allows the portion protruding downward of the key-shaped part 425, which is inserted into the coupling hole c by taking the first posture, to pass through the coupling hole c downward.

Also, the connecting end may further include an extension part 422. The extension part 422 may be formed by the cylindrical part 421 extending toward the key-shaped part 425. The extension part 422 is formed to protrudes outward in the thickness direction of the key-shaped part 425 from the first surface 426 of the key-shaped part 425 so that a step 423 is formed at a surface of the extension part 422 parallel to the width direction of the key-shaped part 425, that is, between the extension part 422 and the first surface 426. By the extension part 422 formed in this way, a region in which the extension part 422 and the key-shaped part 425 overlap each other is formed in a portion of the key-shaped part 425 adjacent to the cylindrical part 421.

In this region, the extension part 422 protrudes further in the thickness direction of the key-shaped part 425 than the first surface 426 of the key-shaped part 425, and the second surface 427 of the key-shaped part 425 protrudes further in the width direction of the key-shaped part 425 than the extension part 422.

Since the extension part 422 is formed as described above, a strength of a coupling portion between the cylindrical part 421 and the key-shaped part 425 may be further reinforced. When the extension part 422 is not present, the coupling portion between the cylindrical part 421 and the key-shaped part 425 would be limited to an end portion of a side surface of the key-shaped part 425. However, since the extension part 422 is formed at the connecting end, the coupling portion between the cylindrical part 421 and the key-shaped part 425 may extend to the point where the extension part 422 and the key-shaped part 425 overlap each other, and thus the strength of the coupling portion between the cylindrical part 421 and the key-shaped part 425 may be further reinforced.

Also, the step 423 formed due to the extension part 422 may serve to guide a position at which the key-shaped part 425 is inserted into the through-hole d when the connecting end and the support wall b are fitted and coupled to each other. This will be described in detail below.

Meanwhile, each of the first connecting end fixing part 326 and the second connecting end fixing part 327 may further include an outer wall f. The outer wall f may be disposed at an outer side of each support wall b in a longitudinal direction of the heating element 410 and may be connected to the inner side surface of the coupling part 321. The outer wall f forms the outermost side wall of each of the first connecting end fixing part 326 and the second connecting end fixing part 327 in the longitudinal direction of the heating element 410.

A space surrounded by the cover a, the support wall b, the outer wall f, and the shielding plate 328 is formed in each of the first connecting end fixing part 326 and the second connecting end fixing part 327. The corresponding space is a space whose side portion is surrounded by the cover a, the support wall b, the outer wall f, and the shielding plate 328 and whose lower portion is surrounded by the cover a. At least a portion of the cylindrical part 421 at a fixing end fixed to the first connecting end fixing part 326 or the second connecting end fixing part 327 is inserted into the space.

In the space, the cylindrical part 421 may be connected to a cable. The cable connected to the cylindrical part 421 may be a signal cable which transmits a control signal generated in the first control board 500 (see FIG. 7) to the first heating part 400, may be a power cable which supplies power to the first heating part 400, or may be both the signal cable and the power cable.

As illustrated in FIG. 7, the signal cable and the power cable are installed at the cable mounting parts 340 and 345 provided in the door upper surface part 310. Also, the coupling between the door upper surface part 310 and the door frame 320 is performed in a state in which the coupling part 321 covers the portions where the cable mounting parts 340 and 345 are disposed.

A plurality of fastening bosses 341 and 346 may be disposed in the cable mounting parts 340 and 345. Also, a plurality of fastening holes 320a may be disposed in the door frame 320 so as to correspond to the fastening bosses 341 and 346. When portions where the fastening holes 320a and the fastening bosses 341 and 346 are formed are fastened using a fastening member after matching the positions of the door upper surface part 310 and the door frame 320 so that the positions of the fastening holes 320a and the fastening bosses 341 and 346 match each other, the coupling between the door upper surface part 310 and the door frame 320 may be performed. In this case, the portions where the cable mounting parts 340 and 345 are disposed are covered by the coupling part 321.

Although the glasses 330 and 335 do not cover the portions where the cable mounting parts 340 and 345 are disposed, the first heating part 400 and the heater mounting part 325 are disposed at a lower portion of a region covered by the glass 335. Therefore, for the cables installed at the cable mounting parts 340 and 345 to be connected to the connecting end, as illustrated in FIGS. 32 to 35, a passage should be formed between the region of the coupling part 321 not covered by the glass 335 and the region of the heater mounting part 325 covered by the glass 335.

In consideration of such an aspect, in the present embodiment, a concave groove g is provided in a connecting portion between the outer wall f and the coupling part 321. At the connecting portion between the outer wall f and the coupling part 321, the concave groove g forms the upper surface of the coupling part 321, more specifically, a surface more concave than the seating surface 322 of the coupling part 321. The concave groove g formed in this way allows a gap through which the cable may pass to be formed at a lower portion of the glass 335 seated on the seating surface 322, thereby allowing a passage through which the cable may pass to be formed between the cable mounting parts 340 and 345 (see FIG. 7) and the space accommodating the cylindrical part 421 of the connecting end.

Meanwhile, the reference numeral "320b" which has not been described above indicates a hole formed in the door frame 320 to pass through the door frame 320 to form, on the door frame 320, a passage for allowing the hinge part 810 (see FIG. 2) to pass through the door frame 320.

Meanwhile, the cooking appliance of the present embodiment may further include a reflector 440 and a protective grille 450.

The reflector 440 is provided as an element which reflects heat of the first heating part 400 so that the heat of the first heating part 400 may be concentrated on the tray 200 (see FIG. 2). In the present embodiment, the reflector 440 is illustrated as being provided in the shape in which a reflective surface forming a plane parallel to the shielding plate 328 and a reflective surface forming a plane parallel to the glass 335 are connected to each other in an L-shape. The reflector 440 may be coupled to the shielding plate 328, thereby being installed in the door frame 320.

The reflector 440 installed as described above may reflect heat of the first heating part 400 while blocking the first heating part 400 and the shielding plate 328 from each other and blocking the first heating part 400 and the glass 335 from each other, thereby contributing to the concentration of the heat of the first heating part 400 on the tray 200.

The protective grille 450 is provided as an element for protecting the first heating part 400 while allowing the heat of the first heating part 400 to be transmitted to the tray 200. The protective grille 450 is disposed to be spaced apart from the shielding plate 238 with the first heating part 400 disposed therebetween.

The protective grille 450 may be formed including a plurality of steel wires 451 and a plurality of fixing members 453. Each steel wire 451 has a length extending in the longitudinal direction of the first heating part 400 in such a way that each steel wire 451 has a length substantially corresponding to the length of the first heating part 400 or a length slightly longer than the length of the first heating part 400.

The plurality of steel wires 451 are arranged in the form surrounding the surrounding portion of the first heating part 400 from the outside of the first heating part 400 in the circumferential direction. The plurality of steel wires 451 may be disposed to be spaced a predetermined distance apart from each other in the circumferential direction of the first heating part 400.

According to the present embodiment, the surrounding portion of the first heating part 400 in the circumferential direction is surrounded by the reflector 440 and the protective grille 450. That is, one side of the first heating part 400 in the front-rear direction and an upper portion of the first heating part 400 are surrounded by the reflector 440, and the remaining portions of the first heating part 400, that is, the other side of the first heating part 400 in the front-rear direction and the lower portion of the first heating part 400 are surrounded by the protective grille 450.

Accordingly, the plurality of steel wires 451 are arranged in the form of surrounding the other side of the first heating part 400 in the front-rear direction and the lower portion of the first heating part 400 from the outer side of the first heating part 400 in the circumferential direction. Also, the fixing members 453 are formed in the form extending in the direction in which the steel wires 451 are arranged. The plurality of fixing members 453 may be disposed to be spaced a predetermined distance apart from each other in the longitudinal direction of the steel wires 451.

The protective grille 450 may be installed in the door frame 320 in such a way that both side end portions of the protective grille 450 in the longitudinal direction are respectively fixed to the first connecting end fixing part 326 and the second connecting end fixing part 327.

To this end, a grille fixing part may be provided in each of the first connecting end fixing part 326 and the second connecting end fixing part 327. The grille fixing part is provided as a means for fixing the steel wires 451 of the protective grille 450 to the heater mounting part 325. The grille fixing part may be formed including a plurality of fixing ribs h.

The plurality of fixing ribs h are disposed to be spaced a predetermined distance apart from each other in the direction in which the plurality of steel wires 451 are arranged. Also, each fixing rib h is formed to protrude from the cover a toward the first heating part 400. Accordingly, a fixing groove may be formed between the fixing ribs h. The distance at which the fixing ribs h are spaced apart from each other may be determined to allow the fixing groove to be formed in a width corresponding to a thickness of the steel wire 451.

By fitting and fixing the steel wire 451 to each fixing groove formed between the plurality of fixing ribs h as described above, the protective grille 450 and the grille fixing part may be fitted and coupled to each other. In this way, a task of installing the protective grille 450 in the door frame 320 may be easily and promptly performed just by a simple task of fitting and fixing both side end portions of the protective grille 450 to the grille fixing part formed at each of the first connecting end fixing part 326 and the second connecting end fixing part 327.

Further, the plurality of fixing ribs h formed to protrude from the cover a as described above may also serve as reinforcing structures for improving the strength of the cover a.

FIGS. 35 to 39 are views for showing a process in which the first heating part is installed in the door frame.

Hereinafter, the process in which the first heating part 400 is installed in the door frame 320 will be described with reference to FIGS. 35 to 39.

Figure 35:
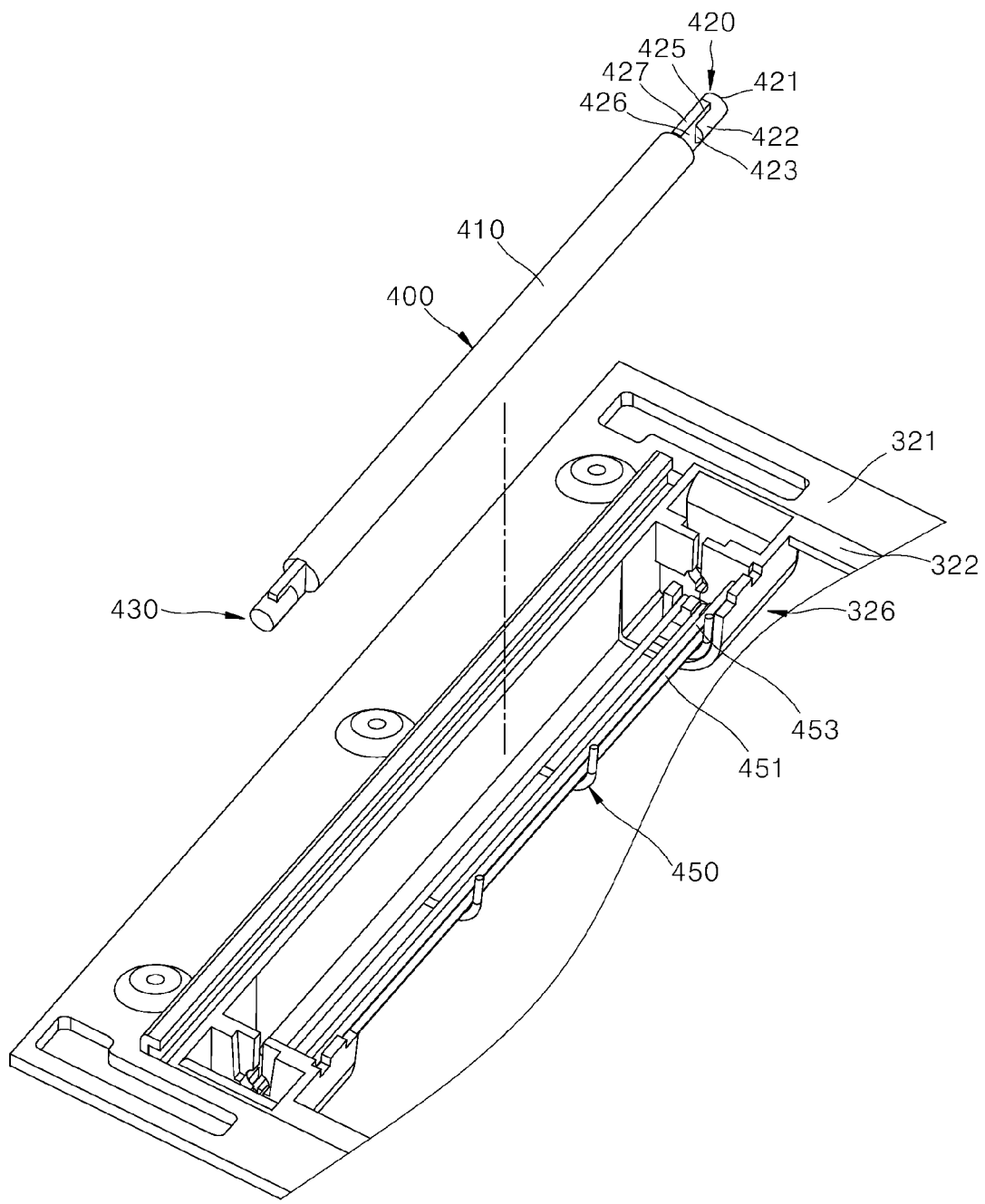
FIGS. 35 to 39 are views for showing a process in which the first heating part is installed in the door frame.

Referring to FIG. 35, installation of the protective grille 450 may be performed prior to installing the first heating part 400 in the door frame 320. The installation of the protective grille 450 may be performed in the form in which both side end portions of the protective griller 450 in the longitudinal direction are respectively fixed to the first connecting end fixing part 326 and the second connecting end fixing part 327. In this case, fixing of each end portion of the protective grille 450 may be performed in the form in which the steel wires 451 are fitted to the fixing grooves formed between the plurality of fixing ribs h so that the protective grille 450 and the grille fixing part are fitted and coupled to each other.

The installation of the first heating part 400 may be performed in a state in which the installation of the protective grille 450 is completed. For the first heating part 400 to be installed in the door frame 320, first, the first heating part 400 should take the first posture. In this case, both the first connecting end 420 and the second connecting end 430 reach a state in which the pair of first surfaces 426 face forward and downward and, of the two pairs of second surfaces 427, the pair of second surfaces 427 facing each other face upward and downward.

Figure 36:
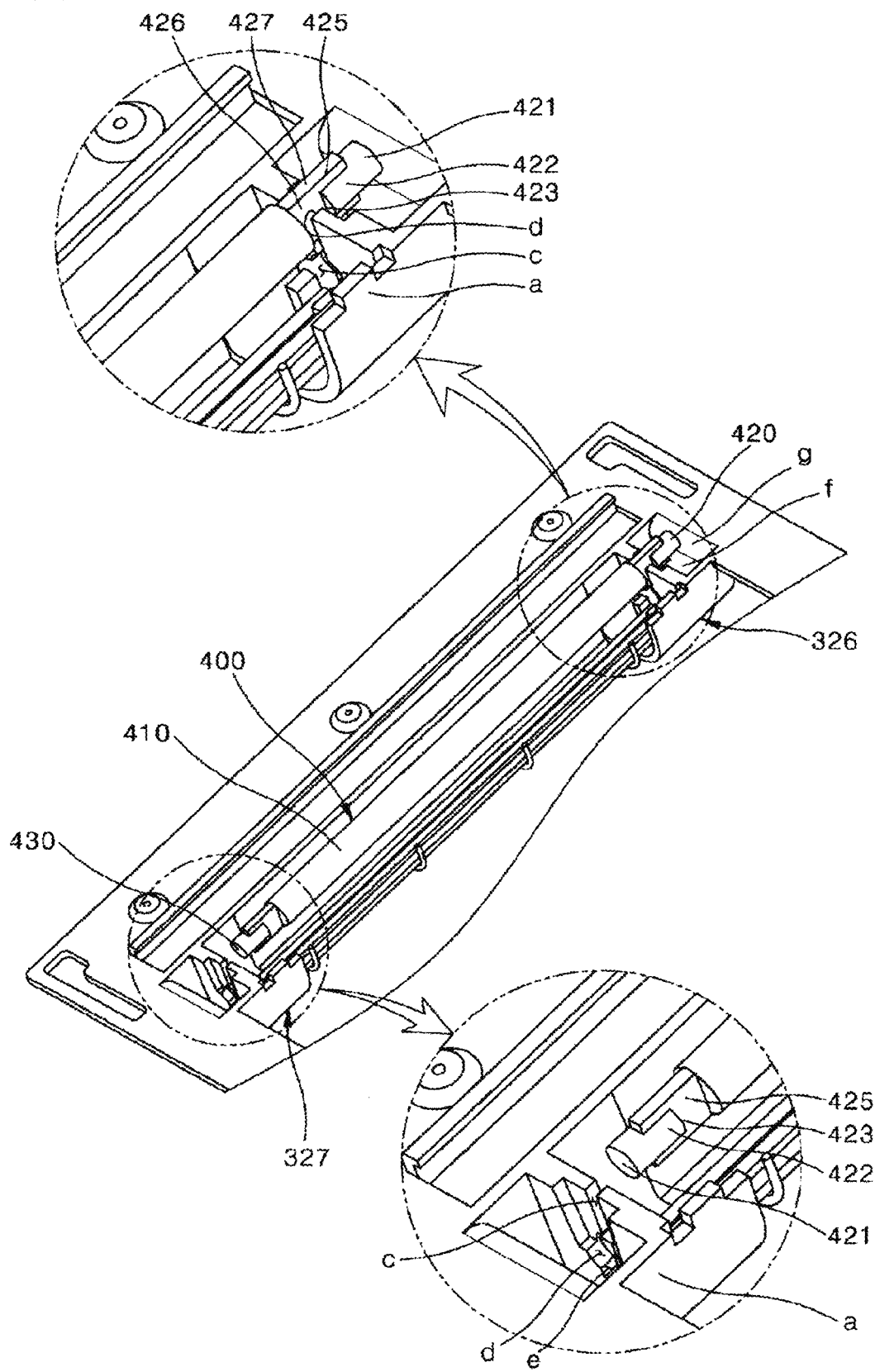

In this state, as illustrated in FIG. 36, any one of the first connecting end 420 and the second connecting end 430 is fitted into the support wall b. In the present embodiment, an example in which the first connecting end 420 is fitted to the support wall b provided in the first connecting end fixing part 326 is illustrated.

For the first connecting end 420 to be fitted into the support wall b, the first connecting end 420 should be inserted into the through-hole d formed in the support wall b. To this end, the first connecting end 420 is inserted into the through-hole d in a state in which the position of the key-shaped part 425 matches the position of the through-hole d. In this process, the key-shaped part 425 is inserted into the through-hole d through a cut-out upper end of the support wall b and passes through the through-hole d to be inserted into the coupling hole c.

In this case, the second connecting end 430 maintains a state of not being fitted to the second connecting end fixing part 327. That is, even when the first heating part 400 moves downward in the state in which the key-shaped part 425 of the first connecting end 420 is inserted into the coupling hole c, the second connecting end 430 is not fitted to the support wall b and maintains a state of being disposed at a right side of the support wall b.

In order to be fitted into the support wall b, the first connecting end 420 may be guided in the longitudinal direction to a position at which a region between a longitudinal end portion of the heating element 410 and the extension part 422 (hereinafter referred to as "depressed region") may overlap the through-hole d. That is, in the first connecting end 420, a portion able to pass through the through-hole d is limited to the depressed region. The depressed region may be clearly distinguished due to the characteristic of being depressed between the longitudinal end portion of the heating element 410 and the extension part 422.

When a length of the depressed region is set to be substantially equal to the thickness of the support wall b or slightly longer than the thickness of the support wall b, the first heating part 400 may be easily guided to a position which allows the second connecting end 430 to maintain the state of not being fitted to the support wall b of the second connecting end fixing part 327 while the first connecting end 420 is fitted to the support wall b of the first connecting end fixing part 326.

To this end, a separation distance ($L_1$) between the support wall b of the first connecting end fixing part 420 and the support wall b of the second connecting end fixing part 430 satisfies the following relational expression.

$$L_H = L_{H1} + 2L_{H2} + 2L_{H3}$$

$$L_1 = L_H - L_{H2} - L_{H3}$$

Here, $L_H$ is the entire length of the first heating part, $L_{H1}$ is a length of the heating element, $L_{H2}$ is a distance between one side end portion of the heating element and a step, and $L_{H3}$ is a distance between the step and the outermost side end portion of the cylindrical part. Further, $L_{H2}$ may also be referred to as a length of the depressed region as well as the distance between the one side end portion of the heating element and the step.

That is, the separation distance ($L_1$) between the support wall b of the first connecting end fixing part 326 and the support wall b of the second connecting end fixing part 327 is set to a length equal to a length excluding one connecting end from the heating element 410 and the pair of connecting ends 420 and 430 constituting the first heating apart 400.

When the separation distance ($L_1$) between the support wall b of the first connecting end fixing part 326 and the support wall b of the second connecting end fixing part 327 is set as described above, when the depressed region of the first connecting end 420 is inserted into the through-hole d and fitted into the support wall b of the first connecting end fixing part 326, the second connecting end 430 maintains the state of not being fitted into the support wall b of the second connecting end fixing part 327.

Figure 37:
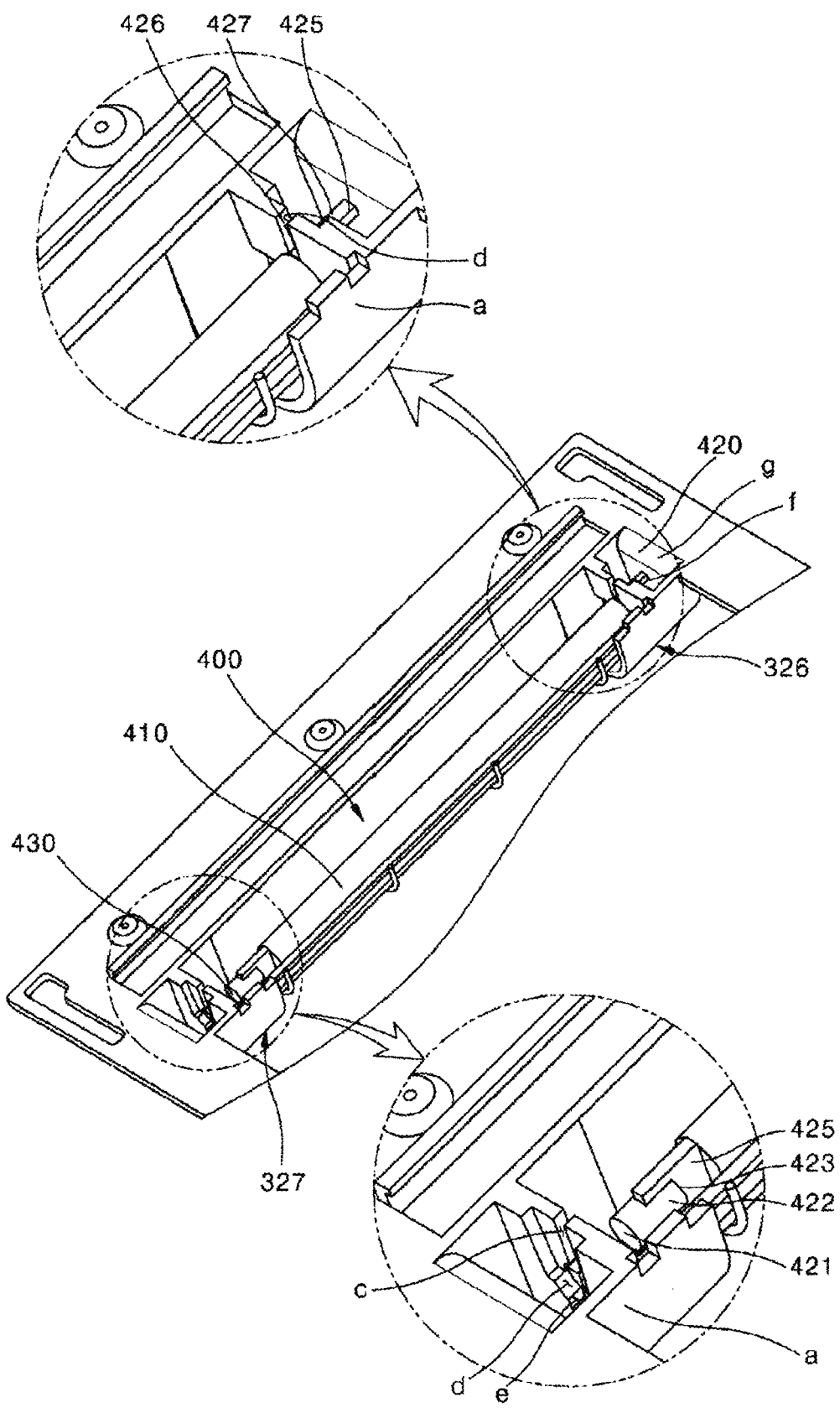

Meanwhile, as illustrated in FIG. 37, when the depressed region of the key-shaped part 425 passes through the through-hole d and is inserted into the coupling hole c, and thus the state in which the cylindrical part 421 is disposed at the same height as the coupling hole c is reached, the portion of the key-shaped part 425 protruding downward is inserted into the extension hole e, and the state in which the first connecting end 420 is unable to further move downward is reached.

Figure 38:
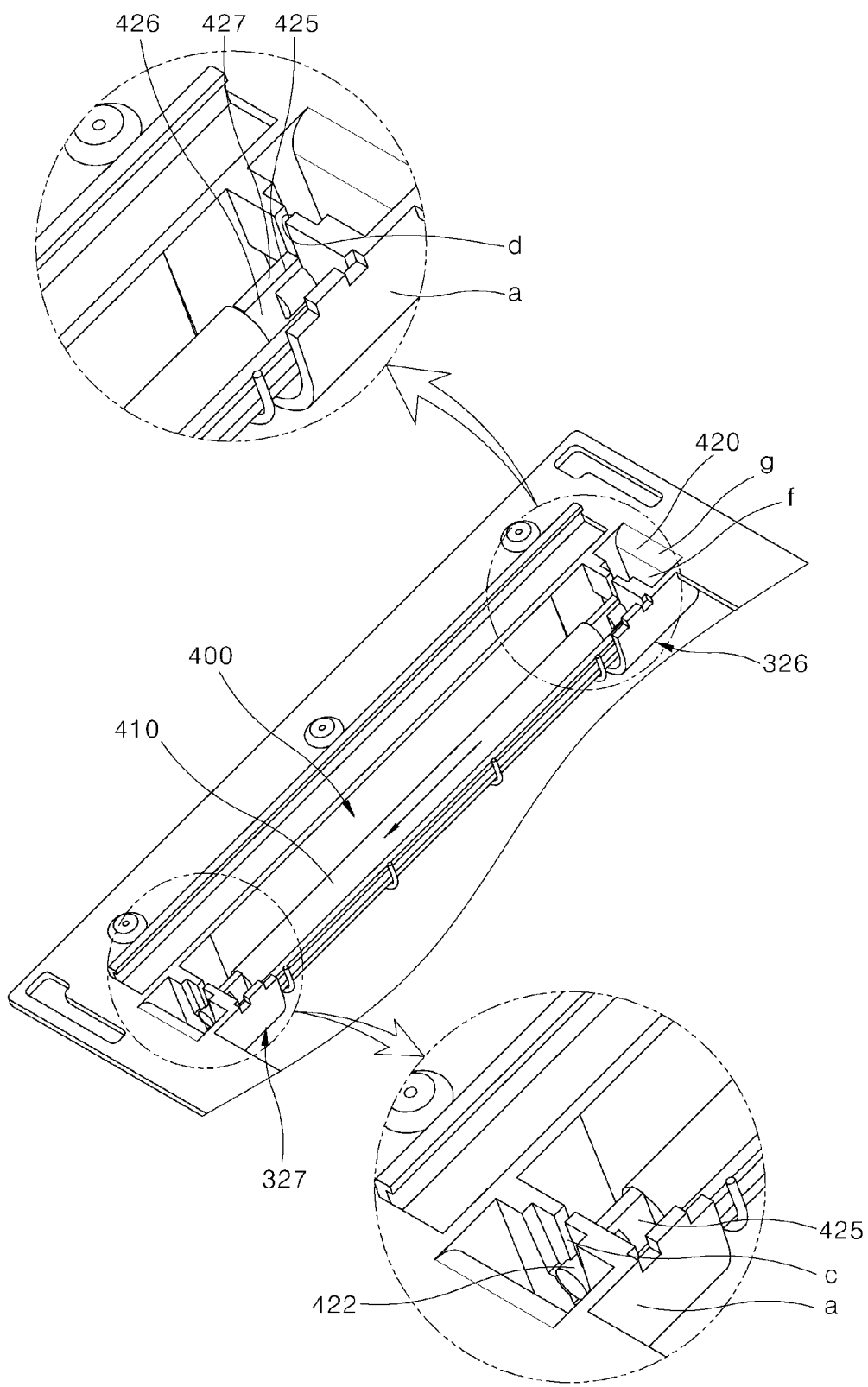

In this state, as illustrated in FIG. 38, the entire first heating part 400 is moved in the longitudinal direction of the first heating part 400 while moving the heating element 410 in a direction moving away from the support wall b of the first connecting end fixing part 326. Accordingly, the key-shaped part 425 of the first connecting end 420 is separated from the support wall b. That is, the key-shaped part 425 of the first connecting end 420 is deviated from the coupling hole c, the through-hole d, and the extension hole e, and instead, the cylindrical part 421 is inserted into the coupling hole c such that the cylindrical part 421 of the first connecting end 420 and the support wall b of the first connecting end fixing part 326 are fitted and coupled to each other.

At the same time, in the second connecting end fixing part 327, the cylindrical part 421 of the second connecting end 420 is inserted into the coupling hole c, and accordingly, the cylindrical part 421 of the second connecting end 430 and the support wall b of the second connecting end fixing part 327 are fitted and coupled to each other. In this case, the state in which the key-shaped part 425 of the second connecting end 420 is separated from the support wall b, that is, the state in which the key-shaped part 425 of the second connecting end 420 is not inserted into the coupling hole c, the through-hole d, and the extension hole e is also maintained in the second connecting end fixing part 327.

To this end, the separation distance ($L_1$) between the support wall b of the first connecting end fixing part 326 and the support wall b of the second connecting end fixing part 327 satisfies the following relational expression.

$$L_1 = L_{H1} 2L_{H4}$$

Here, $L_{H4}$ is a length of the key-shaped part 425.

That is, the separation distance ($L_1$) between the support wall b of the first connecting end fixing part 326 and the support wall b of the second connecting end fixing part 327 is set to a length equal to a length including the heating element 410 and the pair of key-shaped parts 425.

When the separation distance ($L_1$) between the support wall b of the first connecting end fixing part 326 and the support wall b of the second connecting end fixing part 327 are set as described above, when both the cylindrical part 421 of the first connecting end 420 and the cylindrical part 421 of the second connecting end 430 are fitted to the support walls b, both the key-shaped part 425 of the first connecting end 420 and the key-shaped part 425 of the second connecting end 430 maintain the state of not being fitted to the support walls b.

Figure 39:
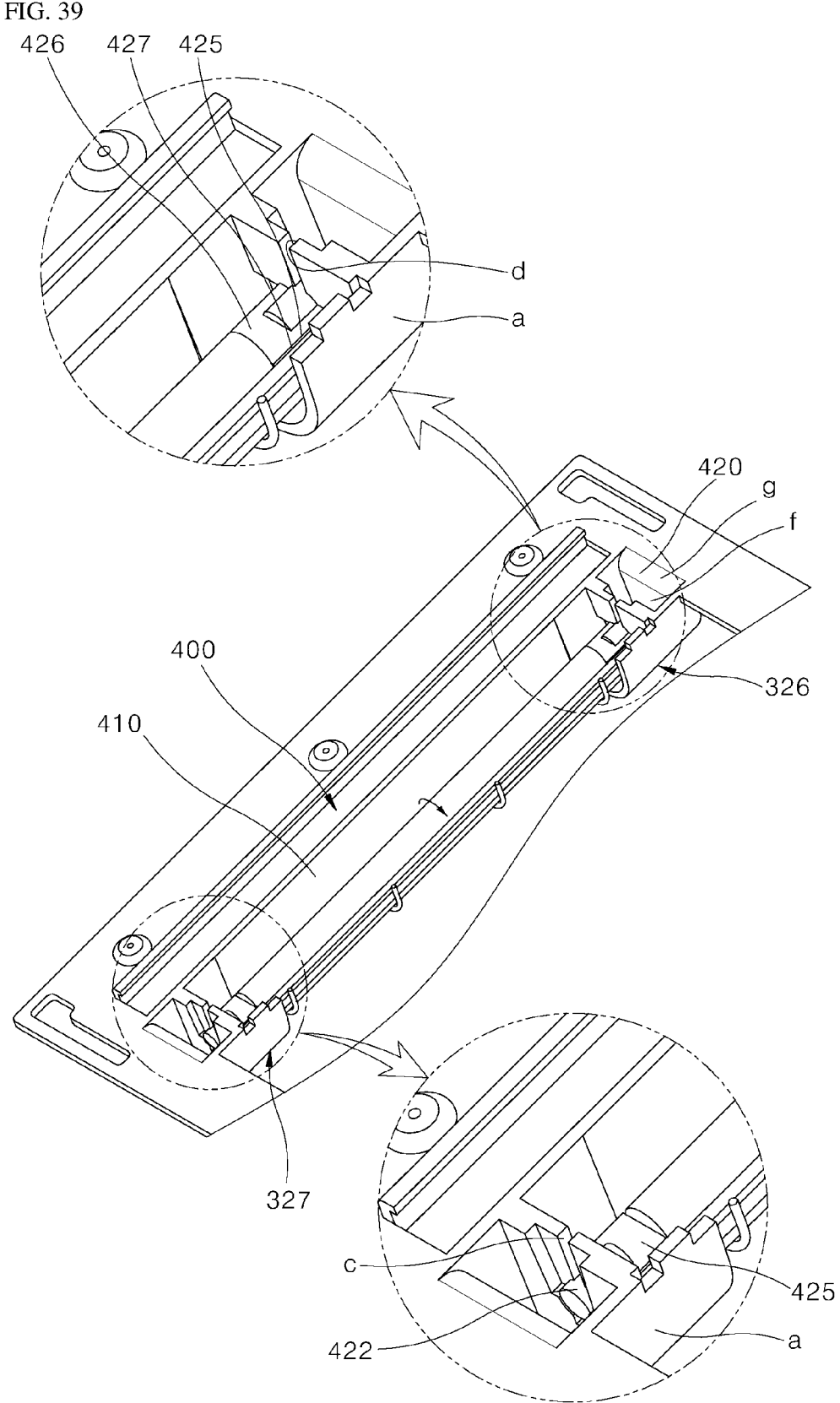

In this state, as illustrated in FIG. 39, when the posture of the first heating part 400 is changed to a second posture, the installation of the first heating part 400 is completed. Here, the second posture is defined as a posture of the first heating part 400 in which the first surface 426 of the key-shaped part 425 is disposed parallel to the width direction of the through-hole d. The second posture of the first heating part 400 may be a state reached by the first heating part 400 rotating 90° about the longitudinal axis of the first heating part 400 from the first posture.

As the posture of the first heating part 400 is changed as described above, the key-shaped part 425 disposed at each of both side end portions of the first heating part 400 may be adhered to the support wall b, and accordingly, the first heating part 400 may be fixed to the heater mounting part 325 in a state in which the movement of the first heating part 400 is restricted in the longitudinal direction.

This may correspond to the advantageous effect obtained by designing the shapes of the first heating part 400 and the heater mounting part 325 so that the separation distance ($L_1$) between the support wall b of the first connecting end fixing part 420 and the support wall b of the second connecting end fixing part 430 satisfies the relational expression, $L_1 = L_{H1} + 2L_{H4}$.

Further, a separation distance ($L_2$) between the support wall b and the outer wall f satisfies the following relational expression.

$$L_2 \geq L_{H3}$$

That is, the separation distance ($L_2$) between the support wall b and the outer wall f is set to a length longer than a length between the step 423 and the outermost side end portion of the cylindrical part 421.

When the separation distance ($L_2$) between the support wall b and the outer wall f is set as described above, a space having a length corresponding to the separation distance ($L_2$) is formed between the support wall b and the outer wall f. The extension part 422 and the cylindrical part 421 are inserted into the space formed between the support wall b and the outer wall f. Also, in the space, the connection between the cables and the connecting ends may be performed. That is, when the separation distance ($L_2$) between the support wall b and the outer wall f is set as described above, a sufficient space required for the insertion of the extension part 422 and the cylindrical part 421 and the connection between the cables and the connecting ends may be provided.

When the installation of the first heating part 400 is completed as described above, the installation of the reflector 440 may be performed. The installation of the reflector 440 may be performed in the form in which the reflector 440 is coupled to the shielding plate 328.

Then, when the glass 335 (see FIG. 31) is seated on the seating surface 332 of the door frame 320 and then fixed by the restricting rib 323 and the stopper 324, the installation of the glass 335 is completed.

The task of connecting the connecting ends and the cables may be performed before or after the process of installing the glass 335. Once all of these processes are completed, the door frame 320, the first heating part 400, the reflector 440, the protective grille 450, and the glass 335 may be provided as an integrally-assembled unit body. Also, when the door frame 320 which is integrally assembled with the first heating part 400, the reflector 440, the protective grille 450, and the glass 335 as described above is coupled to the door upper surface part 310 (see FIG. 1), the first heating part 400, the reflector 440, the protective grille 450, and the glass 335 may be assembled to the door 300 at once.

Although not illustrated, once the installation of the first heating part 400 and the task of connecting the connecting ends and the cables are completed, open upper portions of the first connecting end fixing part 326 and the second connecting end fixing part 327 (see FIG. 31) may be covered with caps so that the connecting ends are protected. For coupling between the caps and the first connecting end fixing part 326 and the second connecting end fixing part 327, a coupling protrusion i may be provided to protrude from an upper portion of the cover a.

The door frame 320 of the present embodiment having the above-described configuration may provide the following advantageous effects.

First, since the door frame 320 is coupled to the lower portion of the door upper surface part 310, the door frame 320 may cover the lower portion of the door upper surface part 310 so that the cable mounting parts 340 and 345 (see FIG. 7) disposed inside the door upper surface part 310 and the cables installed at the cable mounting parts 340 and 345 are not exposed to the outside.

The door frame 320 may be coupled to the lower portion of the door upper surface part 310 in the form in which, while the portions where the cable mounting parts 340 and 345 are disposed are covered by the coupling part 321, the door frame 320 is fastened to the cable mounting parts 340 and 345 using a fastening member. The door frame 320 coupled to the lower portion of the door upper surface part 310 in this way may cover the cable mounting parts 340 and 345 (see FIG. 7) disposed inside the door upper surface part 310 and the cables installed at the cable mounting parts 340 and 345 so that the cable mounting parts 340 and 345 and the cables are not exposed to the outside, and the door frame 320 may be easily separated from the door 300 when necessary. Since the door frame 320 may safely protect the components inside the door upper surface part 310 while being easily separable when necessary, the door frame 320 may contribute to allowing maintenance and repair tasks of the cooking appliance to be performed easily and promptly.

Second, the door frame 320 provides a frame in which the first heating part 400, the components related thereto, and the glass 335 may be assembled to a single unit body. In this way, the door frame 320 may contribute to allowing the components management and manufacturing management to be more efficiently performed.

In addition to the structures for fixing the glass 335 to the door frame 320, the structures for fixing the first heating part 400, the reflector 440, and the protective grille 450 to the door frame 320 are provided in the door frame 320.

Accordingly, the glass 335, the first heating part 400, the reflector 440, and the protective grille 450 may be provided as an integrally-assembled unit body coupled to the door frame 320, and the glass 335, the first heating part 400, the reflector 440, and the protective grille 450 may be assembled at once just by coupling the door frame 320 to the lower portion of the door upper surface part 310.

Third, since the door frame 320 provides structures that allow the first heating part 400 to be easily and promptly installed at the door frame 320, the door frame 320 may contribute to allowing the task of installing the first heating part 400 to be more efficiently performed.

According to the present embodiment, the installation of the first heating part 400 may be completed by a simple task in which one side end portion of the first heating part 400 is first fitted to any one of the first connecting end fixing part 326 and the second connecting end fixing part 327, the first heating part 400 is moved in the longitudinal direction thereof so that both side end portions of the first heating part 400 are respectively fitted to the first connecting end fixing part 326 and the second connecting end fixing part 327, and then the first heating part 400 is rotated.

In this case, since the first connecting end fixing part 326 and the second connecting end fixing part 327 are not provided to be directional, the installation of the first heating part 400 is possible without problems regardless of which of the first connecting end fixing part 326 and the second connecting end fixing part 327 the one side end portion of the first heating part 400 is first fitted to.

In this way, by allowing the task of installing the first heating part 400 to be performed more efficiently, the door frame 320 may contribute to allowing maintenance and repair tasks performed for replacing the first heating part 400, as well as the task of manufacturing the cooking appliance, to be easily and promptly performed.

According to a cooking appliance of the present invention, since an input part is installed in a door, it is possible to, while reducing the size of a housing, provide an entrance that is large enough for a tray and food to enter and exit the cooking appliance, thereby providing the cooking appliance which has a compact exterior and is more convenient to use.

Also, since the present invention has a structure in which a see-through window is disposed at an upper portion of the door and the input part is disposed at the front of the door, there are advantageous effects in that, even when the cooking appliance is installed at a low position, the user is allowed to easily and conveniently check a cooking state of food without lowering the posture or bending the waist forward and allowed to easily and conveniently operate a manipulation switch by facing the cooking appliance from the front.

Also, since the door is provided to be able to open both a front surface and an upper surface of a cooking compartment by rotating upward without being unfolded forward, opening of the door can be easily and smoothly performed even in a narrow space and the withdrawal of food or a tray can be more easily and conveniently performed.

Since both the front surface and the upper surface of the cooking compartment may be opened by the door and a tray part is exposed to a greater extent due to the opening of the door, an object to be cooked can be easily put in or taken out even when only a portion of the tray is withdrawn. Thus, improved convenience and stability can be provided.

Also, according to the present invention, since the door is provided to be opened by rotating upward without being unfolded forward, there is little concern about the center of mass of the cooking appliance being biased toward the front even when the door is opened. Accordingly, there is an advantageous effect in that the risk of the cooking appliance falling forward is significantly lowered.

Also, according to the present invention, since the center of rotation of the door is formed at the rear side of the cooking appliance, the center of mass of the door is formed to be biased toward a door upper surface part than toward a door front surface part, and the center of mass of the cooking appliance is formed to be biased toward the rear side of the cooking appliance when the door is opened, there are advantageous effects in that the risk of the cooking appliance falling forward is significantly lowered, and thus safety and convenience in use of the cooking appliance are improved.

Also, since the present invention provides the cooking appliance having a stable structure in which the risk of the cooking appliance falling forward is significantly low, there is an advantageous effect in that it is possible to freely adopt a tray whose thickness and weight are increased to improve the cooking performance or a tray which is usable in an environment being heated by an induction heating part.

Also, since an expanded passage is provided so that a user may easily and conveniently insert or withdraw food or the tray into or from the cooking compartment and, at the same time, the tray is allowed to be automatically withdrawn or inserted when the door is opened or closed, a function of allowing the withdrawal and insertion of food or the tray to be more easily and conveniently performed can be provided.

The present invention is directed to providing a cooking appliance with an improved structure so that, while an increase in the size of the cooking appliance is suppressed, a width of a passage opened by a door is increased.

The present invention is also directed to providing a cooking appliance with an improved structure so that a manipulation switch may be installed in the door.

The present invention is also directed to providing a cooking appliance having high structural stability and capable of facilitating checking of a cooking state.

The present invention is also directed to providing a cooking appliance capable of facilitating opening of a door and insertion and withdrawal of a shelf.

The present invention is also directed to providing a cooking appliance with low risk of falling forward when the door is opened and the shelf is withdrawn.

A cooking appliance according to one embodiment of the present invention for achieving the above objectives includes a door formed including a door upper surface part which covers an upper surface of a housing and a door front surface part which is connected to a front side of the door upper surface part and covers a front surface of the housing, wherein an input part is disposed in the door front surface part.

A first heating part disposed at an upper portion of a tray may be installed in the door.

Specifically, the first heating part may be installed in the door upper surface part.

A see-through window may be installed in the door. The see-through window may be installed in the door upper surface part.

According to another embodiment, the see-through window may be disposed in the door upper surface part.

In this way, it is possible to provide an advantageous effect in that, even when the cooking appliance is installed at a low position, a user is able to easily and conveniently check a cooking state of food without lowering the posture or bending the waist forward.

According to another embodiment, the first heating part may be disposed in the door upper surface part.

The first heating part provided to be disposed at the upper portion of the tray may be installed in the door upper surface part which covers an upper portion of the housing. Accordingly, the first heating part may be disposed at a position spaced apart from the input part and a first control board, and the center of mass of the door may also be formed to be biased toward the rear.

According to another embodiment, the first heating part and the see-through window may be disposed in the door upper surface part, and the input part may be disposed in the door front surface part in which the first heating part and the see-through window are not installed.

According to another embodiment, components with relatively high weight, such as a glass and a heater, may be disposed in the door upper surface part so that, while the front surface and the upper surface of the housing are opened by the door, the center of mass of the cooking appliance is formed to be biased toward the rear from the center in the front-rear direction.

Since the cooking appliance having the above configuration is formed so that the center of mass of the cooking appliance is biased toward the rear from the center in the front-rear direction when the door opens the cooking compartment, the risk of the occurrence of the cooking appliance falling forward when the door is opened and the shelf is withdrawn may be lowered.

According to another embodiment, the input part and the first control board may be disposed together in the door front surface part.

According to another embodiment, the front and top of the housing may be opened together when the door is opened.

According to another embodiment, when the door is opened, the front and top of the housing may be opened together, and, at the same time, the tray may be withdrawn forward by interlocking with the opening of the door.

According to another embodiment, a space portion may be formed inside each of the door front surface part and the door upper surface part, an air intake port may be formed in the door front surface part, and an air exhaust port may be formed in the door upper surface part.

Accordingly, outside air may be introduced into the door through the air intake port, and the introduced air may cool the first control board and a space portion inside the see-through window and then be discharged through the air exhaust port.

According to another embodiment, a cable mounting part may be provided inside the door upper surface part, and a cable which connects the first control board and the first heating part to each other may be installed at the cable mounting part.

By such a configuration, since a user may view the inside of the cooking compartment from the top through the see-through window formed at an upper portion of the cooking appliance, there is an advantageous effect in that the user is allowed to easily and conveniently check a cooking state of food without lowering the posture or bending the waist forward.

A cooking appliance according to one aspect of the present invention may include: a housing having a cooking compartment, which is surrounded by a bottom surface, both side surfaces, and a back surface of the housing, formed therein and having an upper surface and a front surface which are open; a door including a door upper surface part which covers the upper surface of the housing and a door front surface part which is connected to a front side of the door upper surface part and covers the front surface of the housing; a heating part which generates heat inside the cooking compartment; and an input part disposed in the door front surface part and manipulated to control operation of the heating part.

A cooking appliance according to another aspect of the present invention may include: a housing having a cooking compartment, which is surrounded by a bottom surface, both side surfaces, and a back surface of the housing, formed therein and having an upper surface and a front surface which are open; door including a door upper surface part which covers the upper surface of the housing and a door front surface part which is connected to a front side of the door upper surface part and covers the front surface of the housing and opening and closing the upper surface and the front surface of the housing by rotating about a rear side of the door upper surface part; and a see-through window disposed in the door upper surface part.

A cooking appliance according to still another aspect of the present invention may include: a housing having a cooking compartment, which is surrounded by a bottom surface, both side surfaces, and a back surface of the housing, formed therein and having an upper surface and a front surface which are open; a door including a door upper surface part which covers the upper surface of the housing and a door front surface part which is connected to a front side of the door upper surface part and covers the front surface of the housing and opening and closing the upper surface and the front surface of the housing by rotating about a rear side of the door upper surface part; and a heating part disposed in the door.

The heating part may include a first heating part installed in the door.

The first heating part may include an electric heater installed in the door upper surface part.

The present invention may further include a first control board electrically connected to the input part, and the first control board may be disposed in the door front surface part.

The input part may include at least one manipulation switch installed at an outer side of the door front surface part, and the manipulation switch may be connected to the first control board by passing through the door front surface part.

The heating part may include a first heating part installed in the door upper surface part, the first control board may be installed inside the door front surface part, an inside of the door upper surface part and an inside of the door front surface part may be connected to each other, and the first heating part and the first control board may be electrically connected to each other through the inside of the door upper surface part and the inside of the door front surface part which are connected to each other.

The present invention may further include a see-through window disposed in the door upper surface part.

The see-through window may be formed including a pair of glasses disposed to be spaced a predetermined distance apart from each other in the up-down direction so that a space portion is formed inside the see-through window.

The present invention may further include a first control board disposed in the door front surface part, a space portion which accommodates at least a portion of the input part and the first control board therein may be formed in the door front surface part, the space portion formed inside the door front surface part and the space portion formed inside the see-through window may be connected to each other, an air intake port which opens the space portion inside the door front surface part to the outside may be formed at a lower end of the door front surface part, and an air exhaust port which opens the space portion inside the see-through window to the outside may be formed at a rear end of the door upper surface part.

The present invention may further include a cooling fan which generates a flow of air which causes outside air to be introduced into the door through the air intake port and causes the air inside the door to be discharged through the air exhaust port.

The heating part may further include a first heating part disposed in the door, and the first heating part may be installed in the door upper surface part and disposed in a region not exposed through the see-through window when viewed from the top.

The see-through window may include a pair of glasses disposed to be spaced a predetermined distance apart from each other in the up-down direction, and the first heating part may be disposed at each of a front outer side and a rear outer side of the see-through window.

The present invention may further include cable mounting parts disposed at both outer sides of the see-through window, and a cable which connects the first control board and the first heating part to each other through the inside of the door upper surface part and the inside of the door front surface part which are connected to each other may be installed at the cable mounting parts.

A power cable which supplies power to the first heating part and the first control board may be installed at any one of the cable mounting parts disposed at both outer sides of the see-through window, a signal cable which transmits a control signal generated in the first control board to the first heating part may be installed at the other one of the cable mounting parts disposed at both outer sides of the see-through window, and the power cable and the signal cable may be disposed to be spaced apart from each other with the see-through window disposed therebetween.

The see-through window may be formed including a pair of glasses disposed to be spaced a predetermined distance apart from each other in the up-down direction so that a space portion is formed inside the see-through window, the cooking appliance may further include a door frame installed at a lower portion of the door upper surface part, any one of the pair of glasses may be installed in the door upper surface part, and the other one of the pair of glasses may be installed in the door frame.

The heating part may further include a first heating part disposed in the door, and the first heating part may be installed in the door frame.

Through-holes in which the glasses are disposed may be formed in the door frame, and the first heating part may be disposed at an outer side of each through-hole.

The cooking appliance may further include a door frame installed at a lower portion of the door upper surface part and a first heating part installed at the door frame and disposed at the lower portion of the door upper surface part.

The door may open and close the upper surface and the front surface of the housing by rotating about the rear side of the door upper surface part.

The door upper surface part and the door front surface part which are connected in an L-shape may integrally rotate about the rear side of the door upper surface part.

The present invention has been described above with reference to the embodiments illustrated in the drawings, but the embodiments are merely illustrative. Those of ordinary skill in the art to which the present invention pertains should understand that various modifications and other equivalent embodiments are possible from the above embodiments. Therefore, the actual technical scope of the present invention should be defined by the claims below.

DESCRIPTION OF REFERENCE NUMERALS

100: housing
105: cooking compartment
110: bottom surface
120, 130: side surface
125: second slot
140: back surface
150: back surface case
160: insulating plate
170: cabinet
180: base
200: tray
205: tray main body
210: mounting part
211: first protrusion
213: second protrusion
214: sliding surface
215: mounting groove
220: water receiving groove
230: steam cover
231: cover main body part
233: steam hole
235: water entrance guide surface
237: water entrance hole
300: door
301: air intake port
303: air exhaust port
305: handle
310: door upper surface part
320: door frame
320a: fastening hole
321: coupling part
322: seating surface
323: restricting rib
324: stopper
325: heater mounting part
326: first connecting end fixing part
327: second connecting end fixing part
328: shielding plate
330, 335: glass
340, 345: cable mounting part
343: connecting member
350: door front surface part
360: input part
400: first heating part
410: heating element
420: first connecting end
421: cylindrical part
422: extension part
423: step
425: key-shaped part
430: second connecting end
440: reflector
450: protective grille
500: first control board
600: second heating part
610: working coil
611: coil installation base
613: coil
615: coil connection wiring
620: receiver coil
621: coil installation base
623: coil
630: electromagnetic shielding plate
640: temperature measurement module
700: second control board
710: noise filter PCB
720: coil control PCB
725: IGBT chip
726: heat sink
730: second cooling fan
800: hinge assembly
810: hinge part
820: mounting protrusion 830: hinge case
831: guide hole
832: first guide rib
833: second guide rib
835: first slot
W: see-through window
a: cover
b: support wall
c: coupling hole
d: through-hole
e: extension hole
f: outer wall
g: concave groove
h: fixing rib

The invention claimed is:

1. A cooking appliance comprising:
a housing having a bottom part, two side parts, and a back part, and a cooking compartment formed therein, wherein the housing has an upper surface and a front surface which are open;
a door for opening and closing the housing, the door including a door upper surface part for covering the upper surface of the housing and a door front surface part extending from a front portion of the door upper surface part for covering the front surface of the housing; and
a heating part configured to generate heat inside the cooking compartment; and
a see-through window disposed in the door upper surface part,
wherein the see-through window is formed including a pair of glasses spaced apart from each other by a predetermined distance such that a space is formed inside the see-through window, a space formed inside the door front surface part and the space formed inside the see-through window being connected to each other,
wherein the cooking appliance further comprises a door frame installed at a lower portion of the door upper surface part, and wherein any one of the pair of glasses is installed at the door upper surface part and the other one of the pair of glasses is installed at the door frame, and/or the first heating part is installed at the door frame.

2. The cooking appliance of claim 1, wherein the door upper surface part and the door front surface part are connected to each other in an L-shape and/or wherein the door is formed in an L-shape.

3. The cooking appliance of claim 1, wherein an air intake port which opens the space inside the door front surface part to the outside is formed at a lower end of the door front surface part.

4. The cooking appliance according to claim 1, further comprising an input part for controlling an operation of the heating part, the input part being disposed at the door front surface part and/or a first control board electrically connected to the input part and disposed inside the door front surface part.

5. The cooking appliance of claim 4, wherein the input part includes at least one manipulation switch installed at an outer side of the door front surface part and connected to the first control board by passing through the door front surface part.

6. The cooking appliance of claim 4, wherein the heating part includes a first heating part installed in the door upper surface part, and the first heating part and the first control board are electrically connected to each other via the space inside the door upper surface part and the space inside the door front surface part.

7. The cooking appliance according to claim 3, wherein the space formed in the door front surface part accommodates at least a portion of the input part and/or the first control board therein.

8. The cooking appliance of claim 1, wherein the first heating part is installed at a front side and/or a rear side of the see-through window.

9. The cooking appliance of claim 8, further comprising cable mounting parts disposed at inside the door upper surface part, and
at least one cable connecting the first control board and the first heating part to each other through a space inside the door upper surface part and the space inside the door front surface part and being installed at the cable mounting parts.

10. A cooking appliance comprising:
a housing having a bottom part, two side parts, and a back part, and a cooking compartment formed therein, wherein the housing has an upper surface and a front surface which are open;
a door for opening and closing the housing, the door including a door upper surface part for covering the upper surface of the housing and a door front surface part extending from a front portion of the door upper surface part for covering the front surface of the housing;
a heating part configured to generate heat inside the cooking compartment; and
a see-through window disposed in the door upper surface part,
wherein the heating part is installed at a front side and/or a rear side of the see-through window, wherein:
a power cable for supplying power to the heating part and a control board is installed adjacent to a first side of the see-through window;
a signal cable for transmitting a control signal generated by the control board to the heating part is installed adjacent to a second side of the see-through window such that the power cable and the signal cable are disposed to be spaced apart from each other with the see-through window disposed therebetween.

11. The cooking appliance of claim 1, wherein the door is rotatable about an upper edge of the back part of the housing or about an axis parallel thereto and/or about a rear edge of the door upper surface part or about an axis parallel thereto.

12. The cooking appliance of claim 1, wherein a space is formed inside the door upper surface part and the space is formed inside the door front surface part are connected to each other, wherein the space inside the door upper surface part and the space inside the door front surface part are connected to each other.

* * * * *